(12) United States Patent
Oberoi et al.

(10) Patent No.: US 12,138,719 B2
(45) Date of Patent: Nov. 12, 2024

(54) END EFFECTOR AND METHODS OF USE

(71) Applicants: The Boeing Company, Arlington, VA (US); Korean Air Lines Co., Ltd., Seoul (KR)

(72) Inventors: Harinder Singh Oberoi, Snohomish, WA (US); Kevin Marion Barrick, Kingston, WA (US); Yuanxin Charles Hu, Newcastle, WA (US); Melissa A. Johnson, Puyallup, WA (US); Laura Carolyn Foster, Brier, WA (US); Hwangyu Shin, Gyeongsangnam-Do (KR); Gi Jun Hong, Pusan (KR); Youngwoo Koh, Busan (KR)

(73) Assignees: The Boeing Company, Arlington, VA (US); Korean Air Lines Co., Ltd., Seoul (KR)

( * ) Notice: Subject to any disclaimer, the term of this patent is extended or adjusted under 35 U.S.C. 154(b) by 0 days.

(21) Appl. No.: 18/447,485

(22) Filed: Aug. 10, 2023

(65) Prior Publication Data
US 2024/0066647 A1  Feb. 29, 2024

Related U.S. Application Data

(60) Provisional application No. 63/373,303, filed on Aug. 23, 2022.

(51) Int. Cl.
*B23P 19/06* (2006.01)
*B23P 23/02* (2006.01)
*B64F 5/10* (2017.01)

(52) U.S. Cl.
CPC ............... *B23P 19/06* (2013.01); *B23P 23/02* (2013.01); *B23P 2700/01* (2013.01); *B64F 5/10* (2017.01)

(58) Field of Classification Search
CPC ....... B23P 19/06; B23P 23/02; B23P 2700/01; B64F 5/10; B21J 15/142
See application file for complete search history.

(56) References Cited

U.S. PATENT DOCUMENTS 10,723,484 B2  7/2020 Chan et al.
2020/0070340 A1*  3/2020 Kurtz .................. B25J 9/163

* cited by examiner

*Primary Examiner* — Lee A Holly
(74) *Attorney, Agent, or Firm* — Yee & Associates, P.C.

(57) ABSTRACT

An end effector is presented. The end effector comprises a torque wrench and a first vacuum source. The torque wrench is configured to hold a collar and apply a single-sided clamp-up to a structure. The first vacuum source is pneumatically connected to the torque wrench and configured to supply a vacuum for the single-sided clamp-up.

20 Claims, 42 Drawing Sheets

END EFFECTOR AND METHODS OF USE

CROSS-REFERENCE TO RELATED APPLICATION

This application claims the benefit of U.S. Provisional Patent Application Ser. No. 63/373,303, filed Aug. 23, 2022, and entitled "End Effector and Methods of Use," which is incorporated herein by reference in its entirety.

BACKGROUND INFORMATION

1. Field

The present disclosure relates generally to applying collars to fasteners, and more particularly to an end effector and method of use for applying collars.

2. Background

In assembly of large structures, such as boats, aircraft, and automobiles, drilling and fastening is performed from two sides of the structure. Fasteners are inserted through one side of a structure and collars are attached to the fasteners on the opposite side of the structure. In current assembly of large structures using robotics, the drilling and fastening is accomplished using dual-sided clamp-up with robots. In conventional co-drilling and fastening using robotics equipment, multi-function end effectors (MFEE) are used. Multi-function end effectors have manufacturing and size limitations.

Therefore, it would be desirable to have a method and apparatus that takes into account at least some of the issues discussed above, as well as other possible issues.

SUMMARY

An embodiment of the present disclosure provides an end effector comprising: a torque wrench and a first vacuum source. The torque wrench is configured to hold a collar and apply a single-sided clamp-up to a structure. The first vacuum source is pneumatically connected to the torque wrench and configured to supply a vacuum for the single-sided clamp-up.

Another embodiment of the present disclosure provides an end effector comprising: a torque wrench with a contact pad, a housing configured to hold a collar, and a vacuum port configured to supply a vacuum to the housing.

Yet another embodiment of the present disclosure provides a method. A torque wrench of an end effector is moved toward a first surface of a structure while the torque wrench contains a collar. The first surface of the structure is contacted with a contact pad of the torque wrench. A vacuum is pulled through an opening of the contact pad while the contact pad is in contact with the first surface of the structure. The collar is installed onto a fastener extending through the first surface of the structure while the vacuum is pulled through the opening of the contact pad.

A further embodiment of the present disclosure provides a method. A collar is gripped within an end effector using a number of moveable fingers of a collar gripper of the end effector. The collar is removed from a collar positioning assembly of the end effector. The collar gripper is moved towards a torque wrench of the end effector. The collar is placed into the torque wrench using the collar gripper. The number of moveable fingers are moved to release the collar from the collar gripper.

A yet further embodiment of the present disclosure provides a method. Desired features are determined for a fastening job on a structure. A torque wrench having the desired features is attached to an end effector. The end effector with the torque wrench is positioned relative to the structure. A surface of the structure is scanned using a number of non-contact inspection sensors of the end effector to generate surface data. The end effector is normalized relative to the structure using the surface data and normal planes for a second surface of the structure. A rotating collar plate of the end effector is rotated until a hole of the rotating collar plate holds a collar of a desired radius provided by one of the collar supply tubes of the end effector. The collar is gripped with a collar gripper using a number of moveable fingers of the collar gripper while the collar is within one of the rotating collar plate or a collar centering iris between the rotating collar plate and the collar gripper. A telescoping arm connected to the collar gripper is extended to remove the collar from the one of the rotating collar plate or the collar centering iris. The collar gripper is rotated about the telescoping arm. The collar is inserted into a torque wrench of the end effector.

A yet further embodiment of the present disclosure provides a method of normalizing an end effector. Surface data for a first surface of a structure is generated using a number of non-contact inspection sensors. Meshes and tangent planes are generated using the surface data. Cross product vector normalization is performed using the tangent planes to generate a vector position. The end effector is moved to the vector position.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
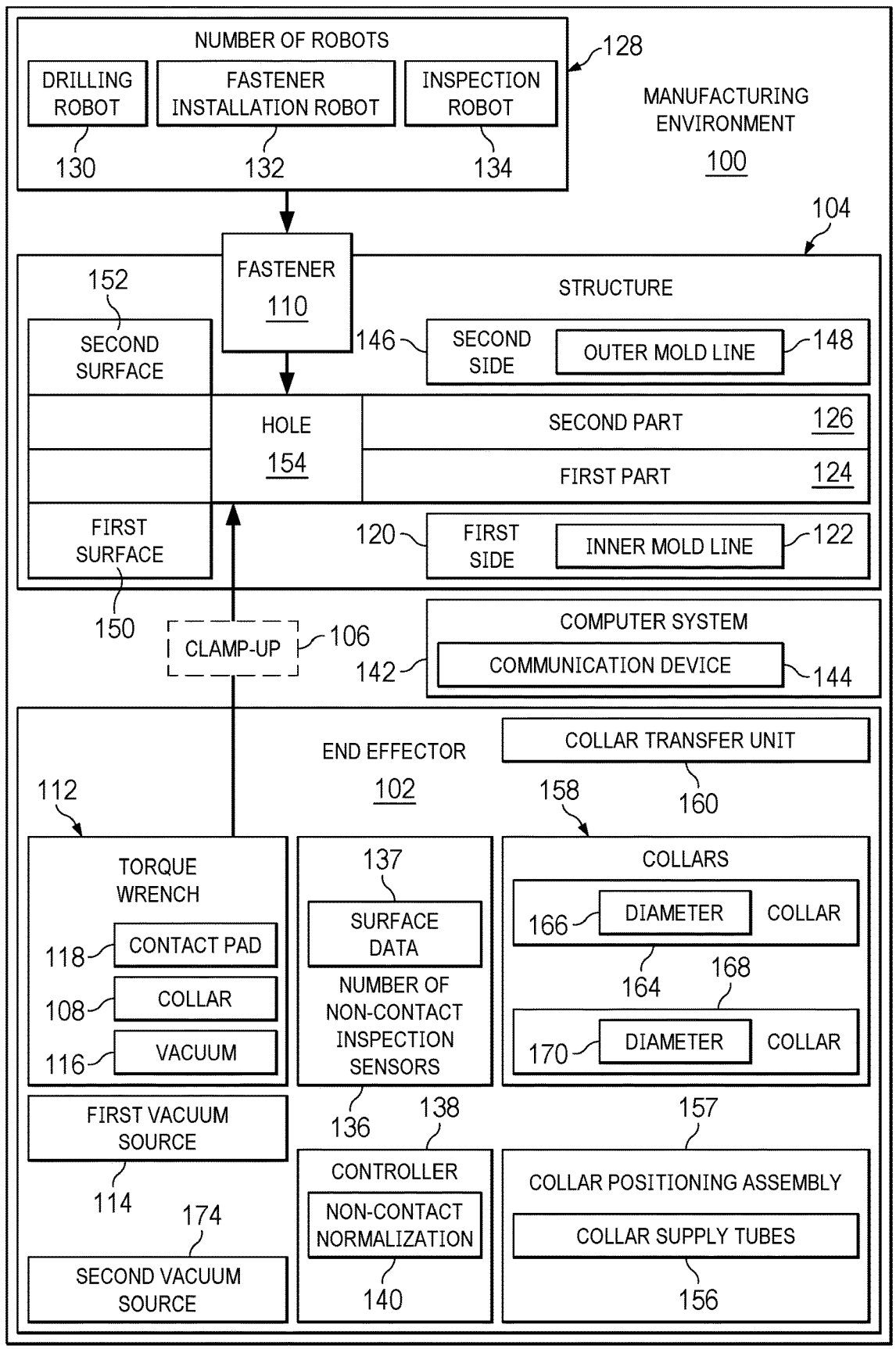
FIG. 1 is a block diagram of a manufacturing environment in which an illustrative embodiment may be implemented.

The illustrative examples recognize and take into account one or more different considerations. For example, the illustrative examples recognize and take into account that in current assembly of aircraft structures using robotics, the end effector on the inside of the structure installs a collar or nut on the tail of the fastener. These collar and nuts are of varying sizes and shapes. The illustrative examples recognize and take into account it is desirable to have adjustable wrenching to fit different collars/nuts sizes.

The illustrative examples recognize and take into account that inner mold lines of fuselages and other large structures can include tight spaces. The illustrative examples recognize and take into account to fit into tight spaces, an installation tool could have a long reach length. The illustrative examples recognize and take into account that an installation tool could be in-line or offset from the centerline with varying reach lengths.

The illustrative examples provide end effectors that store and feed the varying size and shapes of collars and nuts to a torque wrench. The illustrative examples provide an end effector with an offset installation tool and then using the in-line or offset tool to torque down the collar/nut and installing it.

The illustrative examples recognize and take into account that the size and weight of a MFEE, robot, and associated support structure can limit the application of robotics inside and outside a fuselage structure. The illustrative examples recognize and take into account that MFEEs can weigh many hundreds of pounds, and may be undesirably heavy. The illustrative examples recognize and take into account that usage of MFEEs inside a fuselage structure can be undesirably difficult due to the large volume of the MFEE. The illustrative examples recognize and take into account that the large volume of MFEEs can hinder application of MFEEs inside a fuselage due to potential interference with the internal fuselage structure. The illustrative examples recognize and take into account that the large size of MFEEs reduces the quantity of robots that can be working side-by-side. The illustrative examples recognize and take into account that reducing the quantity of robots working on a structure (workpiece) also reduces the throughput.

The illustrative examples recognize and take into account that current MFEEs do not have the capability to feed and install collar/nut on the inside of the fastener on the internal fuselage structure. The illustrative examples recognize and take into account that the MFEEs are complex pieces of equipment. The illustrative examples recognize and take into account that due to their complexity, maintenance and usage of MFEEs may be undesirably complicated.

The illustrative examples recognize and take into account that during fastening operations, multi-function end effectors (MFEEs) do not remove themselves from the surface. The illustrative examples recognize and take into account that the clamp-up of the structure is maintained by the MFEE not moving away from the structure during drilling and fastening processes.

The illustrative examples provide a single-sided clamp-up by an end effector. By providing a single-sided clamp-up to a first surface, an end effector on the opposite side of the structure can move away from the structure. By enabling an end effector on the opposite side (second surface) of the structure to move away from the structure, the illustrative examples enable single function end effectors to perform functions on the second surface of the structure.

With reference now to the figures, and in particular, with reference to FIG. 1, a block diagram of a manufacturing environment is depicted in which an illustrative embodiment may be implemented. As depicted, manufacturing environment 100 includes end effector 102. End effector 102 is configured to perform fastening procedures on structure 104 within manufacturing environment 100. In some illustrative examples, end effector 102 is referred to as a fastening end effector. End effector 102 is configured to perform single-sided clamp-up 106 on structure 104. End effector 102 is also configured to install collar 108 onto fastener 110 in structure 104.

End effector 102 comprises torque wrench 112 and first vacuum source 114. Torque wrench 112 is configured to hold collar 108 and apply single-sided clamp-up 106 to structure 104. First vacuum source 114 is pneumatically connected to torque wrench 112 and configured to supply vacuum 116 for single-sided clamp-up 106.

Torque wrench 112 includes contact pad 118 configured to contact first side 120 of structure 104. In some illustrative examples, first side 120 is also referred to as inner mold line 122. As depicted, first side 120 is a surface of first part 124. Structure 104 comprises first part 124 and second part 126. End effector 102 and number of robots 128 are configured to perform operations on structure 104 to facilitate fastening. End effector 102 and number of robots 128 are configured to perform operations on structure 104 to facilitate installation of fastener 110 and collar 108.

As depicted, end effector 102 is used in conjunction with number of robots 128. As used herein, "a number of," when used with reference to items means one or more items. Thus, number of robots 128 includes one or more robots. As depicted, number of robots 128 includes drilling robot 130, fastener installation robot 132, and inspection robot 134. In some illustrative examples, one robot can perform multiple functions. In one illustrative example, drilling robot 130 and fastener installation robot 132 are the same robot. In another illustrative example, drilling robot 130 and inspection robot 134 are the same robot. In yet another illustrative example, the same robot performs drilling, fastener installation, and inspection. In this illustrative example, number of robots 128 includes one robot.

Prior to performing fastening on structure 104, end effector 102 is normalized relative to structure 104. End effector 102 comprises number of non-contact inspection sensors 136. Number of non-contact inspection sensors 136 is configured to perform a scan of a surface of structure 104, first surface 150, to generate surface data 137. First surface 150 is on first side 120 of structure 104. In some illustrative examples, number of non-contact inspection sensors 136 comprises mutually perpendicular scanners. In some illustrative examples, mutually perpendicular laser scanners of number of non-contact inspection sensors 136 can be used to determine a Z position of end effector 102 relative to structure 104. In some illustrative examples, number of non-contact inspection sensors 136 comprises a camera. In some illustrative examples, a camera of number of non-contact inspection sensors 136 can be used to determine an X position and a Y position of end effector 102 relative to structure 104.

In some illustrative examples, controller 138 performs non-contact normalization 140 using surface data 137 generated from a scan of first side 120 of structure 104. End effector 102 is normalized relative to structure 104 using the cross products of normal vectors for first side 120 of structure 104. In some illustrative examples, controller 138 receives surface data 137 and performs mesh generation, tangent planes generation, and cross product vector normalization. In some illustrative examples, controller 138 moves end effector 102 based on the cross product of normal vectors determined in non-contact normalization 140 by controller 138.

Surface data 137 is generated for first surface 150 of structure 104 using number of non-contact inspection sensors 136. Meshes 141 and tangent planes 143 are generated using surface data 137. Cross product vector normalization is performed using tangent planes 143 to generate vector position 145. End effector 102 is moved to vector position 145.

In some illustrative examples, controller 138 performs movement of end effector 102 based on a normalization determination performed by computer system 142. In some illustrative examples, computer system 142 uses surface data 137 generated from a scan of first side 120 of structure 104 to determine movement for end effector 102. Computer system 142 includes communication device 144. Computer system 142 can send instructions to controller 138 via communication device 144 for performance of non-contact normalization 140.

After normalization of end effector 102, number of robots 128 perform operations on second side 146 of structure 104. In some illustrative examples, second side 146 is also referred to as outer mold line 148. As depicted, second side 146 is a surface of second part 126.

End effector 102 is normalized to structure 104. End effector 102 performs clamp-up 106 on a single side of structure 104, first side 120. To perform clamp-up 106, contact pad 118 is placed in contact with first surface 150 of structure 104. First vacuum source 114 supplies vacuum 116 to torque wrench 112 to perform clamp-up 106.

Drilling robot 130 drills hole 154 into structure 104. Drilling robot 130 drills hole 154 through second surface 152 of structure 104, through both second part 126 and first part 124. Fastener installation robot 132 installs fastener 110 through hole 154 of structure 104. End effector 102 applies collar 108 to fastener 110 when fastener 110 extends through hole 154.

Collar 108 is stored outside of end effector 102 prior to being held in torque wrench 112. Collar 108 is supplied by the outside storage to collar positioning assembly 157 in end effector 102. Collar positioning assembly 157 includes collar supply tubes 156. Collar supply tubes 156 of end effector 102 feed collars 158 through end effector 102 to collar transfer unit 160. Collar transfer unit 160 is configured to move collars 158 from collar supply tubes 156 to torque wrench 112. In some illustrative examples, collar supply tubes 156 provide the ability to feed collars 158 of multiple shapes to end effector 102.

In some illustrative examples, collar supply tubes 156 have a plurality of diameters, configured to feed collars 158 with a plurality of collar diameters. As depicted, collar 164 has diameter 166. As depicted, collar 168 has diameter 170. In some illustrative examples, diameter 166 is different than diameter 170. When diameter 166 is different from diameter 170, collar 164 is fed from a collar storage using a different one of collar supply tubes 156 than collar 168.

In some illustrative examples, collar 108 is a breakaway collar. In these illustrative examples, a portion of collar 108 is left in torque wrench after collar 108 is applied to fastener 110. In some illustrative examples, second vacuum source 174 is present in end effector 102. Second vacuum source 174 is configured to provide a second vacuum within torque wrench 112 to remove a portion of collar 108. Second vacuum source 174 provides the ability to evacuate the portion of collar 108, which may be referred to as a breakoff collar, without allowing the portion of collar 108 to fall out of torque wrench 112.

The illustration of manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although the term "robot" is used here, number of robots 128 could instead take the form of a number of end effectors. As another example, although end effector 102 is depicted, in some illustrative examples, non-contact normalization 140 is performed by controller 138 for an end effector that performs a function other than fastening.

Figure 2:
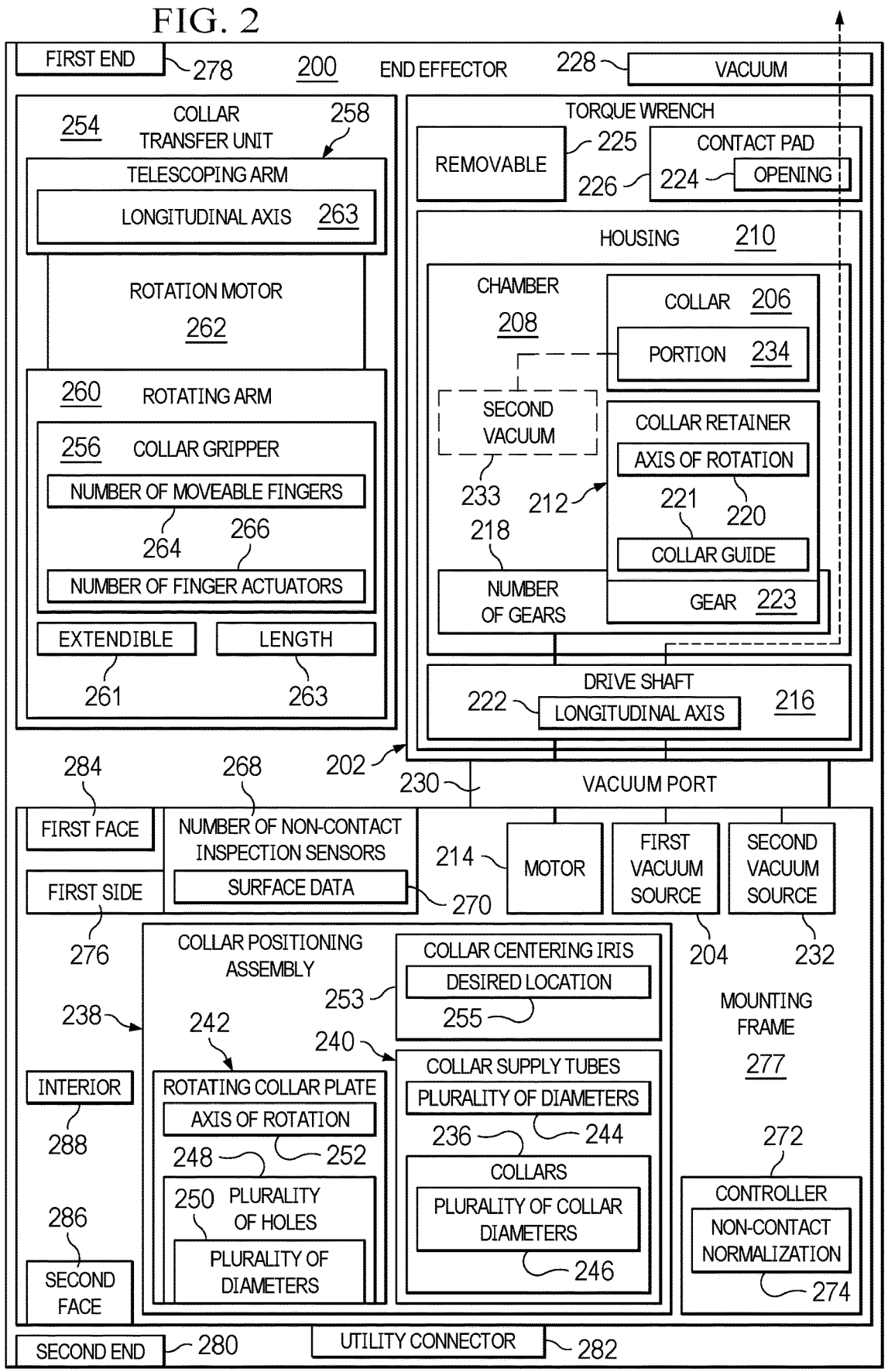
FIG. 2 is a block diagram of an end effector in accordance with an illustrative embodiment.

Turning to FIG. 2, a block diagram of an end effector is depicted in accordance with an illustrative embodiment. End effector 200 is an implementation of end effector 102 of FIG. 1. In some illustrative examples, end effector 200 is referred to as a fastening end effector.

End effector 200 comprises torque wrench 202 and first vacuum source 204. Torque wrench 202 is configured to hold collar 206 and apply a single-sided clamp-up to a structure (not depicted). Collar 206 is held within chamber 208 formed by housing 210 of torque wrench 202. Collar 206 is retained by collar retainer 212 within chamber 208 of torque wrench 202. Motor 214 provides kinetic energy to collar retainer 212 through drive shaft 216. Motor 214 drives collar retainer 212 to torque collar 206 on a fastener (not depicted). In some illustrative examples, kinetic energy is transferred from the drive shaft 216 to collar retainer 212 using number of gears 218. Number of gears 218 enables axis of rotation 220 of collar retainer 212 to be offset from longitudinal axis 222 of drive shaft 216. In some illustrative examples, torque wrench 202 comprises collar retainer 212 configured to hold collar 206 within housing 210, and collar retainer 212 is connected to gear 223 of number of gears 218 within housing 210.

In some illustrative examples, torque wrench 202 is configured to be removeable 225 and replaced. In some illustrative examples, connections between torque wrench 202 and mounting frame 277 enable release of torque wrench 202 for a replacement torque wrench. In some illustrative examples, torque wrench 202 is interchangeable. Torque wrench 202 can be removed and replaced with a different torque wrenches to provide at least one of a different size collar retainer, a different shape collar retainer, or a different offset or position of collar retainer relative to motor 214. In some illustrative examples, torque wrench 202 is replaced with another offset tool. In some illustrative examples, torque wrench 202 can be replaced with an in-line tool.

Torque wrench 202 comprises contact pad 226 configured to contact a structure (not depicted), housing 210 configured to hold collar 206, and vacuum port 230 configured to receive vacuum 228 from first vacuum source 204 and supply vacuum 228 to housing 210. Contact pad 226 comprises opening 224. Vacuum 228 travels from housing 210 through opening 224 to provide the single-sided clamp-up of the structure. Vacuum 228 travels from chamber 208 through opening 224 to provide the single-sided clamp-up of the structure.

Collar 206 is introduced to torque wrench 202 through opening 224 of contact pad 226. Collar 206 is installed onto a fastener (not depicted) that extends into opening 224 of contact pad 226.

First vacuum source 204 is pneumatically connected to torque wrench 202 and configured to supply vacuum 228 for the single-sided clamp-up. As depicted, first vacuum source 204 provides vacuum 228 to vacuum port 230. Vacuum 228 continues from vacuum port 230, through housing 210, to chamber 208 of torque wrench 202. Vacuum 228 extending through opening 224 of contact pad 226 enables the single-sided clamp-up on the structure.

In some illustrative examples, end effector 200 has second vacuum source 232 configured to provide second vacuum 233 within torque wrench 202 to remove portion 234 of collar 206. Prior to installation on a fastener (not depicted), collar 206 is retained in collar retainer 212 by portion 234 of collar 206. In some illustrative examples, collar 206 is a breakable collar and portion 234 can also be referred to as a frangible portion. In some illustrative examples, after installing collar 206 on a fastener by torquing collar 206, portion 234 of collar 206 is separated and becomes debris. In some illustrative examples, after portion 234 is separated from the remainder of collar 206, second vacuum source 232 is activated to remove portion 234 from housing 210.

End effector 200 has collar positioning assembly 238 comprising collar supply tubes 240 and rotating collar plate 242. Collar supply tubes 240 have plurality of diameters 244, configured to hold collars 236 with plurality of collar diameters 246. In some illustrative examples, collar supply tubes 240 provide the ability to transport collars 236 of multiple shapes inside end effector 200.

Rotating collar plate 242 has plurality of holes 248 with plurality of diameters 250 configured to hold plurality of collar diameters 246. Rotating collar plate 242 is used to select and remove a collar of a desired diameter from collar supply tubes 240. Rotating collar plate 242 rotates about axis of rotation 252 until a desired hole of plurality of holes 248 is positioned relative to a respective one of collar supply tubes 240. The desired hole has a selected diameter. The desired hole receives a collar of collars 236 that has the selected diameter.

Collar transfer unit 254 removes a collar from collar positioning assembly 238. In some illustrative examples, collar transfer unit 254 is configured to take a collar from rotating collar plate 242 and move it to torque wrench 202. In these illustrative examples, plurality of holes 248 and their positions in rotating collar plate 242 are configured such that rotating collar plate 242 positions the collar for collar transfer unit 254 to remove the collar. In these illustrations, collar plate 242 is configured such that arc lengths and rotations are the same regardless of size of collar.

In some illustrative examples, collar transfer unit 254 is configured to take a collar from collar centering iris 253. When present, collar centering iris 253 receives a collar from rotating collar plate 242. When present, collar centering iris 253 locates a collar such that a respective center of the collar is at desired location 255 for transfer to collar transfer unit 254.

Collar centering iris 253 is configured to hold a collar having any of plurality of collar diameters 246. Collar centering iris 253 is self-centering for a collar of any of plurality of collar diameters 246. In some illustrative examples, collar centering iris 253 is configured to hold a collar by either a round end or a hexagonal end of the collar. In some illustrative examples, collar centering iris 253 has six points of contact.

Collar transfer unit 254 comprises collar gripper 256 connected to telescoping arm 258. Telescoping arm 258 is configured to extend away from collar positioning assembly 238. In some illustrative examples, collar transfer unit 254 can be referred to as an adjustable wrench.

Collar transfer unit 254 further comprises rotating arm 260 connected to telescoping arm 258 by rotation motor 262. Collar gripper 256 is directly connected to collar transfer head 265 on the end of rotating arm 260. Rotating arm 260 rotates about longitudinal axis 263 using rotation motor 262.

In some illustrative examples, rotating arm 260 is extendible 261. When rotating arm 260 is extendible, rotating arm 260 changes length 267 to transfer a collar from collar positioning assembly 238 to torque wrench 202. In some illustrative examples, rotating arm 260 has length 267 that is set. When rotating arm 260 has length 267 that is set, length 267 remains the same as a collar is transferred from collar positioning assembly 238 to torque wrench 202 by collar transfer unit 254.

In some illustrative examples, rotating arm 260 is interchangeable. When rotating arm 260 is interchangeable, rotating arm 260 can be replaced with another rotating arm. In some illustrative examples, rotating arm 260 is replaced with a rotating arm having a length different than length 267.

Collar gripper 256 comprises number of moveable fingers 264 connected to number of finger actuators 266. Number of moveable fingers 264 are actuated using number of finger actuators 266 to move between a compact state and extended states. In the compact state, number of moveable fingers 264 can be inserted into any of collars 236. Number of moveable fingers 264 can be moved away from each other to enter an extended state and engage a collar of collars 236. In some illustrative examples, number of moveable fingers 264 is moved a preset amount based upon a collar diameter of the collar of collars 236. In some illustrative examples, number of moveable fingers 264 is moved a preset amount based upon a desired collar diameter of plurality of collar diameters 246.

In some illustrative examples, number of finger actuators 266 is pneumatic and number of moveable fingers 264 is pneumatically controlled. In some illustrative examples, number of moveable fingers 264 is pneumatically controlled with contact force sensing to control force sensing to control the grip force on the collar. In some illustrative examples, number of finger actuators 266 is selected from one of electric, mechanical, hydraulic, or pneumatic. Type of actuator for number of finger actuators 266 is selected based on desired characteristics for end effector 102. Number of finger actuators 266 is selected based on desired values of weight, cost, complexity, and precision.

As depicted, end effector 200 comprises number of non-contact inspection sensors 268. Number of non-contact inspection sensors 268 is configured to scan a surface (not depicted) of the structure (not depicted) to generate surface data 270. Number of non-contact inspection sensors 268 is positioned outside of interior 288 to scan the surface of the structure. In some illustrative examples, number of non-contact inspection sensors 268 is mounted to first side 276 of mounting frame 277.

Number of non-contact inspection sensors 268 includes any desirable type of non-contact inspection sensors. In some illustrative examples, number of non-contact inspection sensors 268 comprises a number of distance sensors and a number of scanning sensors. In some illustrative examples, number of non-contact inspection sensors 268 includes a distance laser. In some illustrative examples, number of non-contact inspection sensors 268 includes at least one line laser. In some illustrative examples, number of non-contact inspection sensors 268 includes mutually perpendicular scanners. In some illustrative examples, number of non-contact inspection sensors 268 includes a camera.

Controller 272 is configured to perform non-contact normalization 274 using surface data 270. In some illustrative examples, controller 272 performs non-contact normalization 274 using surface data 270 generated from a scan of a first side of a structure. End effector 200 is normalized relative to the structure (not depicted) using the cross products of normal vectors for the first side of the structure. In some illustrative examples, controller 272 receives surface data 270 and performs mesh generation, tangent planes generation, and cross product vector normalization. In some illustrative examples, controller 272 moves end effector 200 based on the cross product of normal vectors determined in non-contact normalization 274 by controller 272. In some illustrative examples, controller 272 performs movement of end effector 200 based on a normalization determination performed by a computer system external to end effector 200.

End effector 200 comprises torque wrench 202 with contact pad 226, housing 210 configured to hold collar 206, and vacuum port 230 configured to supply vacuum 228 to housing 210. Torque wrench 202 further comprises collar retainer 212 configured to hold collar 206 within housing 210, collar retainer 212 is connected to gear 223 of number of gears 218 within housing 210. Torque wrench 202 further comprises drive shaft 216 extending through vacuum port 230 and interfacing with one of number of gears 218. Contact pad 226 comprises an opening 224, wherein the vacuum 228 travels from the chamber 208 through the opening 224 to provide single-sided clamp-up of a structure (not depicted) by end effector 200.

As depicted, end effector 200 comprises number of non-contact inspection sensors 268. Number of non-contact inspection sensors 268 is mounted to first side 276 of mounting frame 277. End effector 200 has first end 278 and second end 280. Number of non-contact inspection sensors 268 is mounted such that number of non-contact inspection sensors 268 is oriented to scan a surface adjacent to first end 278 of end effector 200.

Torque wrench 202 is positioned to perform fastening operations on a structure positioned relative to first end 278 of end effector 200. Utility connector 282 is positioned on second end 280 of end effector 200. Utility connector 282 is configured to receive utilities such as electricity, pneumatic, vacuum, or any other desirable utilities. Utility connector 282 is configured to connect end effector 200 to a robotic arm or other robotic device.

Mounting frame 277 of end effector 200 has first face 284 and second face 286 with interior 288 between first face 284 and second face 286. As depicted, collar supply tubes 240 extend through interior 288 of mounting frame 277. Vacuum port 230 is connected, either directly or indirectly, to first face 284 of mounting frame 277. At least a portion of collar transfer unit 254 is positioned outside of interior 288 of mounting frame 277. Torque wrench 202 is positioned outside of interior 288 of mounting frame 277.

The illustration of end effector 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, number of gears 218 can be optional. In some illustrative examples, collar retainer 212 is in-line with drive shaft 216 and number of gears 218 is not present.

Figure 3:
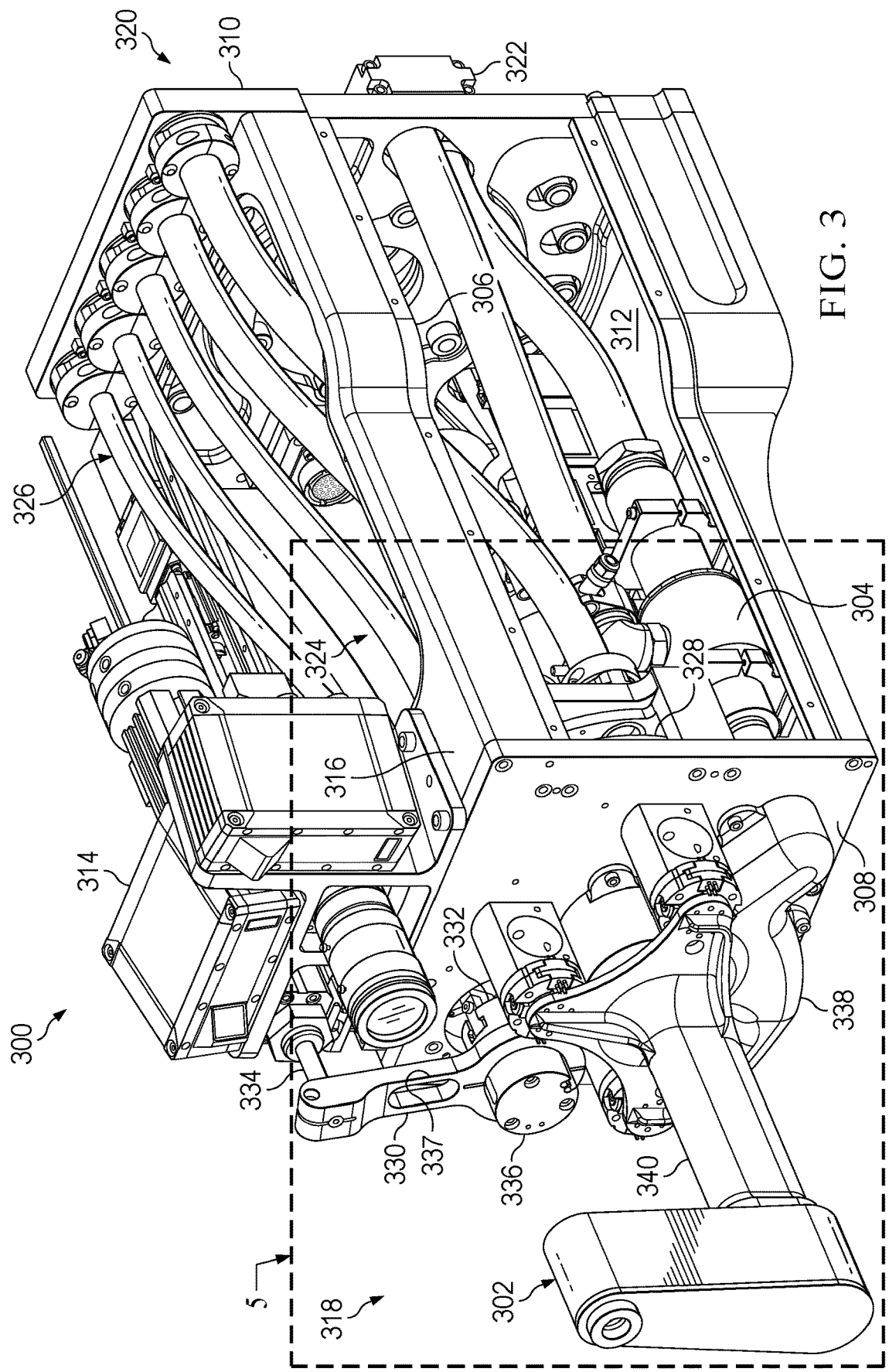
FIG. 3 is an isometric view of an end effector in accordance with an illustrative embodiment.

Turning to FIG. 3, an isometric view of an end effector is depicted in accordance with an illustrative embodiment. End effector 300 is a physical implementation of end effector 102 of FIG. 1. End effector 300 is a physical implementation of end effector 200 of FIG. 2.

End effector 300 comprises torque wrench 302 and first vacuum source 304. As depicted, first vacuum source 304 is present within mounting frame 306 which has first face 308, second face 310, and interior 312 between first face 308 and second face 310. First vacuum source 304 is positioned within interior 312. Torque wrench 302 is mounted to first face 308 of mounting frame 306. In some illustrative examples, first face 308 can be referred to as a front face.

As depicted, end effector 300 comprises number of non-contact inspection sensors 314. Number of non-contact inspection sensors 314 is mounted to first side 316 of mounting frame 306. End effector 300 has first end 318 and second end 320. Number of non-contact inspection sensors 314 is mounted such that number of non-contact inspection sensors 314 is oriented to scan a surface adjacent to first end 318 of end effector 300.

Torque wrench 302 is positioned to perform fastening operations on a structure positioned relative to first end 318 of end effector 300. Utility connector 322 is positioned on second end 320 of end effector 300. Utility connector 322 is configured to receive utilities such as electricity, pneumatic, vacuum, or any other desirable utilities. Utility connector 322 is configured to connect end effector 300 to a robotic arm or other robotic device.

End effector 300 has collar positioning assembly 324 comprising collar supply tubes 326 and rotating collar plate 328. Collar supply tubes 326 store a plurality of collars within end effector 300. Rotating collar plate 328 is configured to supply the collars from collar supply tubes 326 to collar transfer unit 330. Collar transfer unit 330 comprises collar gripper 332 connected to telescoping arm 334. Telescoping arm 334 is configured to extend away from collar positioning assembly 324.

As depicted, collar gripper 332 is directly connected to collar transfer head 336. In this illustrative example, collar transfer head 336 is a portion of collar transfer unit 330. Collar transfer head 336 is connected to telescoping arm 334 by a rotation motor (not depicted) and rotating arm 337. In this illustrative example, rotating arm 337 has a set length. In other non-depicted examples, rotating arm 337 can be extendible.

First vacuum source 304 is pneumatically connected to vacuum port 338. Vacuum port 338 connects housing 340 of torque wrench 302 to first vacuum source 304. First vacuum source 304 provides a vacuum for single-sided clamp-up of a structure using end effector 300.

Figure 4:
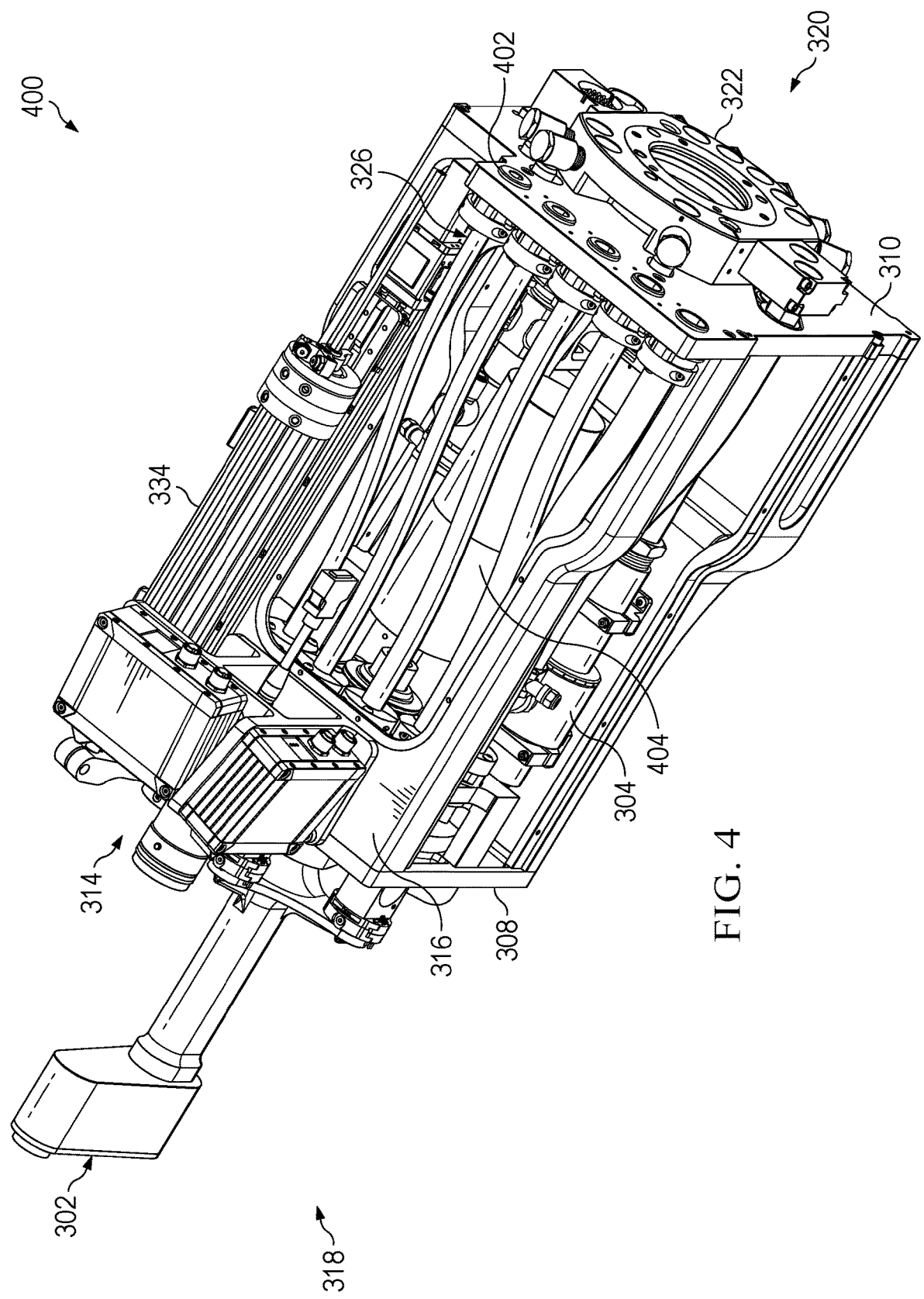
FIG. 4 is a top isometric view of an end effector in accordance with an illustrative embodiment.

Turning to FIG. 4, a top isometric view of an end effector is depicted in accordance with an illustrative embodiment. View 400 is a top isometric view of end effector 300 of FIG. 3. In view 400, utility connector 322 is visible. In view 400, openings 402 for collar supply tubes 326 are visible. Openings 402 are provided to receive collars of different diameters within collar supply tubes 326.

Motor 404 is also visible in view 400. Motor 404 provides kinetic energy to torque wrench 302 to apply torque to a collar within torque wrench 302.

Figure 5:
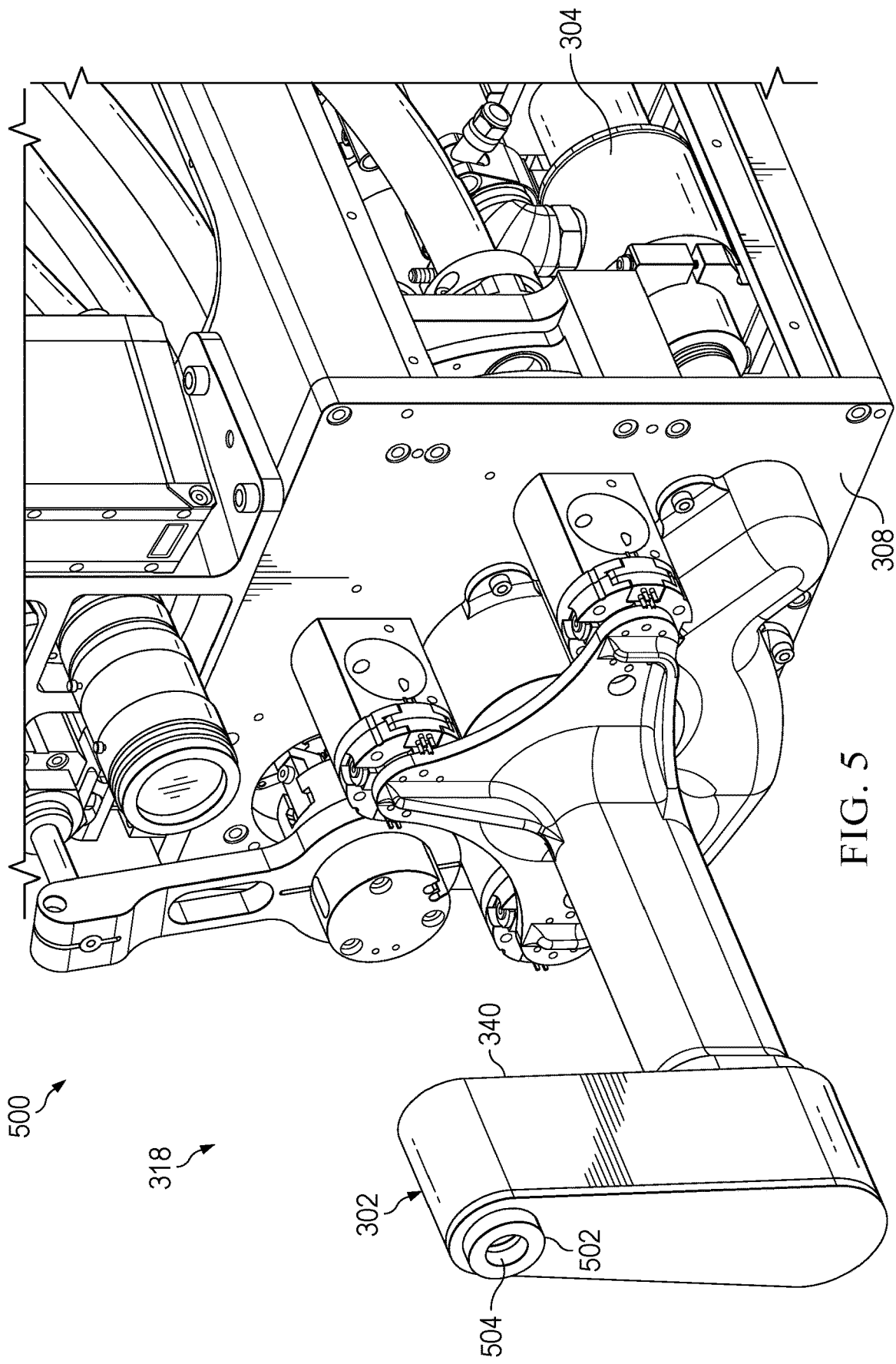
FIG. 5 is an isometric view of a torque wrench and front end of an end effector in accordance with an illustrative embodiment.

Turning to FIG. 5, an isometric view of a torque wrench and front end of an end effector is depicted in accordance with an illustrative embodiment. View 500 is an isometric view of a portion of end effector 300 of FIG. 3. In view 500, contact pad 502 and housing 340 of torque wrench 302 are visible. Contact pad 502 is configured to contact a surface of a structure. Contact pad 502 has opening 504 through which vacuum is applied to the surface of the structure to provide a single-sided clamp-up. The vacuum is supplied by first vacuum source 304.

Figure 6:
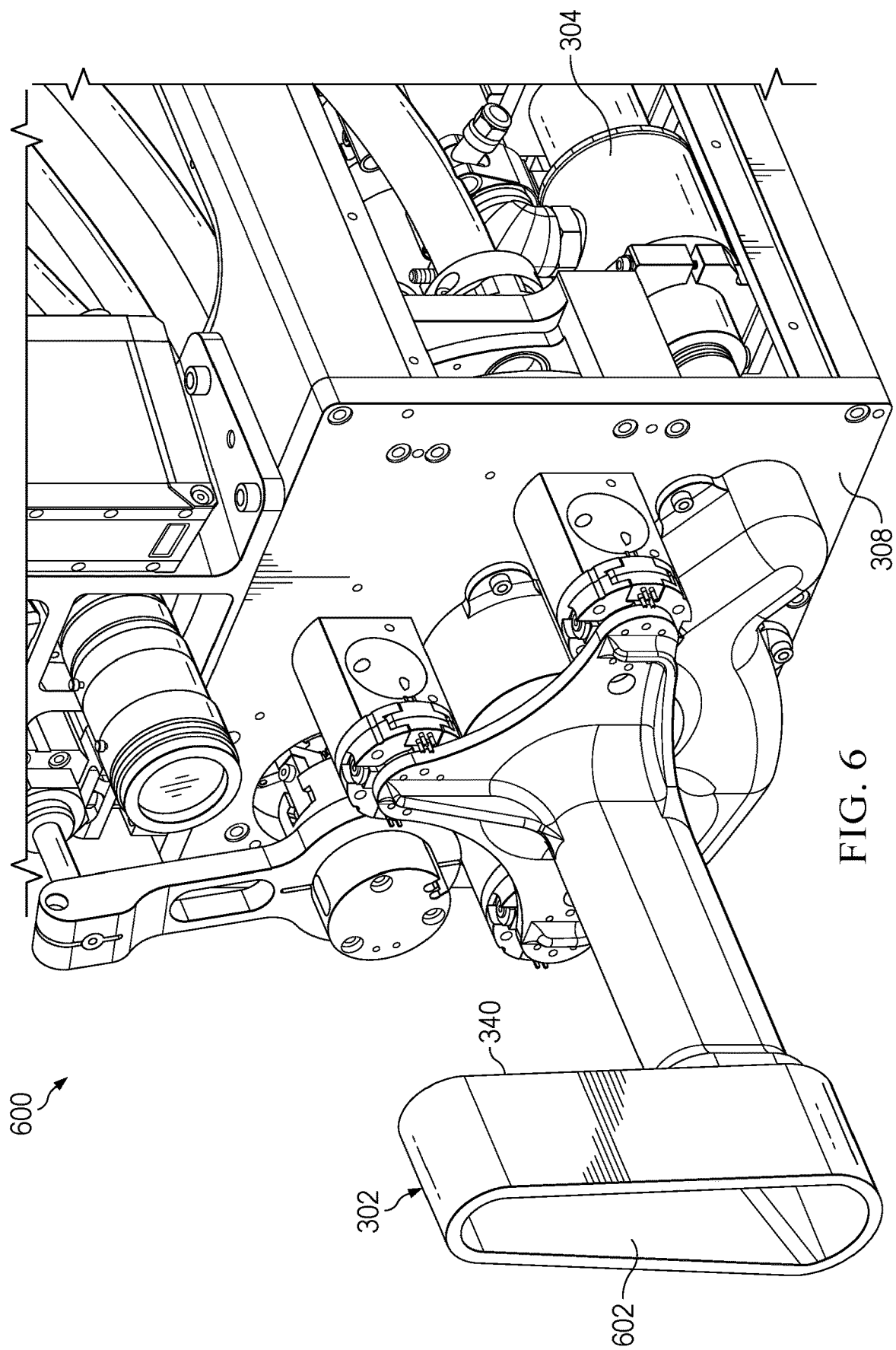
FIG. 6 is an isometric view of a torque wrench and front end of an end effector in accordance with an illustrative embodiment.

Turning to FIG. 6, an isometric view of a torque wrench and front end of an end effector is depicted in accordance with an illustrative embodiment. In view 600 a portion of housing 340 of torque wrench 302 has been removed. Contact pad 502 has also been removed in view 600. In view 600, chamber 602 of torque wrench 302 is visible. During operation, a collar (not depicted) is held within chamber 602. During use of torque wrench 302, vacuum flows through chamber 602 and exits through opening 504 of contact pad 502 seen in FIG. 5.

Figure 7:
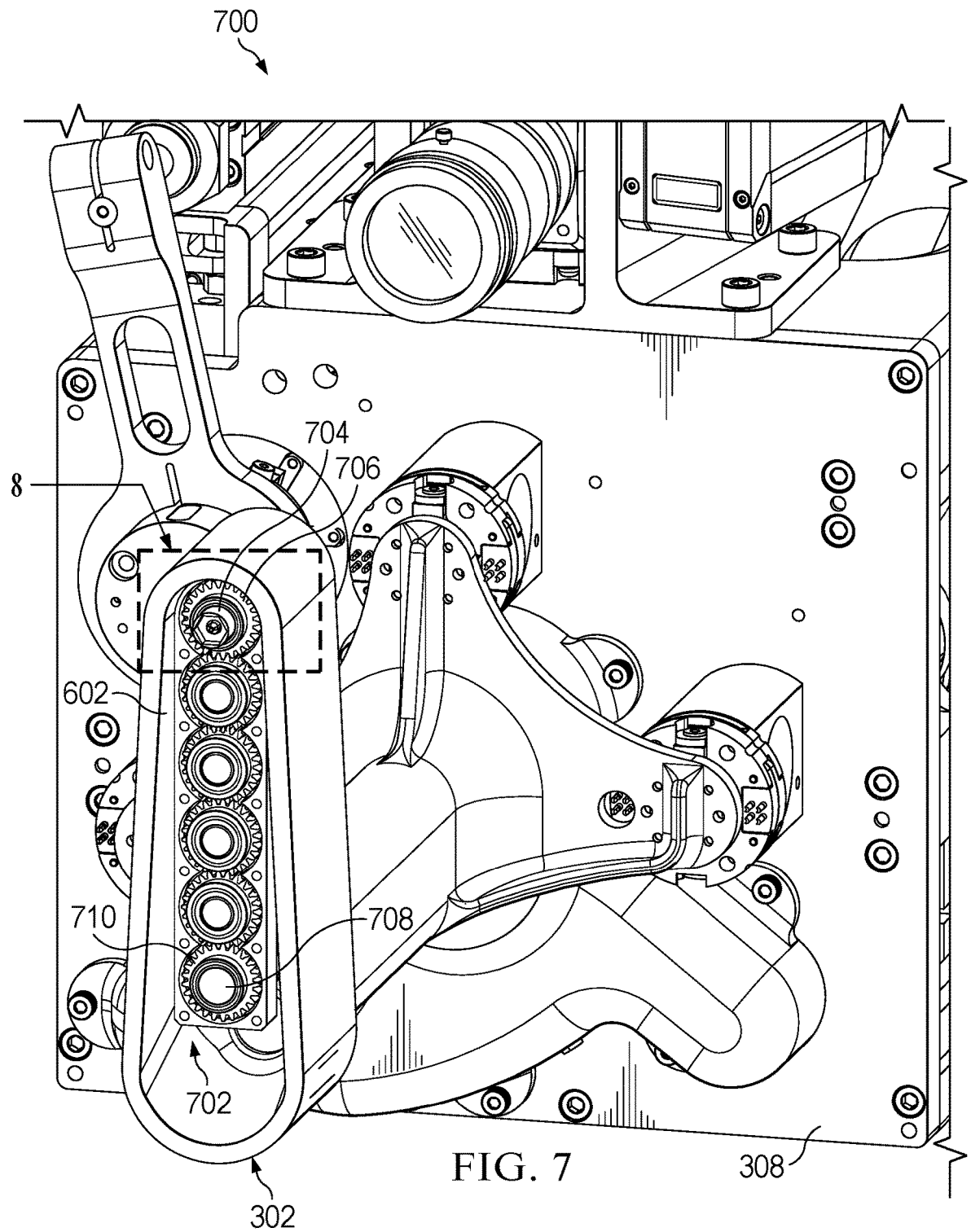
FIG. 7 is an isometric front view of a torque wrench and front end of an end effector in accordance with an illustrative embodiment.

Turning to FIG. 7, an isometric front view of a torque wrench and front end of an end effector is depicted in accordance with an illustrative embodiment. View 700 is a front isometric view of torque wrench 302 with a portion of housing 340 removed. In view 700, number of gears 702 is visible within chamber 602. Collar retainer 704 is attached to gear 706 of number of gears 702. Number of gears 702 transfer rotational energy from a drive shaft 708 to collar retainer 704. As depicted, drive shaft 708 is directly connected to gear 706 of number of gears 702.

Figure 8:
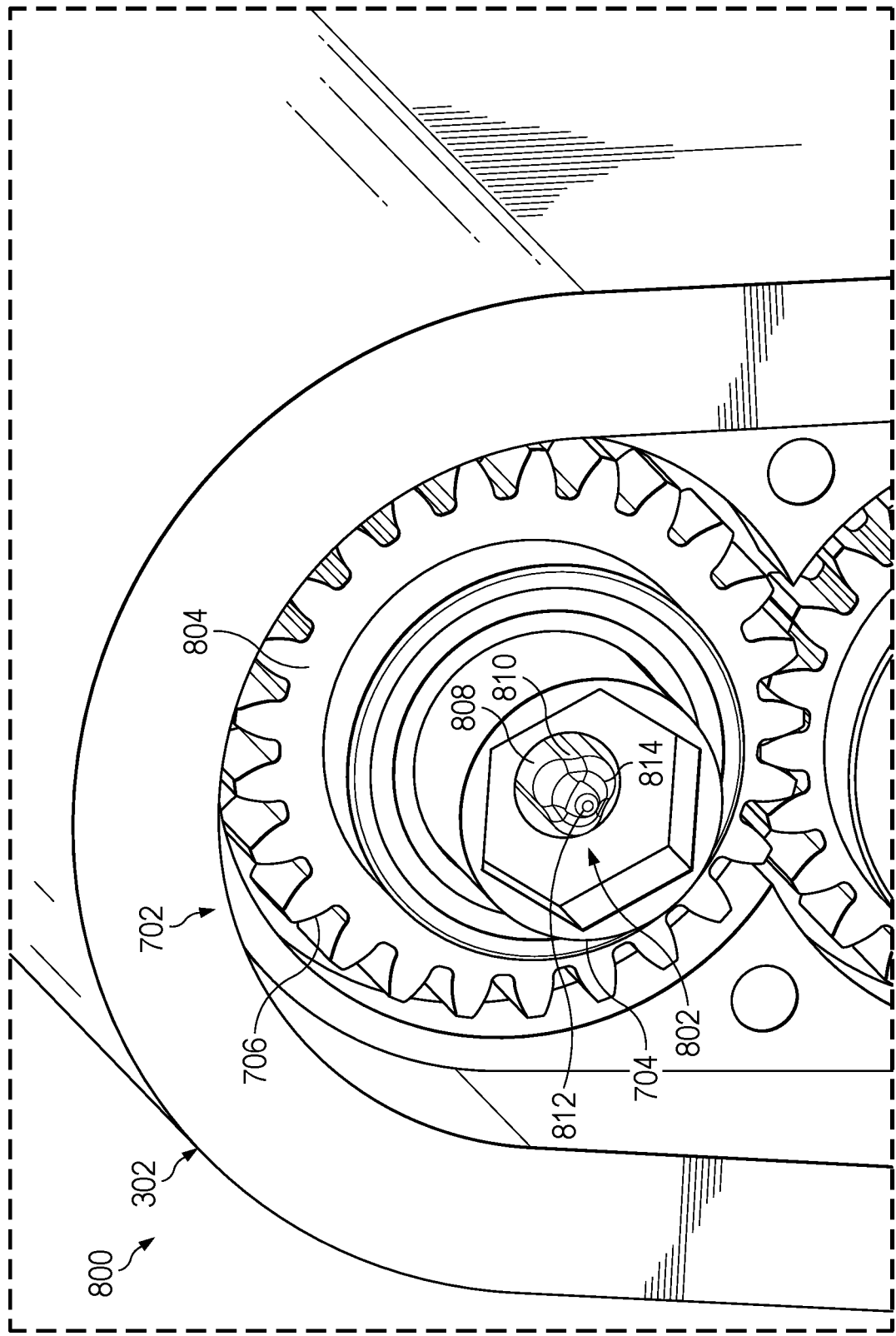
FIG. 8 is an isometric view of a collar retainer in a torque wrench of an end effector in accordance with an illustrative embodiment.

Turning to FIG. 8, an isometric view of a collar retainer in a torque wrench of an end effector is depicted in accordance with an illustrative embodiment. View 800 is a closer view of collar retainer 704 of FIG. 7. As depicted, collar retainer 704 takes the form of socket 802. Socket 802 is connected to face 804 of gear 706. Socket 802 is selected to interface with a collar (not depicted) of a preset diameter. Socket 802 is positioned such that socket 802 faces away from first face 308 of mounting frame 306 of FIG. 3. To provide a socket to interface with a collar having a different diameter, torque wrench 302 can be removed and replaced with a torque wrench having a collar retainer with a different size (not depicted).

In some illustrative examples, collar guide 808 is present in torque wrench 302. As depicted, collar guide 808 takes the form of tri-lobe wrench 810. Tri-lobe wrench 810 is positioned within socket 802 to guide a collar into socket 802. Tri-lobe wrench 806 has pilot center 812 and lobes 814.

Figure 9:
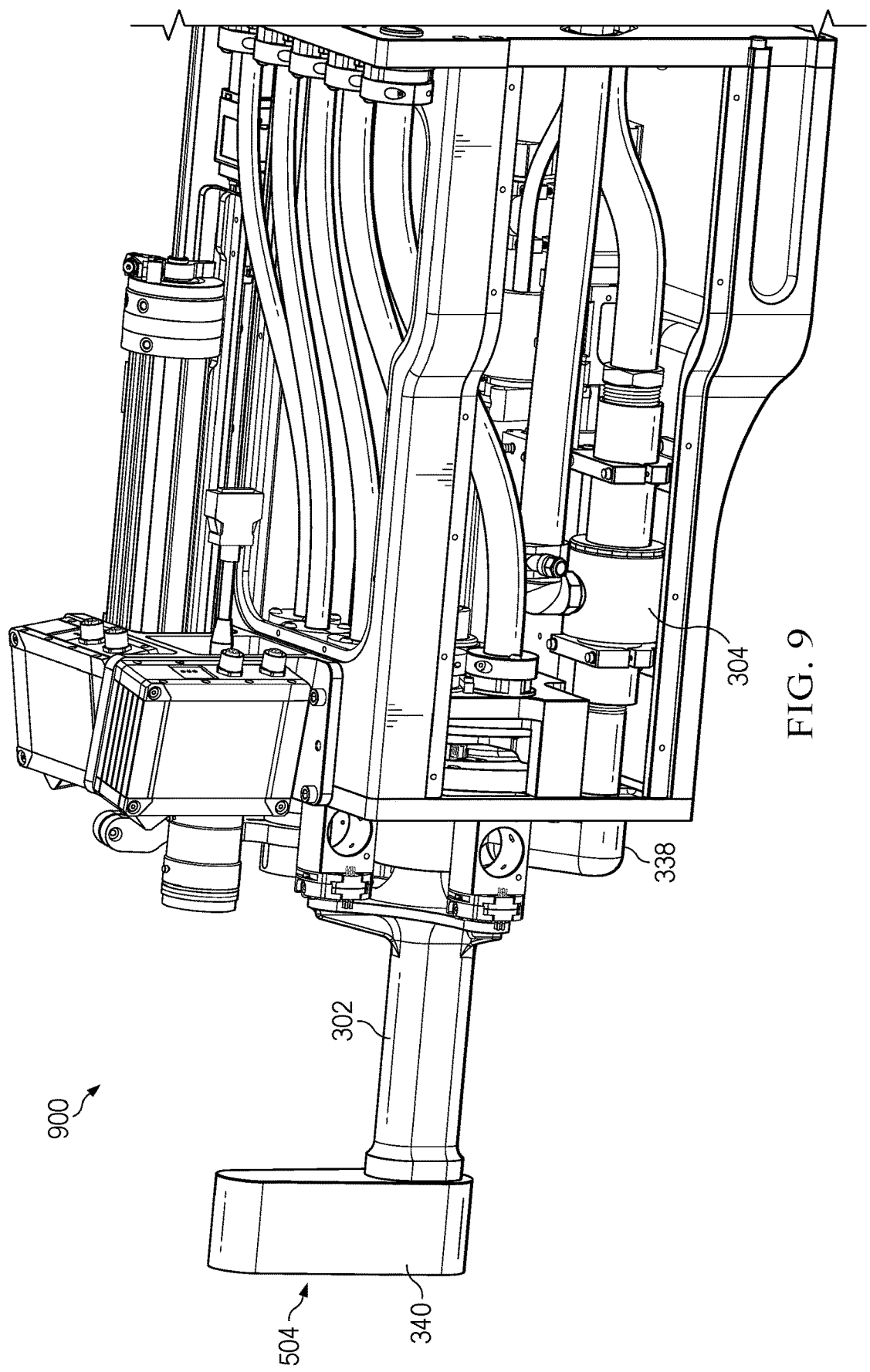
FIG. 9 is a side isometric view of an end effector in accordance with an illustrative embodiment.

Turning to FIG. 9, a side isometric view of an end effector is depicted in accordance with an illustrative embodiment. View 900 is a side view of end effector 300 of FIG. 3. Connections between first vacuum source 304 and housing 340 of torque wrench 302 is more clearly seen in view 900.

Figure 10:
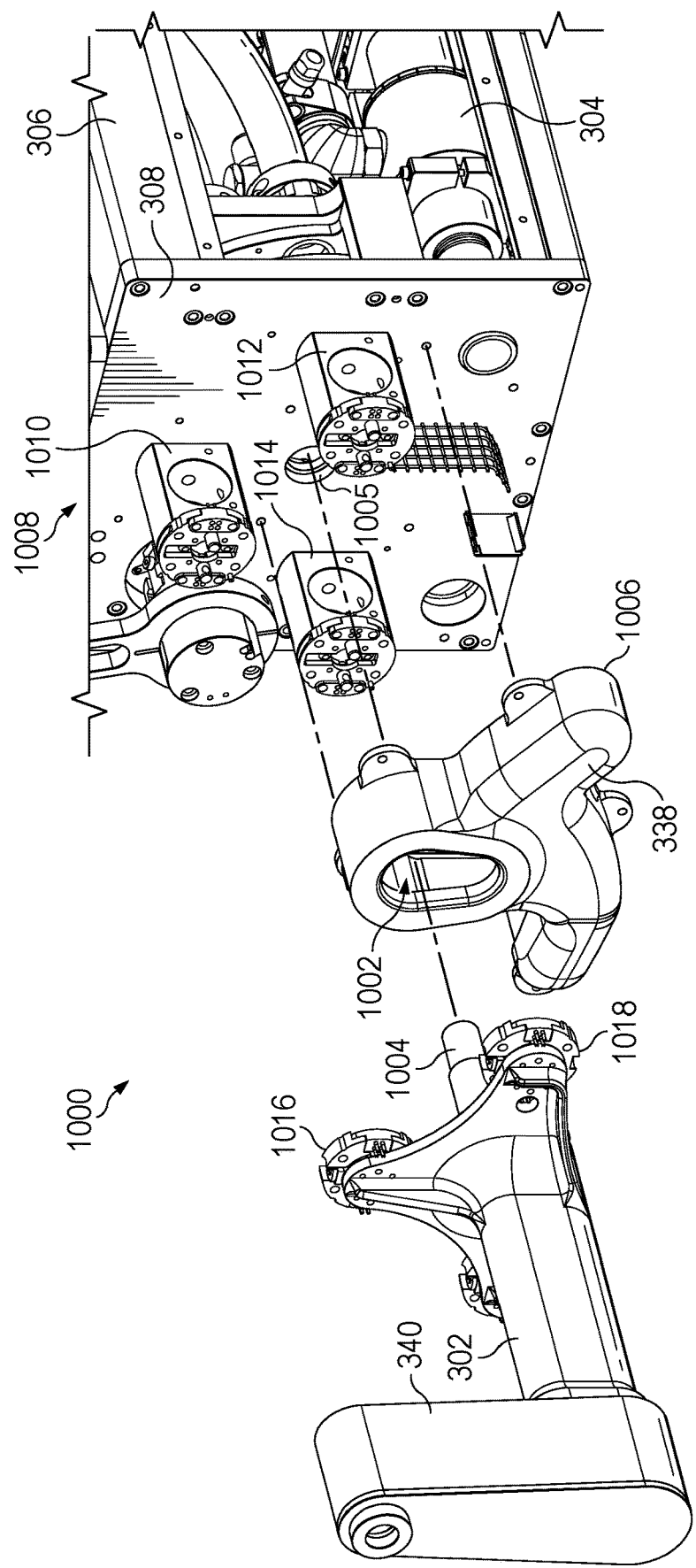
FIG. 10 is a partially exploded isometric front view of a torque wrench and front end of an end effector in accordance with an illustrative embodiment.

Turning to FIG. 10, a partially exploded isometric front view of a torque wrench and front end of an end effector is depicted in accordance with an illustrative embodiment. View 1000 is a partially exploded view of end effector 300 of FIG. 3. In view 1000 vacuum port 338 and torque wrench 302 are exploded from the remainder of end effector 300. Vacuum port 338 comprises hole 1002 through which drive shaft 1004 of torque wrench 302 passes when torque wrench 302 is connected to end effector 300. When torque wrench 302 is connected to end effector 300, drive shaft 1004 of torque wrench 302 extends through hole 1005 in first face 308 of mounting frame 306. By extending through hole 1005 in first face 308 of mounting frame 306, drive shaft 1004 will connect to a motor (not depicted) within interior 312 of end effector 300 of FIG. 3.

Vacuum port 338 seals to housing 340 adjacent hole 1002. Vacuum port 338 interfaces with first vacuum source 304 at location 1006.

Plurality of mounts 1008 is also visible in view 1000. Plurality of mounts 1008 include mount 1010, mount 1012, and mount 1014. Plurality of mounts 1008 enables release of torque wrench 302 for a replacement torque wrench. Torque wrench 302 is interchangeable. Torque wrench 302 includes connector 1016, connector 1018, and a third connector (not visible), each configured to connect to a respective mount of plurality of mounts 1008. Connector 1016 is configured to connect to mount 1010. Connector 1018 is configured to connect to mount 1012. In some illustrative examples, torque wrench 302 is an interchangeable wrench. In these illustrative examples, torque wrench 302 can be removed to change to a torque wrench providing at least one of a different offset or size of collar retainer. The shape of a torque wrench connected to end effector 300 can be selected based on an area of the structure to be worked on.

Figure 11:
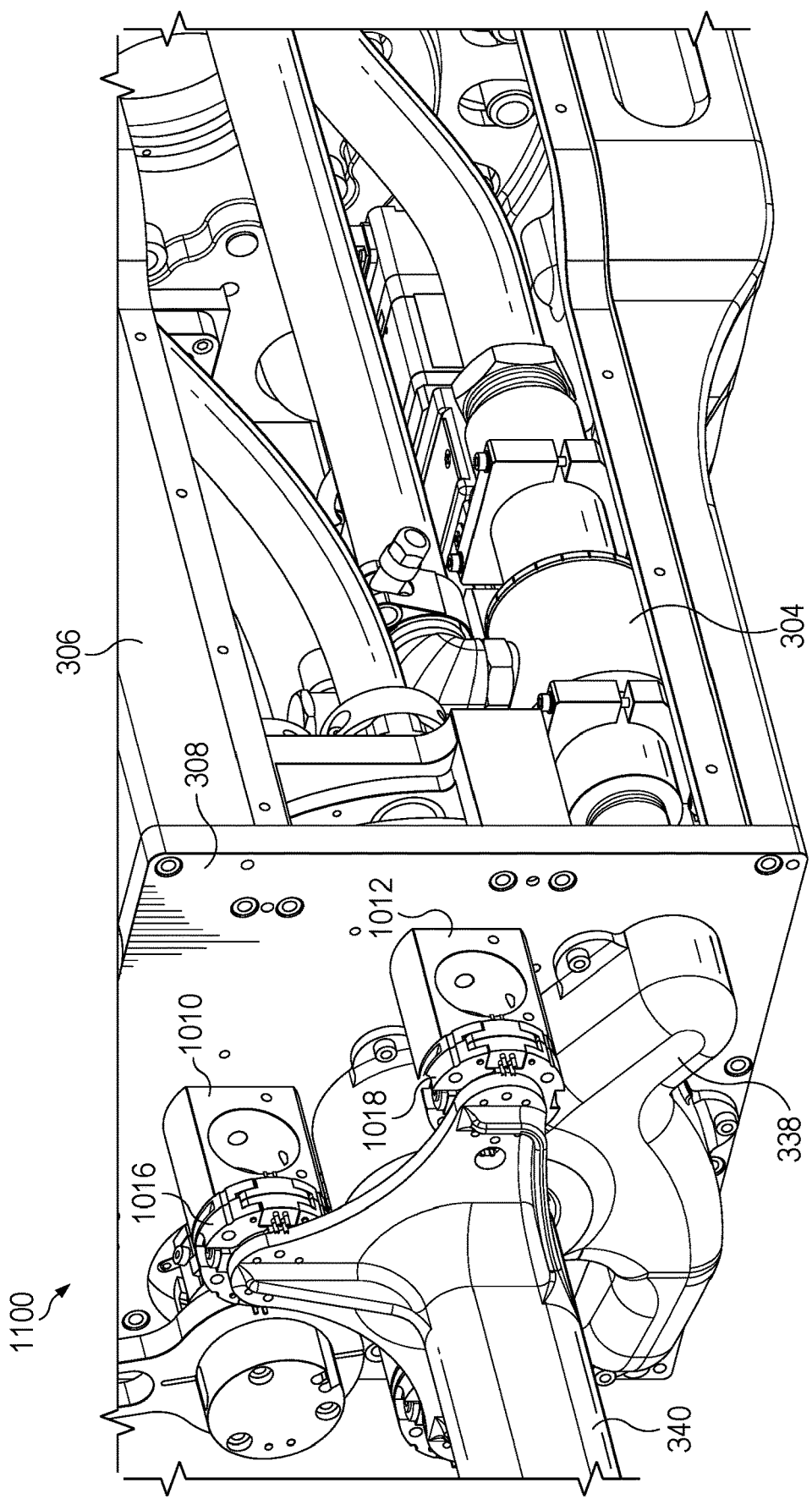
FIG. 11 is an isometric view of a mounting frame of an end effector in accordance with an illustrative embodiment.

Turning to FIG. 11, an isometric view of a mounting frame of an end effector is depicted in accordance with an illustrative embodiment. View 1100 is a closer view of connections between torque wrench 302 and plurality of mounts 1008 in FIG. 10 on first face 308 of mounting frame 306. As depicted, connector 1016 is connected to mount 1010. Connector 1018 is connected to mount 1012. Although not visible in view 1100, a third connector is connected to mount 1014.

Figure 12:
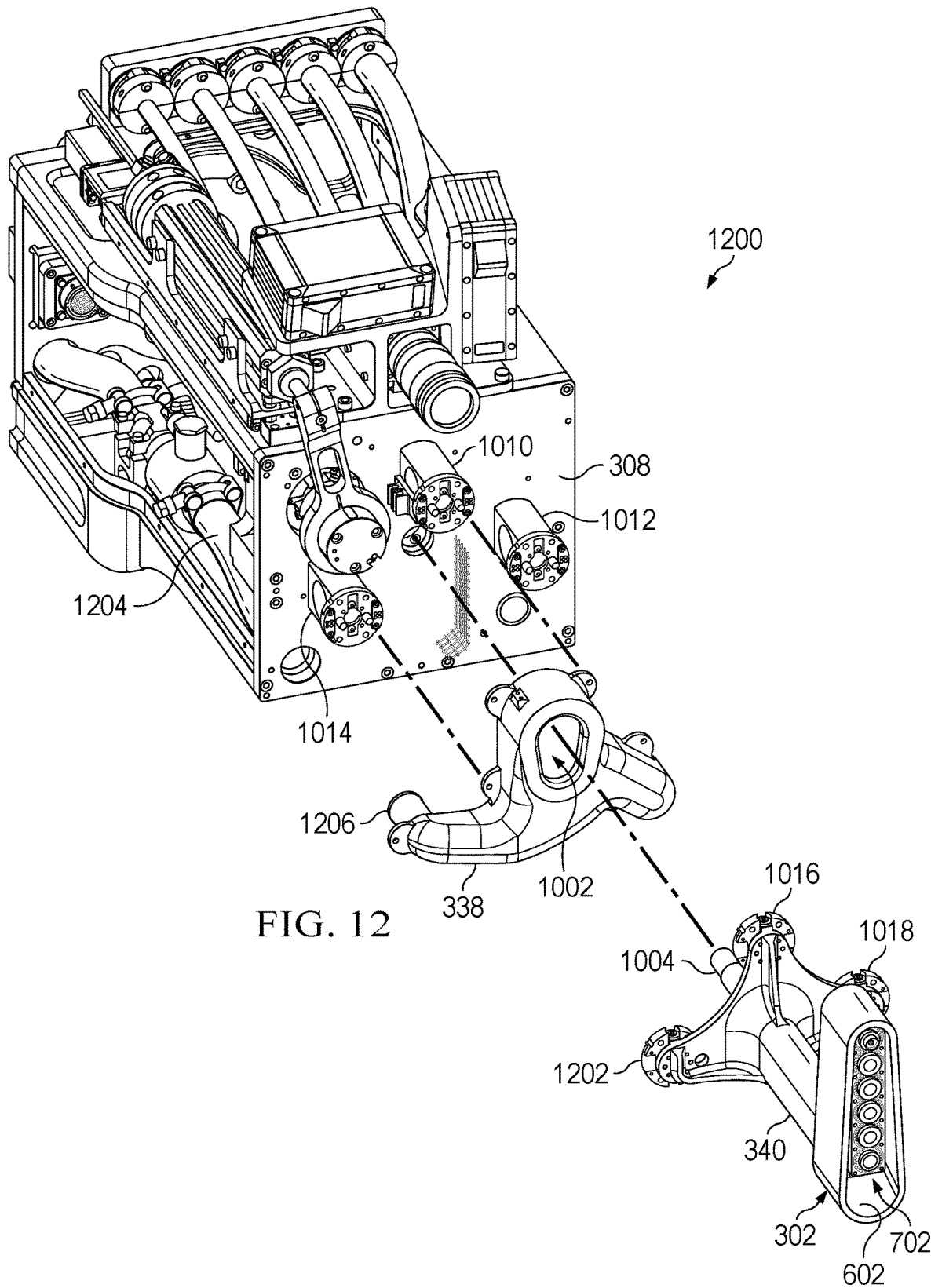
FIG. 12 is an exploded isometric front view of a torque wrench and front end of an end effector in accordance with an illustrative embodiment.

Turning to FIG. 12, an exploded isometric front view of a torque wrench and front end of an end effector is depicted in accordance with an illustrative embodiment. View 1200 is another partially exploded view from a different angle. In view 1200, connector 1202, that is configured to connect to mount 1014, is visible. Second vacuum source 1204 is also visible in view 1200. Second vacuum source 1204 supplies a second vacuum to torque wrench 302. The second vacuum can remove a portion of a collar from chamber 602 of torque wrench 302. The portion of the collar is broken off during application of the collar to a fastener.

Second vacuum source 1204 is pneumatically connected to torque wrench 302 through vacuum port 338. Second vacuum source 1204 connects to vacuum port 338 at location 1206. Second vacuum source 1204 is configured to evacuate a breakoff collar without allowing the breakoff collar to fall out of end effector 300.

Figure 13:
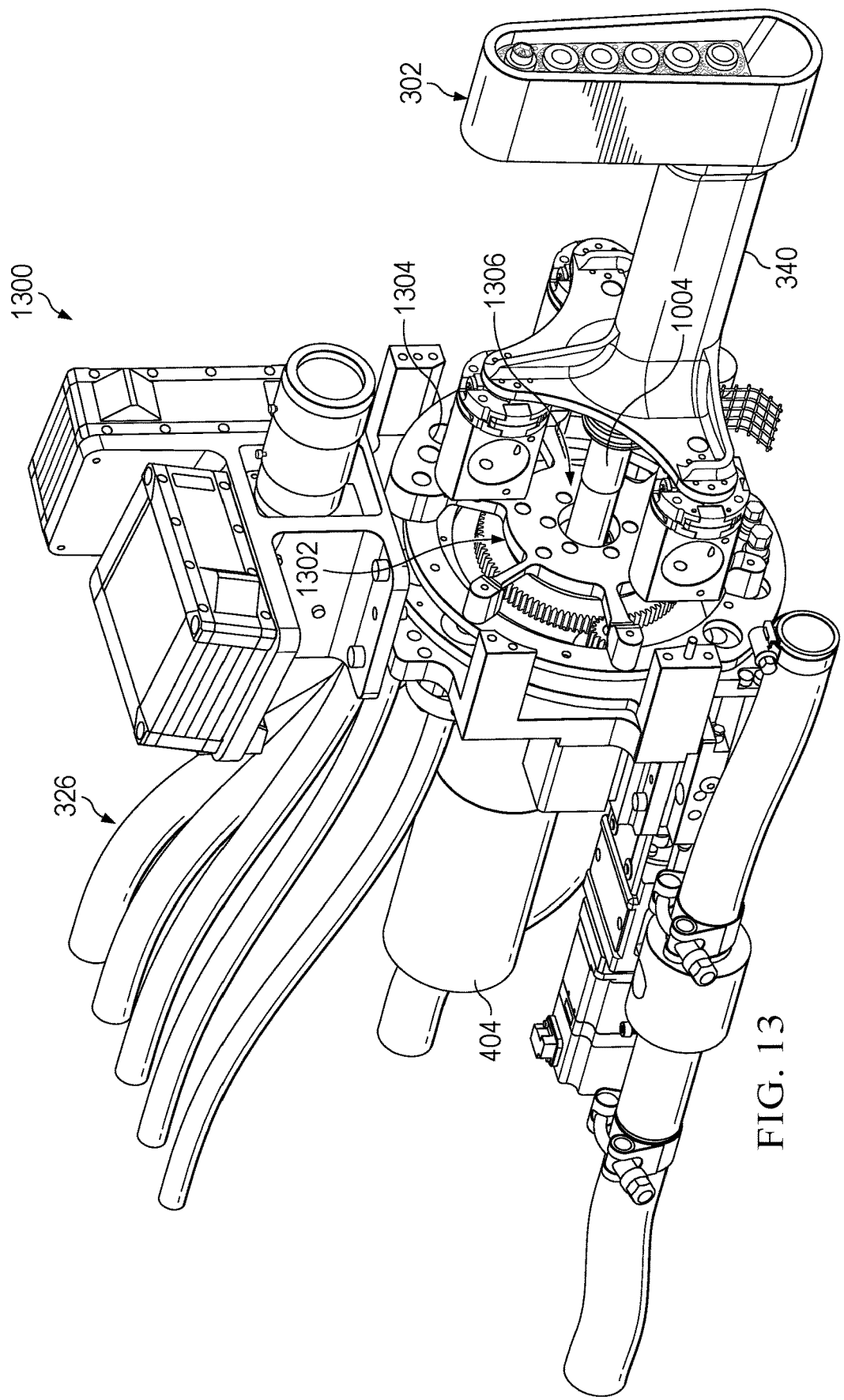
FIG. 13 is an isometric view of components of an end effector in accordance with an illustrative embodiment.

Turning to FIG. 13, an isometric view of components of an end effector is depicted in accordance with an illustrative embodiment. In view 1300, first face 308 of mounting frame 306 and vacuum port 338 have been removed from the illustration for ease of viewing rotating collar plate 1302. Rotating collar plate 1302 is a physical implementation of rotating collar plate 242 of FIG. 2.

Rotating collar plate 1302 comprises plurality of holes 1304. As depicted, plurality of holes 1304 has a plurality of diameters. Each of plurality of holes 1304 has a diameter configured to hold a collar. A collar from one of collar supply tubes 326 is selected by rotation of rotating collar plate 1302 until a desired hole of plurality of holes 1304 aligns with a respective collar supply tube of collar supply tubes 326.

Drive shaft 1004 extends through hole 1306 in rotating collar plate 1302. By extending through hole 1306, drive shaft 1004 connects to motor 404.

Figure 14:
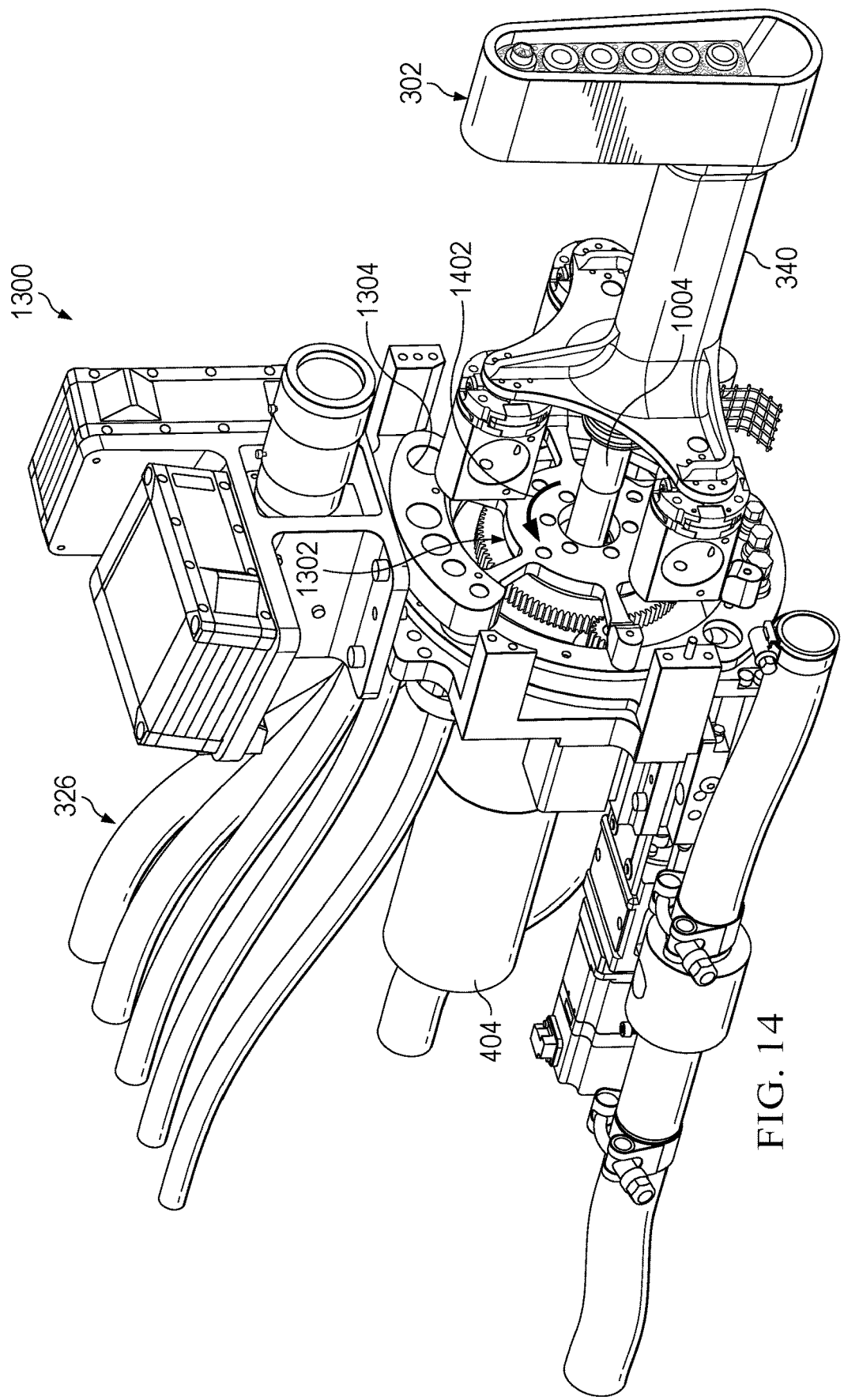
FIG. 14 is an isometric view of components of an end effector in accordance with an illustrative embodiment.

Turning to FIG. 14, an isometric view of components of an end effector is depicted in accordance with an illustrative embodiment. In view 1400, first face 308 of mounting frame 306 and vacuum port 338 have been removed from the illustration for ease of viewing rotating collar plate 1302. In view 1400, rotating collar plate 1302 has rotated in direction 1402 from view 1300. Rotating in direction 1402 is an example of moving rotating collar plate 1302 to select a collar with a desired diameter.

Figure 15:
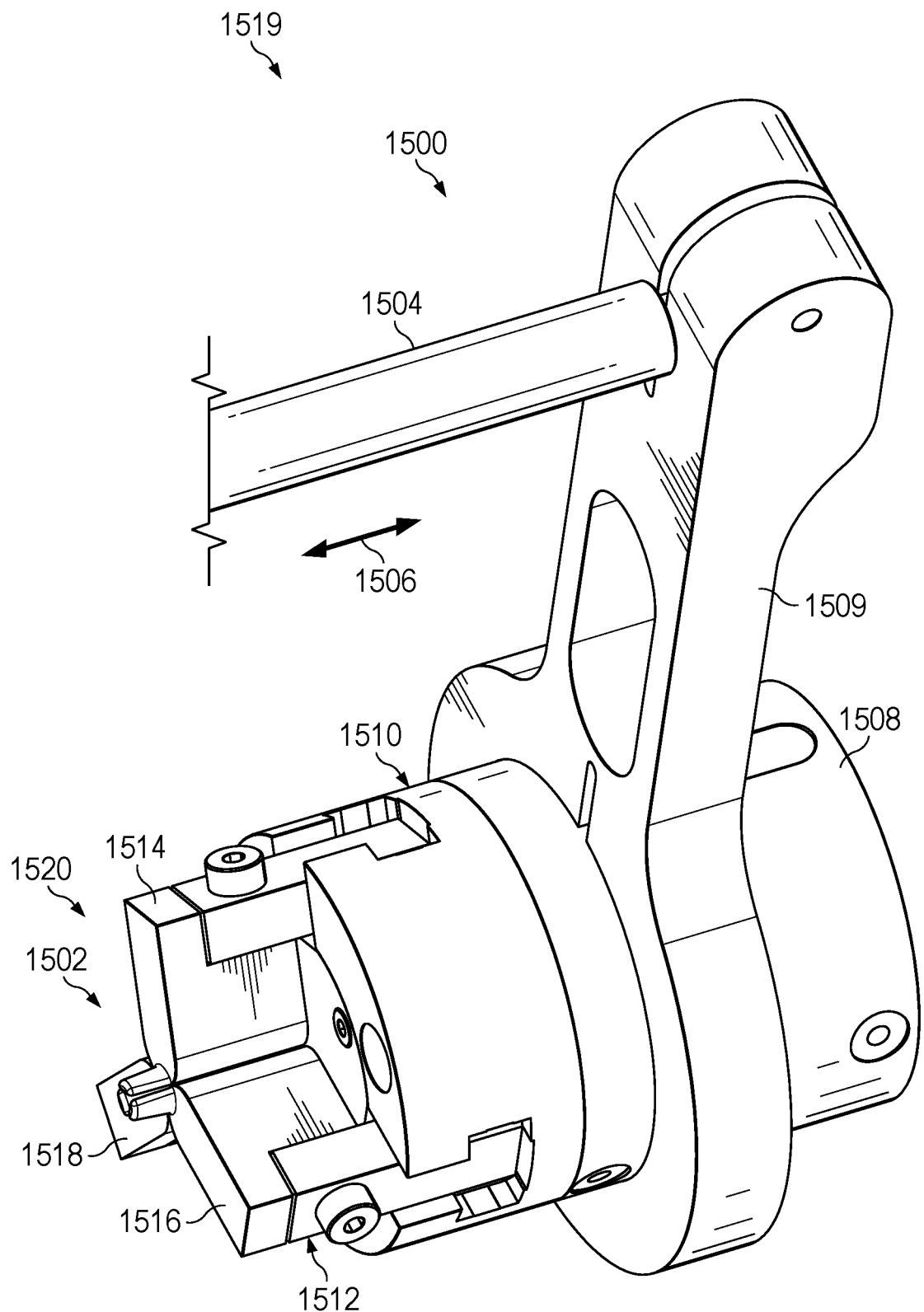
FIG. 15 is an isometric view of a collar transfer unit of an end effector in accordance with an illustrative embodiment.

Turning to FIG. 15, an isometric view of a collar transfer unit of an end effector is depicted in accordance with an illustrative embodiment. Collar transfer unit 1500 is one implementation of collar transfer unit 160 of FIG. 1. Collar transfer unit 1500 is a physical implementation of collar transfer unit 254 of FIG. 2. In some illustrative examples, collar transfer unit 1500 is the same as collar transfer unit 330 of FIGS. 3-7. In some illustrative examples, collar transfer unit 1500 is the same as collar transfer unit 330 of FIGS. 9-12.

Collar transfer unit 1500 is configured to move collars between components of an end effector. Collar transfer unit 1500 is part of an end effector, such as end effector 102 of FIG. 1 or end effector 200 of FIG. 2. Collar transfer unit 1500 is configured to move a collar from a collar positioning assembly of the end effector to a torque wrench of the end effector.

Collar transfer unit 1500 comprises collar gripper 1502 connected to telescoping arm 1504. Telescoping arm 1504 moves in direction 1506. Telescoping arm 1504 is configured to extend away from a collar positioning assembly of the end effector.

As depicted, collar gripper 1502 is directly connected to collar transfer head 1508. In this illustrative example, collar transfer head 1508 is a portion of collar transfer unit 1500. Collar transfer head 1508 is connected to telescoping arm 1504 by a rotation motor (not depicted) and rotating arm 1509. In this illustrative example, rotating arm 1509 has a set length. In other non-depicted examples, rotating arm 1509 can be extendible.

Collar gripper 1502 includes actuator 1510 configured to move plurality of fingers 1512 relative to each other. Plurality of fingers 1512 include finger 1514, finger 1516, and finger 1518. Plurality of fingers 1512 can be moved away from each other to grip the center of a collar. Plurality of fingers 1512 can be moved towards each other to release the collar.

In view 1519, plurality of fingers 1512 are in compact state 1520. In compact state 1520 plurality of fingers 1512 does not retain a collar. When collar gripper 1502 moves without a collar, collar gripper 1502 moves in compact state 1520.

Figure 16:
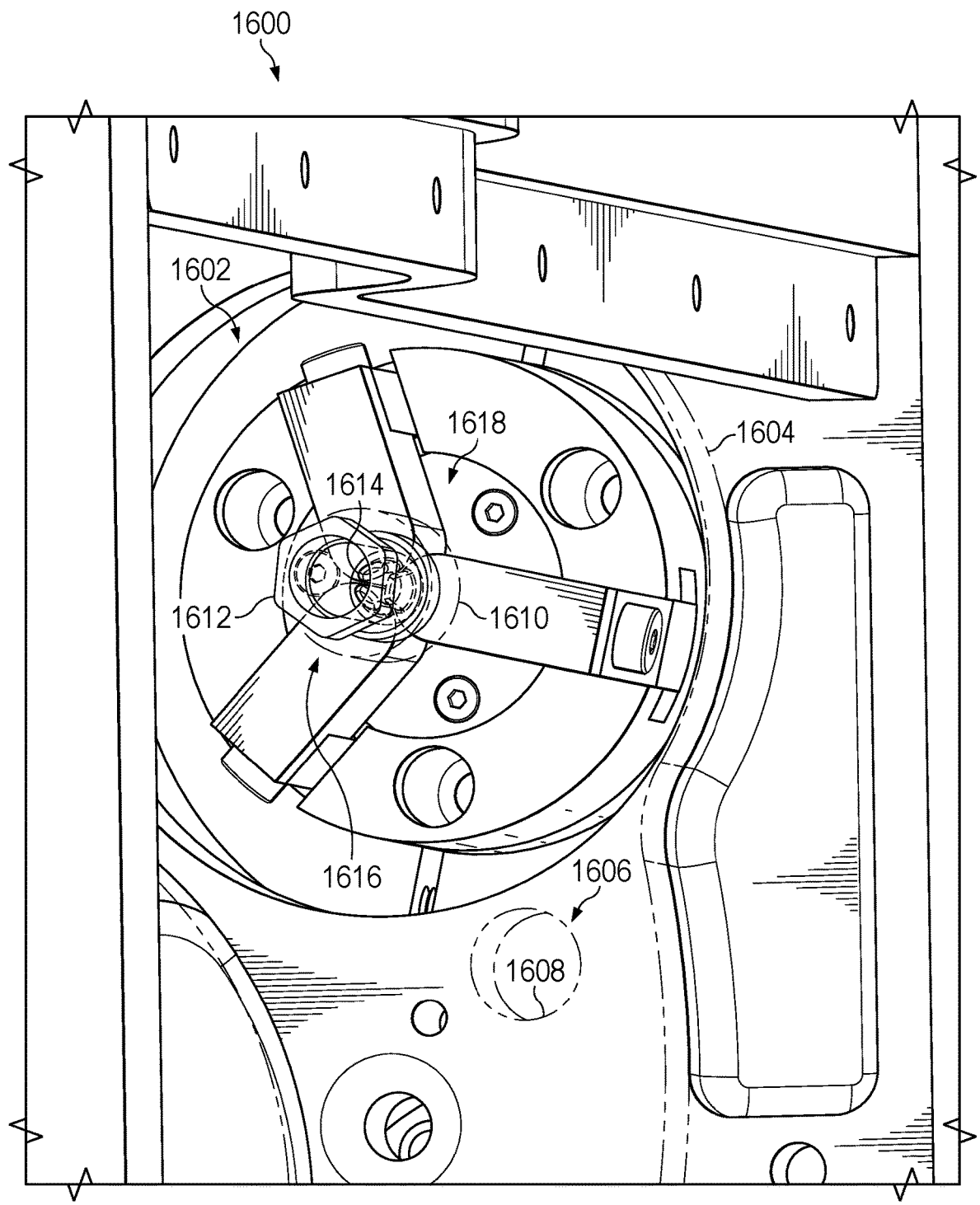
FIG. 16 is a view of a collar within a rotating collar plate of an end effector in accordance with an illustrative embodiment.

Turning to FIG. 16, a view of a collar within a rotating collar plate of an end effector is depicted in accordance with an illustrative embodiment. View 1600 can be view within end effector 102 of FIG. 1. View 1600 can be a view within end effector 200 of FIG. 2. View 1600 can be a view within end effector 300 of FIGS. 3-14 in an illustrative example in which collar gripper 332 takes collars from rotating collar plate 1302. In other non-depicted illustrative examples of end effector 300 of FIGS. 3-14, collar gripper 332 can take collars from a collar centering iris.

In view 1600 of end effector 1602, some components may be removed for visibility of rotating collar plate 1604. In some illustrative examples, rotating collar plate 1604 is the same as rotating collar plate 1302 of FIGS. 13-14.

In view 1600 rotating collar plate 1604 has plurality of holes 1606. As depicted, plurality of holes 1606 includes hole 1608 and hole 1610. In some illustrative examples, hole 1608 and hole 1610 have different diameters.

In view 1600, collar 1612 is present within hole 1610. Collar gripper 1614 is positioned relative to collar 1612 to remove collar 1612 from rotating collar plate 1604. Collar gripper 1614 has plurality of fingers 1616. As depicted, plurality of fingers 1616 extend into collar 1612. In view 1600, plurality of fingers 1616 are in retracted position 1618. In retracted position 1618, plurality of fingers 1616 do not contact collar 1612. To grip collar 1612, plurality of fingers 1616 can be moved outward relative to each other to engage collar 1612. When plurality of fingers 1616 engage collar 1612, collar gripper 1614 can be moved into the page and away from rotating collar plate 1604 to remove collar from rotating collar plate 1604.

Figure 17:
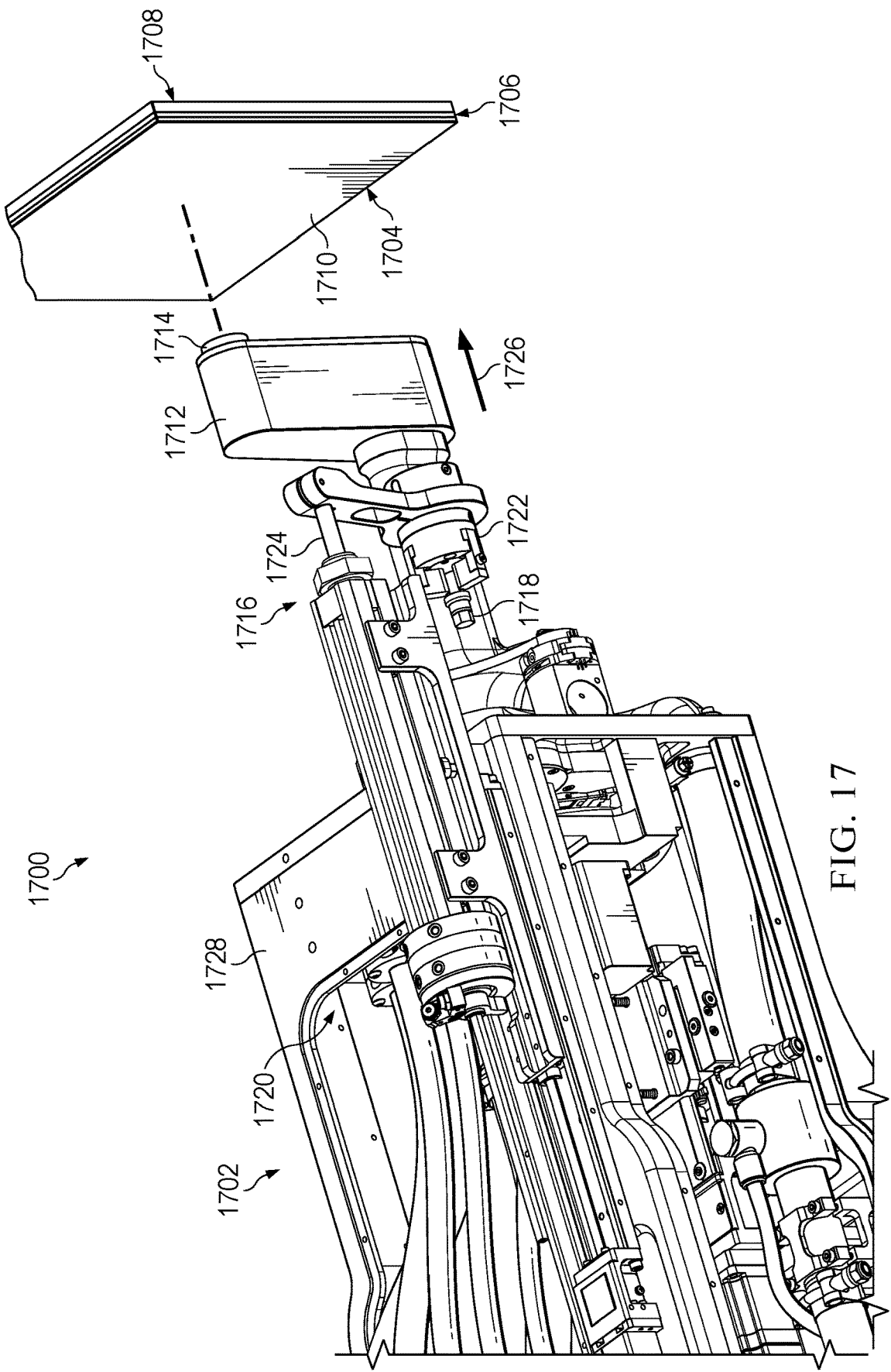
FIG. 17 is a view of an end effector positioned relative to a structure in accordance with an illustrative embodiment.

Turning to FIG. 17, a view of an end effector positioned relative to a structure is depicted in accordance with an illustrative embodiment. End effector 1702 in view 1700 is a physical implementation of end effector 102 of FIG. 1. End effector 1702 in view 1700 is a physical implementation of end effector 200 of FIG. 2. In some illustrative examples, end effector 1702 in view 1700 is the same as end effector 300 of FIG. 3. Portions of end effector 1702 are not depicted for ease of illustration.

In view 1700, end effector 1702 is positioned relative to structure 1704. Structure 1704 includes first part 1706 and second part 1708. First part 1706 has first surface 1710. End effector 1702 is positioned to perform operations on first surface 1710. End effector 1702 is positioned with torque wrench 1712 facing first surface 1710.

Torque wrench 1712 includes contact pad 1714 configured to contact first surface 1710 of structure 1704. Collar transfer unit 1716 is configured to move collars between components of end effector 1702. As depicted, collar transfer unit 1716 is holding collar 1718. Collar transfer unit 1716 is configured to move a collar, such as collar 1718, from collar positioning assembly 1720 to torque wrench 1712.

Collar transfer unit 1716 comprises collar gripper 1722 connected to telescoping arm 1724. Telescoping arm 1724 extends in direction 1726 to extend away from collar positioning assembly 1720 and move collar 1718 towards torque wrench 1712. In view 1700 telescoping arm 1724 extends in direction 1726 to extend away from mounting frame 1728. Prior to view 1700, telescoping arm 1724 connected to collar gripper 1722 extended to remove collar 1718 from a rotating collar plate of collar positioning assembly 1720.

Figure 18:
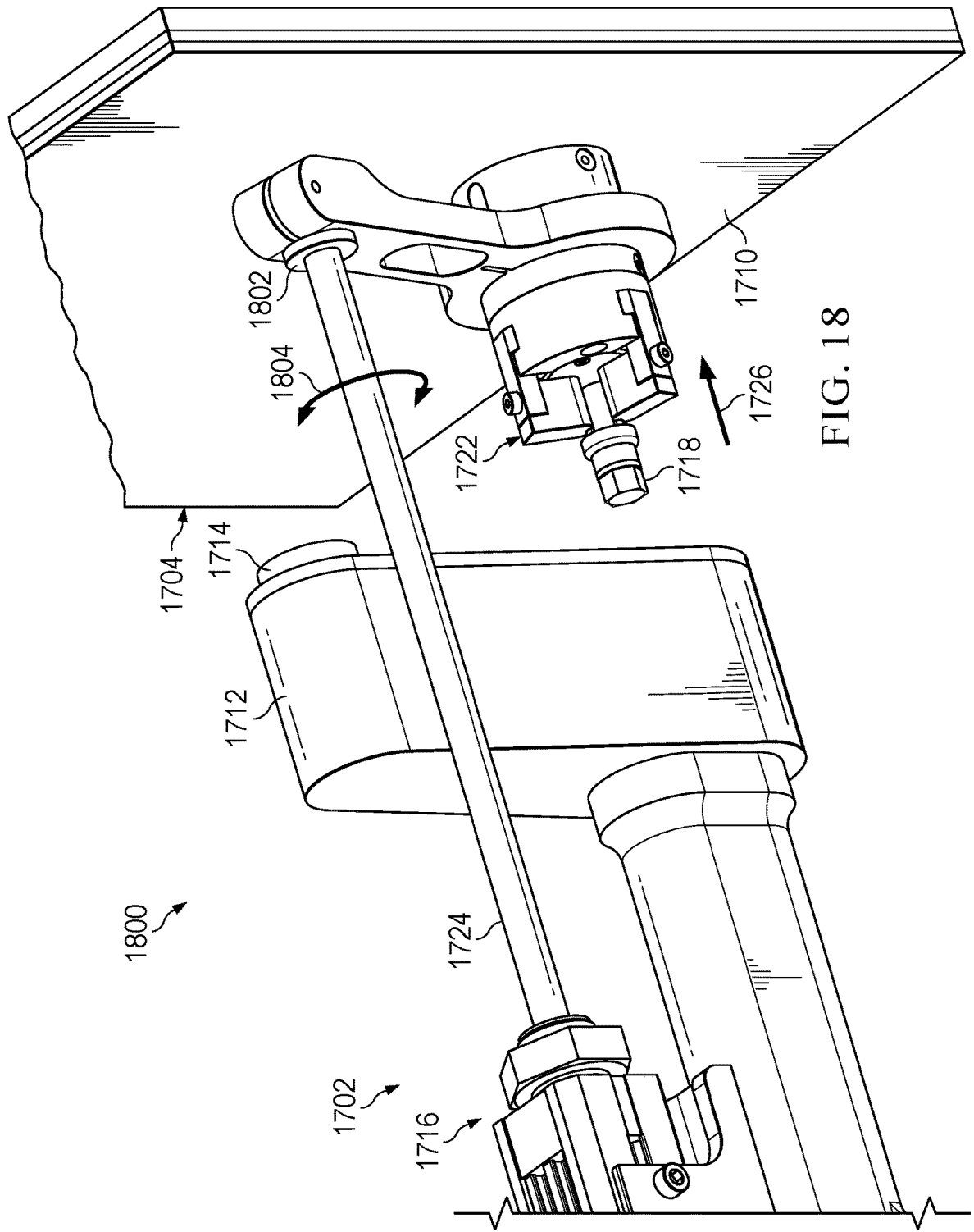
FIG. 18 is a view of a collar transfer unit of an end effector holding a collar in accordance with an illustrative embodiment.

Turning to FIG. 18, a view of a collar transfer unit of an end effector holding a collar is depicted in accordance with an illustrative embodiment. View 1800 is a view of end effector 1702 after telescoping arm 1724 has extended in direction 1726 from view 1700 in FIG. 17.

Collar gripper 1722 is connected to telescoping arm 1724 by rotation motor 1802. Rotation motor 1802 is configured to rotate collar gripper 1722 about telescoping arm 1724 in direction 1804. Rotation of collar gripper 1722 and extension and retraction of telescoping arm 1724 can be used to position collar 1718 within torque wrench 1712.

Figure 19:
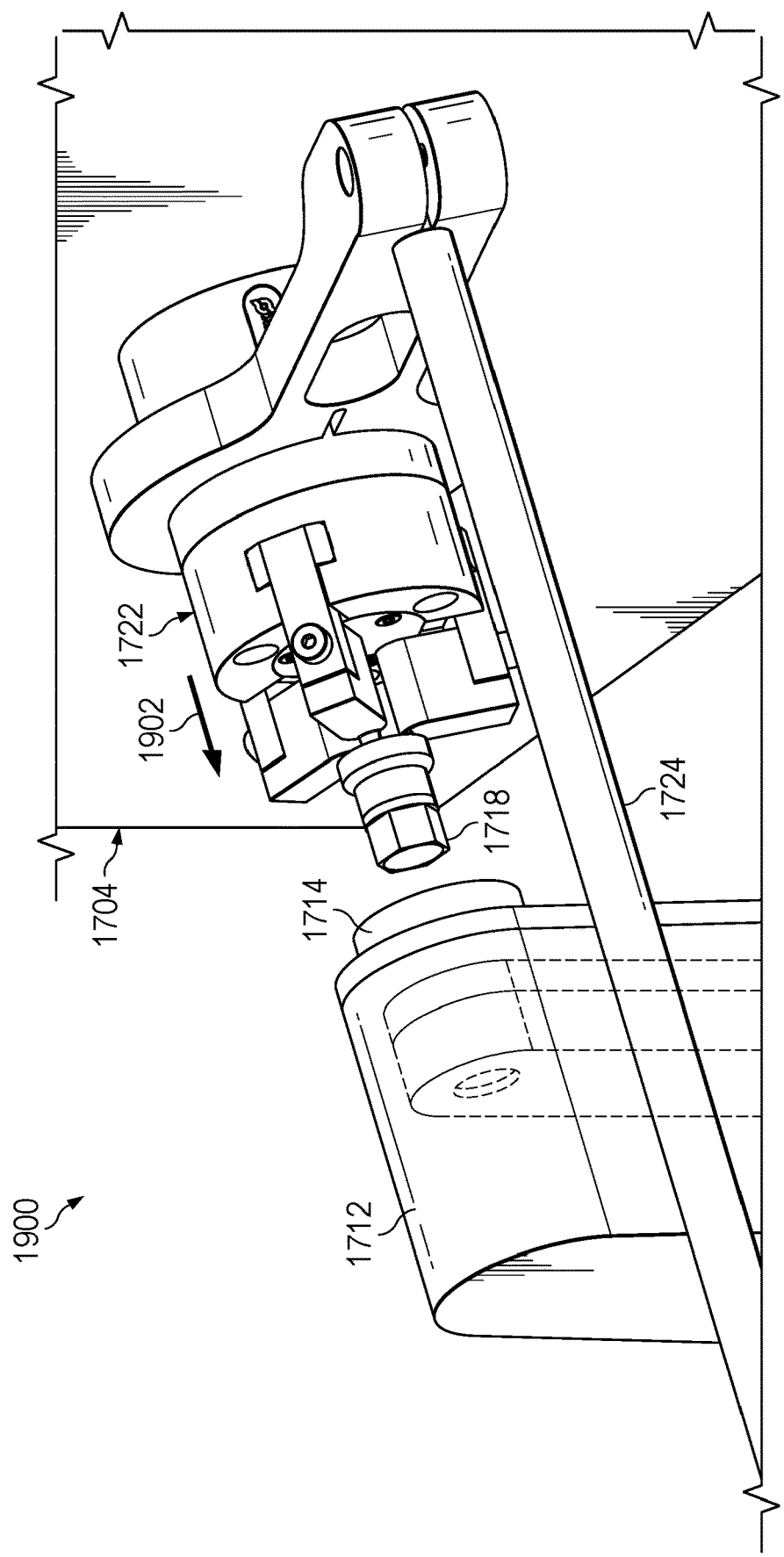
FIG. 19 is a view of a collar transfer unit of an end effector positioning a collar relative to a torque wrench in accordance with an illustrative embodiment.

Turning to FIG. 19, a view of a collar transfer unit of an end effector positioning a collar relative to a torque wrench is depicted in accordance with an illustrative embodiment. View 1900 is a view of end effector 1702 in FIG. 18 after rotation of collar gripper 1722 about telescoping arm 1724 in direction 1804. In view 1900 telescoping arm 1724 is retracted in direction 1902 to move collar gripper 1722 towards torque wrench 1712.

Figure 20:
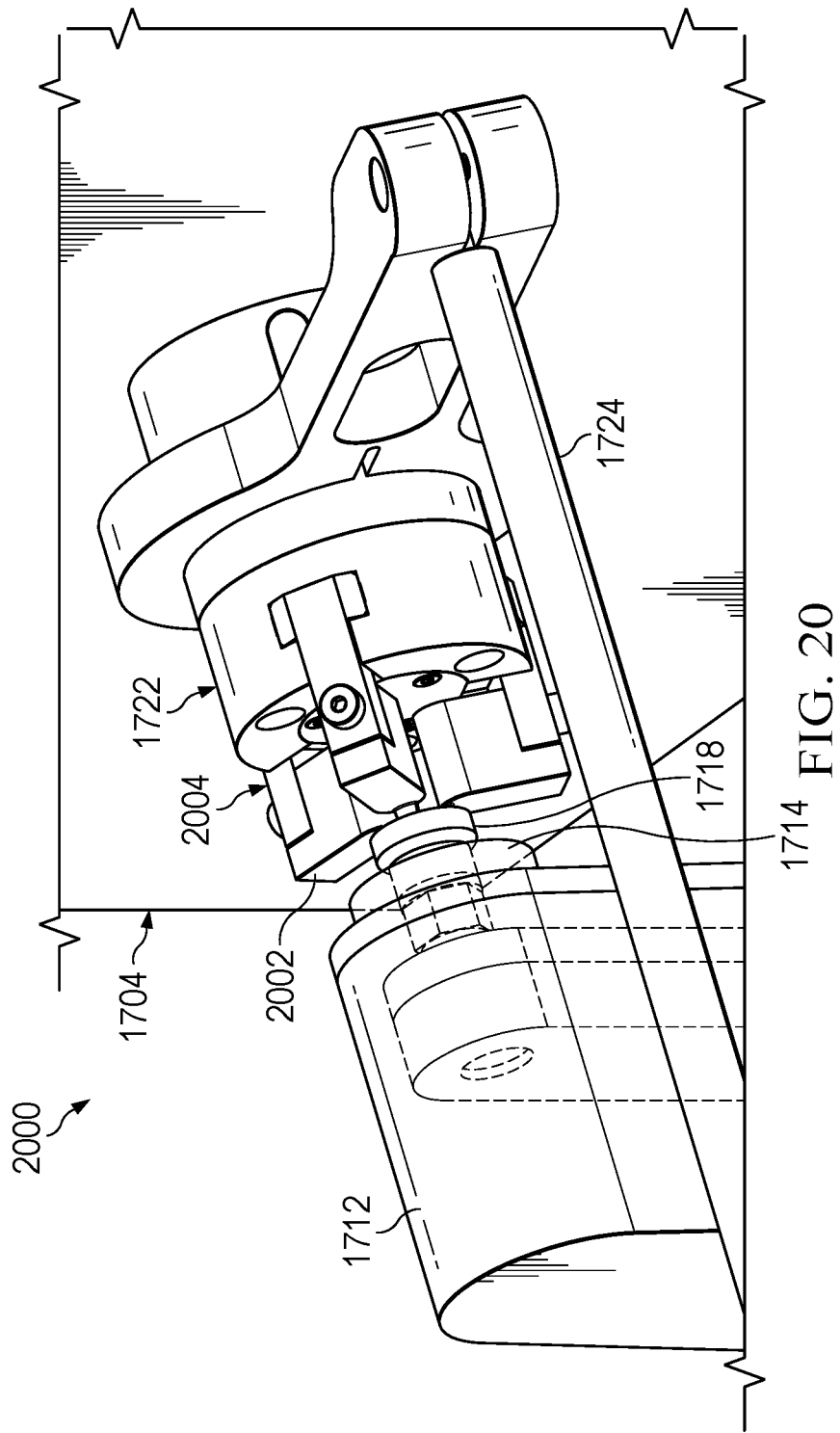
FIG. 20 is a view of a collar transfer unit of an end effector placing a collar in a torque wrench in accordance with an illustrative embodiment.

Turning to FIG. 20, a view of a collar transfer unit of an end effector placing a collar in a torque wrench is depicted in accordance with an illustrative embodiment. View 2000 is a view of collar transfer unit 1716 after telescoping arm 1724 is retracted in direction 1902 from FIG. 19. In view 2000, collar gripper 1722 is positioned with collar 1718 within torque wrench 1712. In view 2000 plurality of fingers 2002 of collar gripper 1722 are in expanded state 2004. In expanded state 2004, plurality of fingers 2002 contact and retain collar 1718.

Collar 1718 has a respective diameter. Collar gripper 1722 is configured to engage and retain collars of a plurality of diameters. Expanded state 2004 for collar gripper 1722 is not limited to the distance between plurality of fingers 2002 in view 2000.

Figure 21:
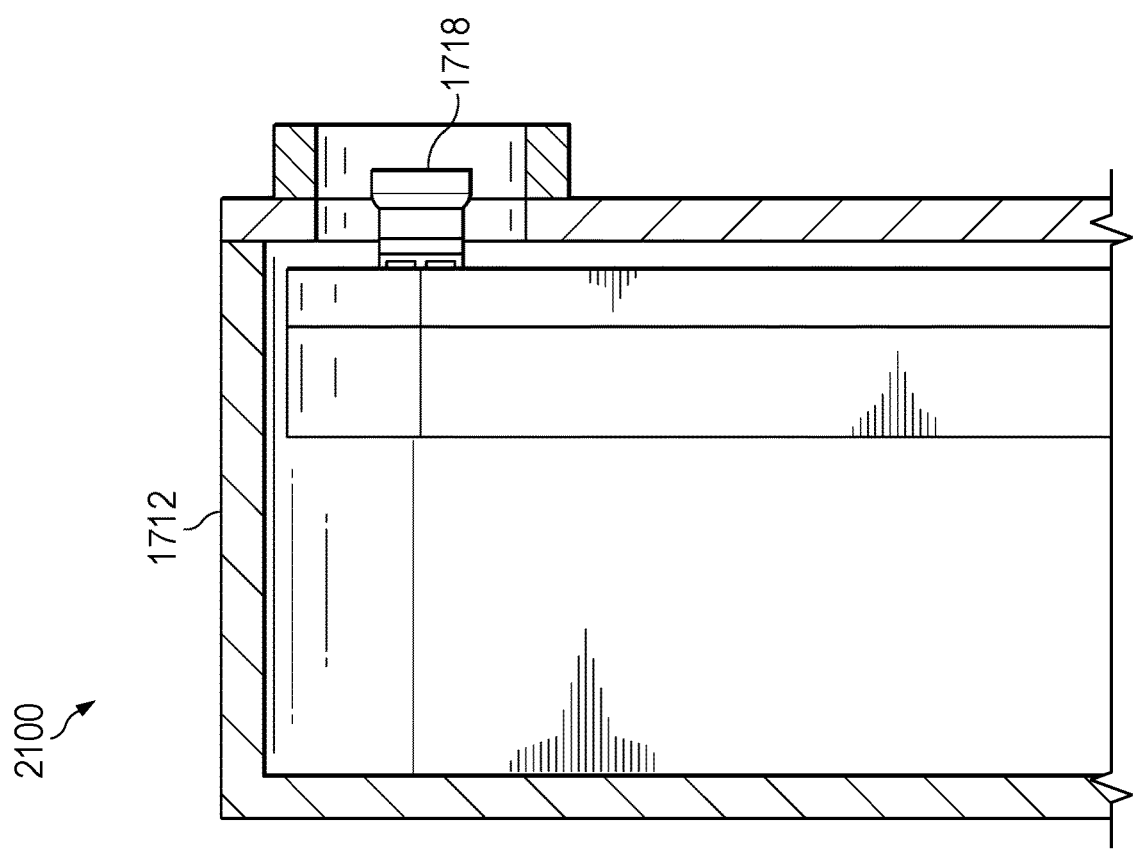
FIG. 21 is a cross-sectional view of a collar within a torque wrench of an end effector in accordance with an illustrative embodiment.

Turning to FIG. 21, a cross-sectional view of a collar within a torque wrench of an end effector is depicted in accordance with an illustrative embodiment. In view 2100 portions of torque wrench 1712 are transparent to better illustrate the position of collar 1718 within torque wrench 1712. In view 2100, collar 1718 is seated with collar retainer.

Figure 22:
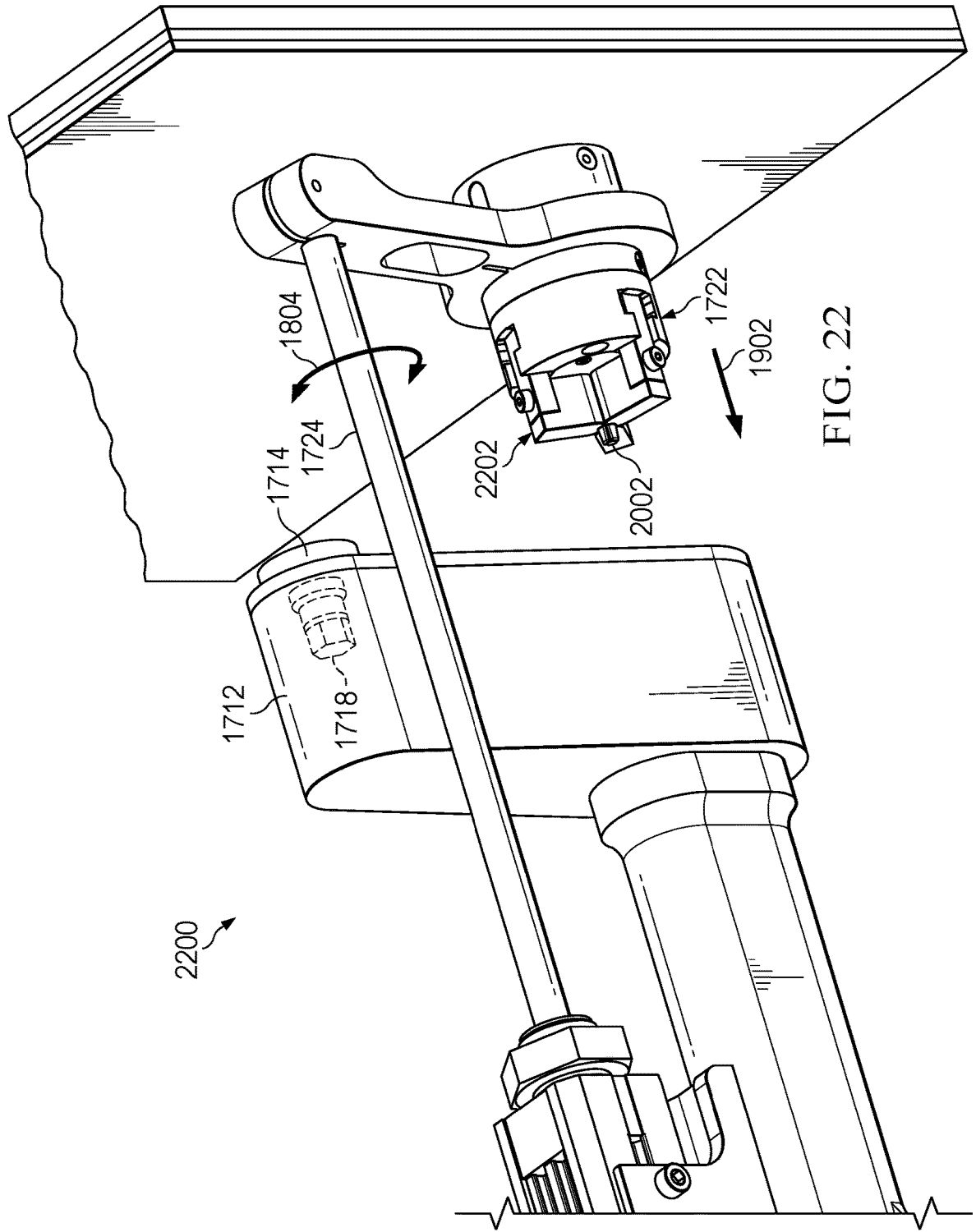
FIG. 22 is an isometric view of a collar transfer unit after placement of a collar within a torque wrench of an end effector in accordance with an illustrative embodiment.

Turning to FIG. 22, an isometric view of a collar transfer unit after placement of a collar within a torque wrench of an end effector is depicted in accordance with an illustrative embodiment. In view 2200 plurality of fingers 2002 of collar gripper 1722 is in compact state 2202. Between view 2000 and view 2200 collar gripper 1722 has been moved in direction 1726 away from torque wrench 1712, rotated in direction 1804 away from torque wrench 1712, and retracted in direction 1902 towards mounting frame 1728 of FIG. 17.

Figure 23:
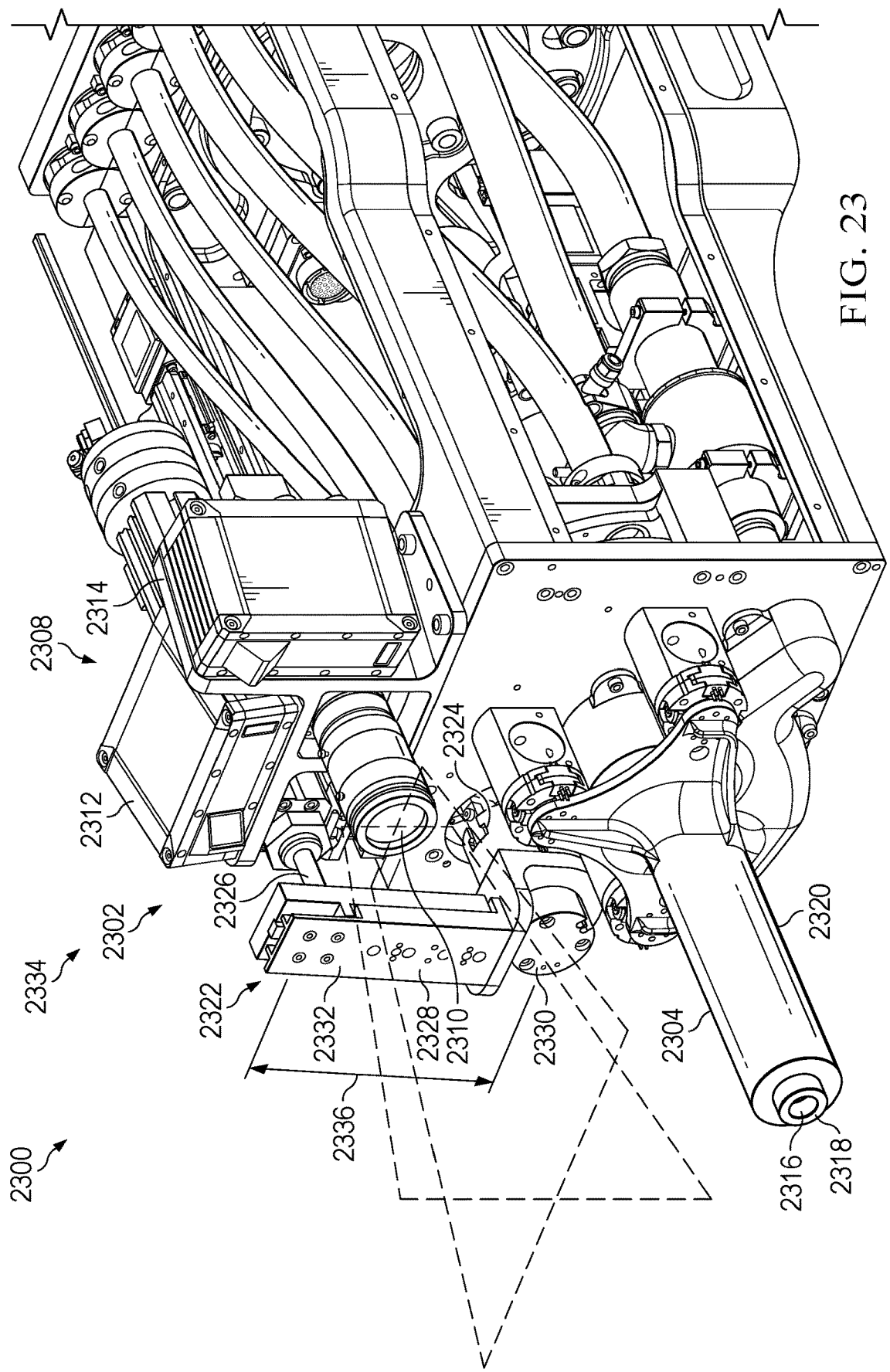
FIG. 23 is an isometric view of an end effector with a number of non-contact inspection sensors in accordance with an illustrative embodiment.

Turning to FIG. 23, an isometric view of an end effector with a number of non-contact inspection sensors is depicted in accordance with an illustrative embodiment. End effector 2300 comprises number of non-contact inspection sensors 2302. End effector 2300 is a physical implementation of end effector 102 of FIG. 1. End effector 2300 is a physical implementation of end effector 200 of FIG. 2.

End effector 2300 has torque wrench 2304 attached. Torque wrench 2304 is a physical implementation of torque wrench 112 of FIG. 1. Torque wrench 2304 is a physical implementation of torque wrench 202 of FIG. 2. In some illustrative examples, end effector 2300 is the same as end effector 300 of FIGS. 3-14 with torque wrench 2304 attached instead of torque wrench 302. In some illustrative examples, number of non-contact inspection sensors 2302 is the same as number of non-contact inspection sensors 314 in FIG. 3.

Number of non-contact inspection sensors 2302 generate surface data for a surface of a structure. In this illustrative example, number of non-contact inspection sensors 2302 comprises number of scanning sensors 2308. In this illustrative example, number of distance sensors number of non-contact inspection sensors 2302 includes camera 2310. Camera 2310 can be used to determine an X position and a Y position of end effector 2300 relative to a structure.

Number of scanning sensors 2308 includes sensor 2312 and sensor 2314. Sensor 2312 and sensor 2314 are mutually perpendicular scanners. Sensor 2312 and sensor 2314 are used to determine a Z position of end effector 2300. Using the surface data from sensor 2312 and sensor 2314, the normals are determined, and cross product is taken, to get the vector.

In performing normalization for end effector 2300, the normal vectors are desirably the same for the opposite surfaces of the structure. In performing normalization for end effector 2300, there are two normal planes, one for each surface. Prior to moving end effector 2300, a comparison of the vectors of those two normal planes is performed between the two surfaces, which may be referred to as the inner mold line (IML) and the outer mold line (OML). An outside vector determined using a touch nosepiece of an end effector in contact with a second surface of the structure can be used as a master. The outside vector is used for drilling. If the vectors for end effector 2300 and the end effector on the second surface of the structure are different by more than a set value, the normalization process can be repeated.

As depicted, torque wrench 2304 is an in-line wrench. Opening 2316 of contact pad 2318 attached to housing 2320 is in-line with a longitudinal axis of a drive shaft (not depicted) of torque wrench 2304. In some illustrative examples, a collar retainer (not depicted) within housing 2320 is connected directly to a drive shaft (not depicted) of torque wrench 2304. In these illustrative examples, a number of gears is not present within housing 2320.

Collar transfer unit 2322 is configured to transfer a collar (not depicted) to torque wrench 2304. Collar transfer unit 2322 is configured to move collars from collar supply tubes (not depicted) of end effector 2300 to torque wrench 2304.

Collar transfer comprises collar gripper 2324 connected to telescoping arm 2326. Telescoping arm 2326 is configured to extend away from the remainder of end effector 2300. In some illustrative examples, collar transfer unit 2322 can be referred to as an adjustable wrench.

Collar transfer unit 2322 further comprises rotating arm 2328 connected to telescoping arm 2326 by a rotation motor (not depicted). Collar gripper 2324 is directly connected to collar transfer head 2330 on the end of rotating arm 2328. As depicted, rotating arm 2328 is extendible 2332. In view 2334 rotating arm 2328 has length 2336.

Although not depicted in FIG. 23, a number of distance sensors could also be present in end effector 2300. In some illustrative examples, any desirable quantity and any desirable type of non-contact sensors configured to measure a distance of end effector 2300 from the surface of the structure (not depicted).

Figure 24:
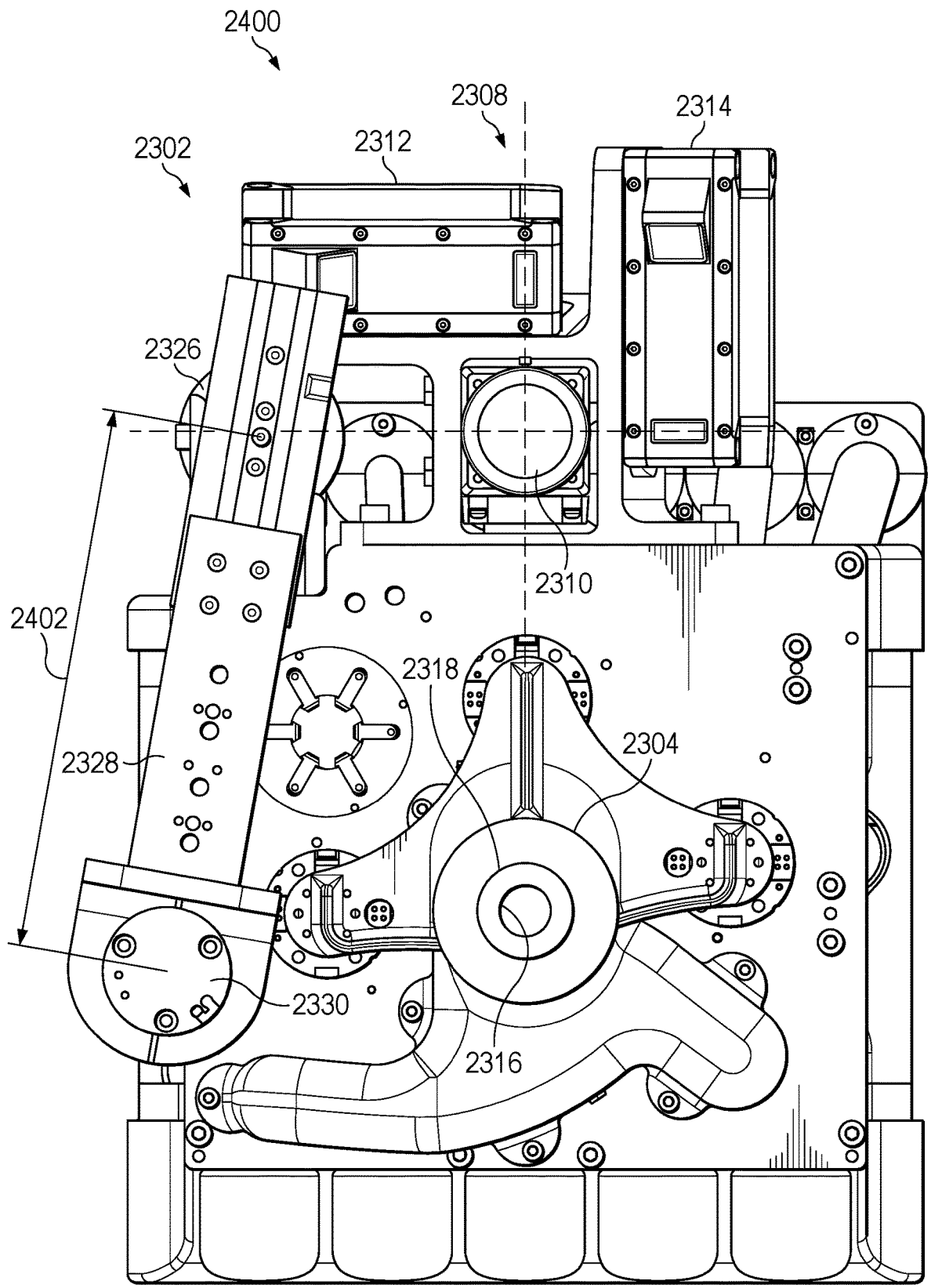
FIG. 24 is a front view of an end effector with a number of non-contact inspection sensors in accordance with an illustrative embodiment.

Turning to FIG. 24, a front view of an end effector with a number of non-contact inspection sensors is depicted in accordance with an illustrative embodiment. View 2400 is a front view of end effector 2300 of FIG. 23.

Rotating arm 2328 has extended between view 2334 and view 2400. In view 2400, length 2402 of rotating arm 2328 is greater than length 2336. Each of length 2336 and length 2402 is a measurement from a center of telescoping arm 2326 to a center of collar transfer head 2330.

Figure 25:
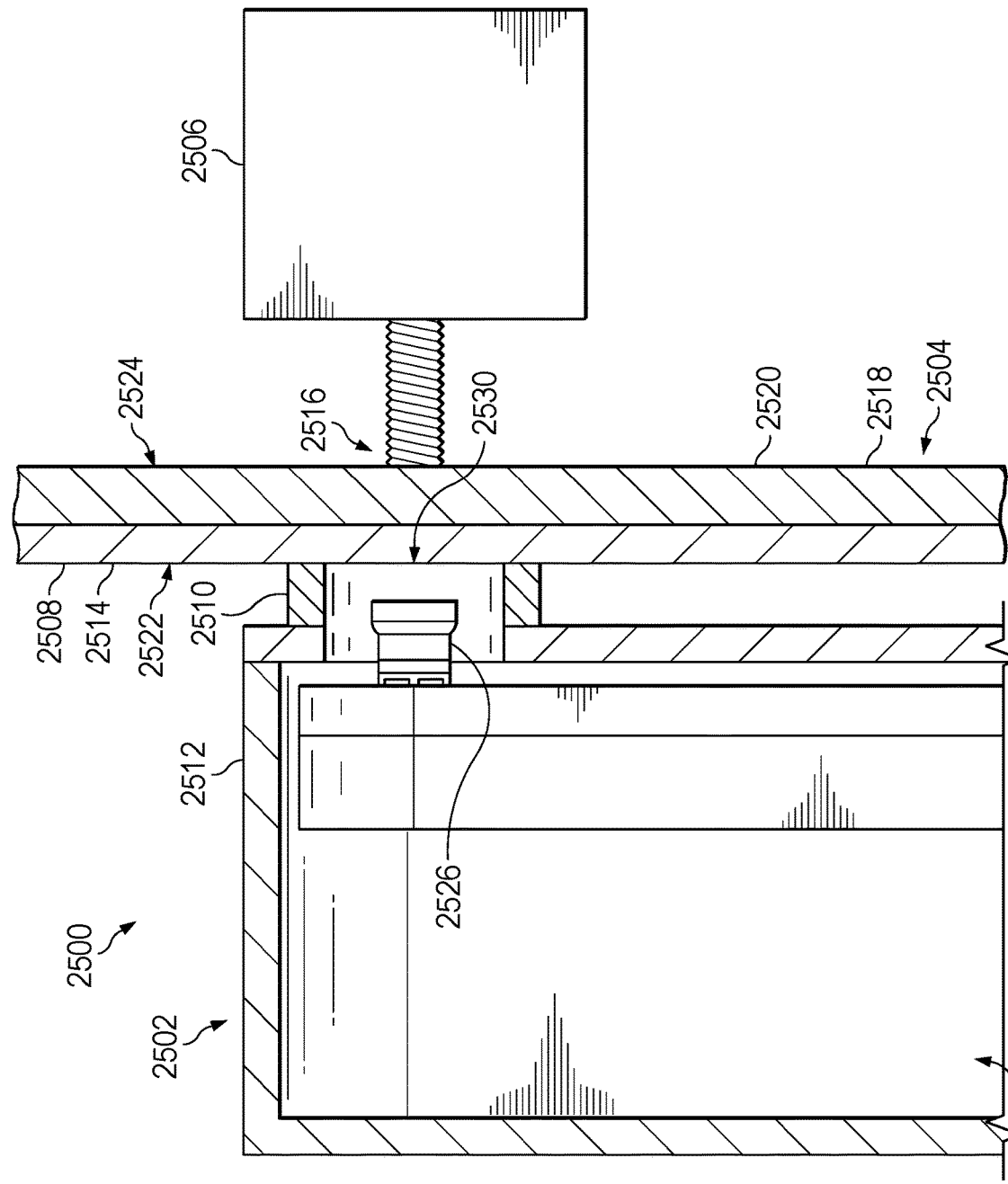
FIG. 25 is a cross-sectional view of an end effector positioned relative to a structure in accordance with an illustrative embodiment.

Turning to FIG. 25, a cross-sectional view of an end effector positioned relative to a structure is depicted in accordance with an illustrative embodiment. View 2500 is a cross-sectional view of end effector 2502, structure 2504, and drilling robot 2506. End effector 2502 is a physical implementation of end effector 102 of FIG. 1. End effector 2502 is a physical implementation of end effector 200 of FIG. 2. In some illustrative examples, end effector 2502 is the same as end effector 300 of FIGS. 3-14.

End effector 2502 has been previously normalized relative to first surface 2508 of structure 2504. In some illustrative examples, end effector 2502 is normalized as described in FIGS. 23-24.

In view 2500, contact pad 2510 of torque wrench 2512 is in contact with first surface 2508 of structure 2504. Using torque wrench 2512, end effector 2502 performs one-sided clamp-up of structure 2504. While torque wrench 2512 performs clamp-up on first side 2514 of structure 2504, drilling robot 2506 performs drilling 2516 on structure 2504. Drilling robot 2506 is positioned relative to second side 2518 of structure 2504 and begins drilling 2516 through second surface 2520 of structure 2504. As depicted, structure 2504 comprises first part 2522 having first surface 2508 and second part 2524 having second surface 2520.

In view 2500, collar 2526 is present within torque wrench 2512 of end effector 2502. Torque wrench 2512 can receive collar 2526 from a collar transfer unit, such as collar transfer unit 1716 of FIGS. 17-22. Collar 2526 is stored within torque wrench 2512 while drilling operations are performed by drilling robot 2506 on structure 2504. During clamp-up, a vacuum (not depicted) is drawn through chamber 2528, around collar 2526, and through opening 2530 of contact pad 2510.

Figure 26:
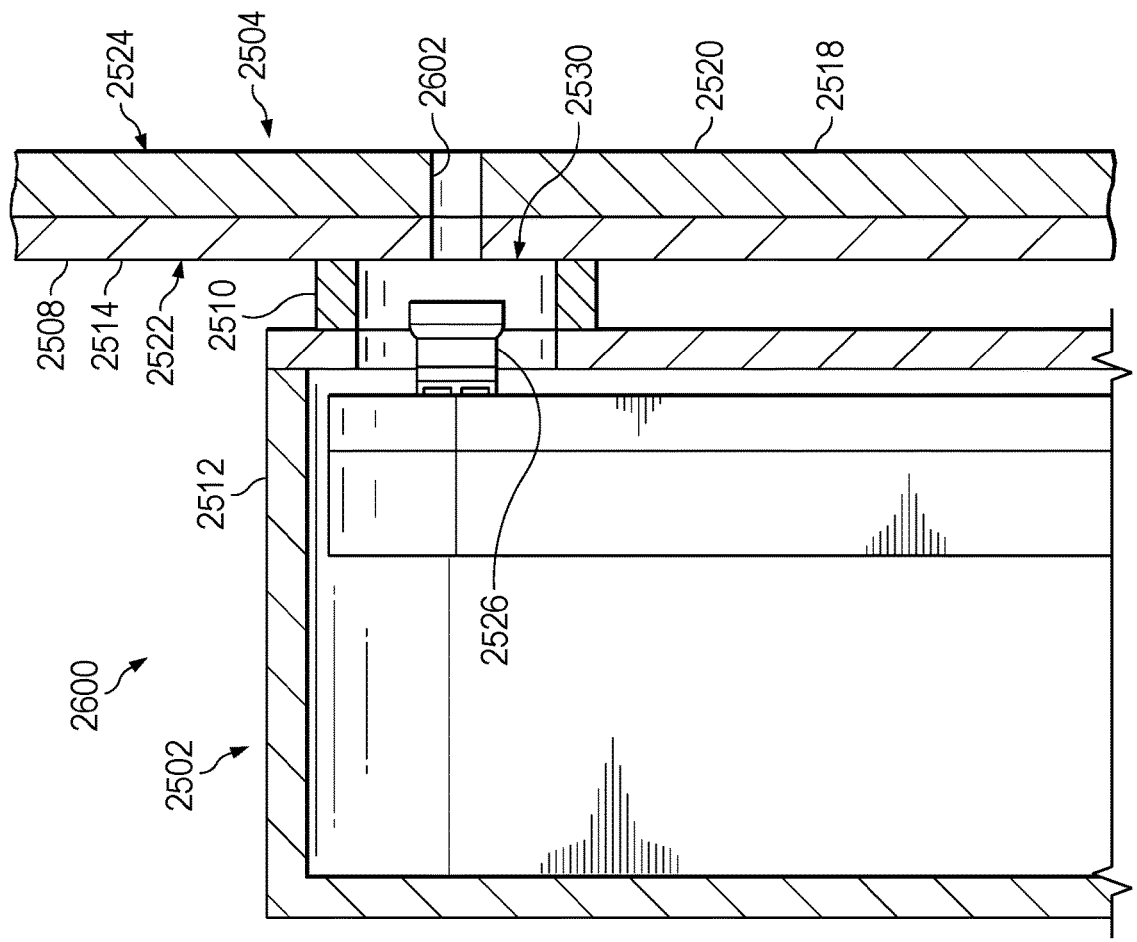
FIG. 26 is a cross-sectional view of an end effector positioned relative to a structure in accordance with an illustrative embodiment.

Turning to FIG. 26, a cross-sectional view of an end effector positioned relative to a structure is depicted in accordance with an illustrative embodiment. View 2600 is a cross-sectional view of end effector 2502 and structure 2504 after drilling is completed. Hole 2602 has been drilled through first part 2522 and second part 2524 of structure 2504.

Torque wrench 2512 maintains the clamp-up on structure 2504. The vacuum pulled through torque wrench 2512 is strong enough to secure first part 2522 and second part 2524 relative each other. Hole 2602 is positioned in structure 2504 such that collar 2526 is concentric with hole 2602.

Figure 27:
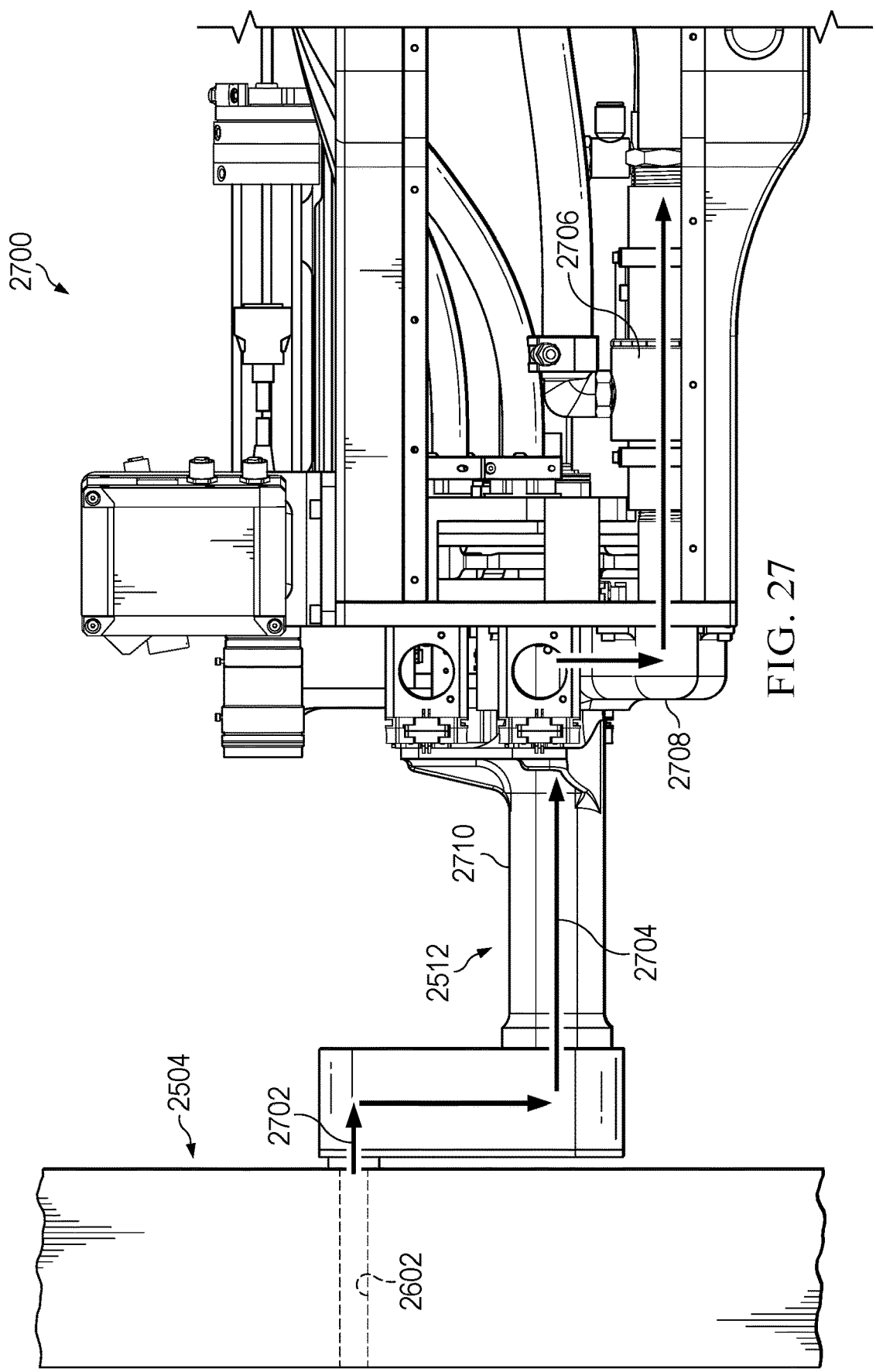
FIG. 27 is a cross-sectional view of an end effector positioned relative to a structure in accordance with an illustrative embodiment.

Turning to FIG. 27, a cross-sectional view of an end effector positioned relative to a structure is depicted in accordance with an illustrative embodiment. View 2700 is an alternative view of torque wrench 2512 maintaining clamp-up on structure 2504 with hole 2602. As is illustrated by arrows 2702, vacuum 2704 is drawn from first vacuum source 2706 through vacuum port 2708 and housing 2710 of torque wrench 2512.

Figure 28:
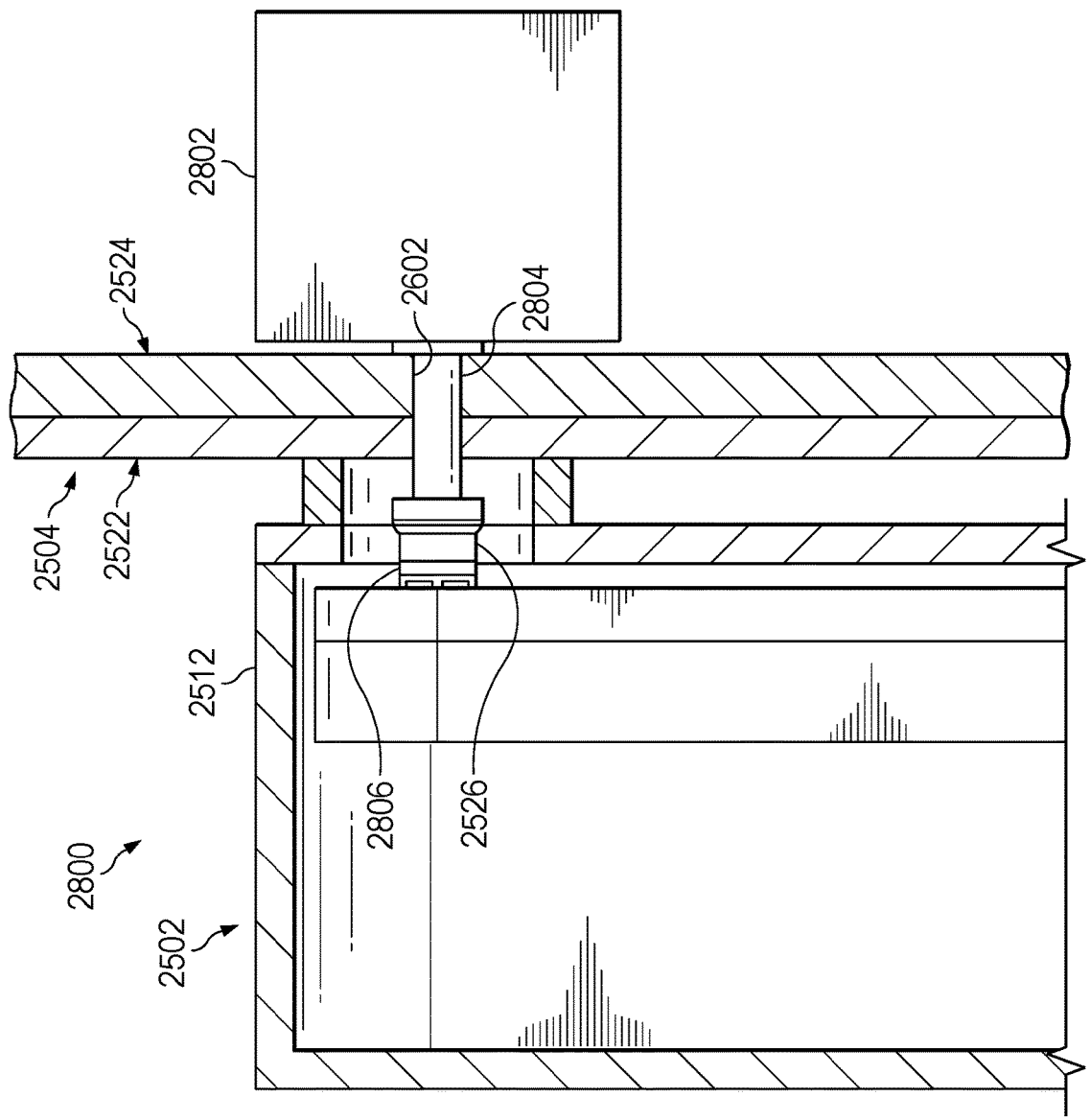
FIG. 28 is a cross-sectional view of an end effector positioned relative to a structure in accordance with an illustrative embodiment.

Turning to FIG. 28, a cross-sectional view of an end effector positioned relative to a structure is depicted in accordance with an illustrative embodiment. In view 2800 fastener installation robot 2802 is positioned relative to second part 2524. Fastener installation robot 2802 has installed fastener 2804 through hole 2602. Torque wrench 2512 installs collar 2526 onto fastener 2804 by rotating collar retainer 2806 of torque wrench 2512.

Figure 29:
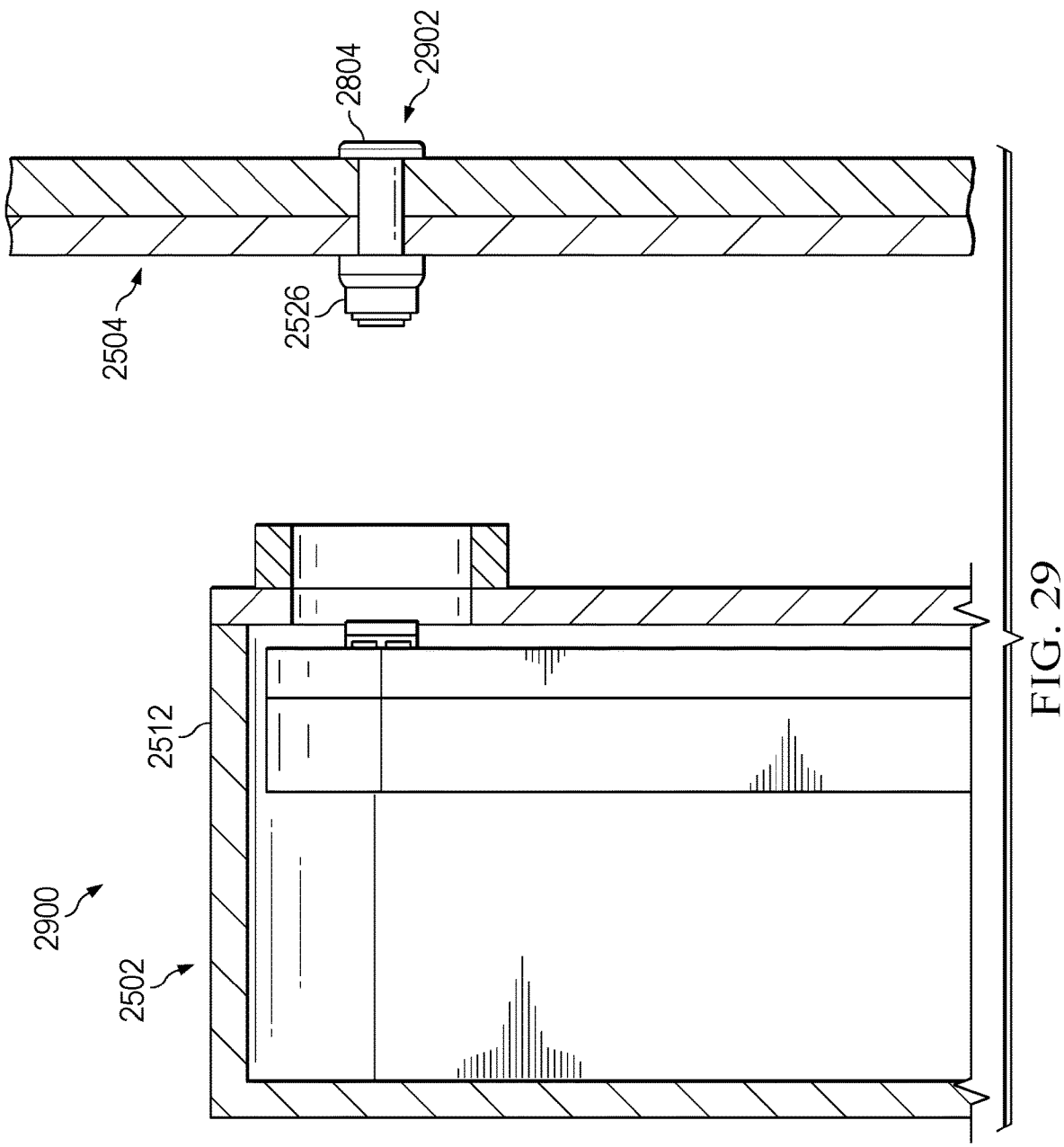
FIG. 29 is a cross-sectional view of an end effector positioned relative to a structure in accordance with an illustrative embodiment.

Turning to FIG. 29, a cross-sectional view of an end effector positioned relative to a structure is depicted in accordance with an illustrative embodiment. In view 2900, collar 2526 has been installed on fastener 2804 extending through structure 2504. Fastening operations at location 2902 have been completed. Vacuum 2704 has been released by end effector 2502. End effector 2502 has been moved away from structure 2504.

Figure 30:
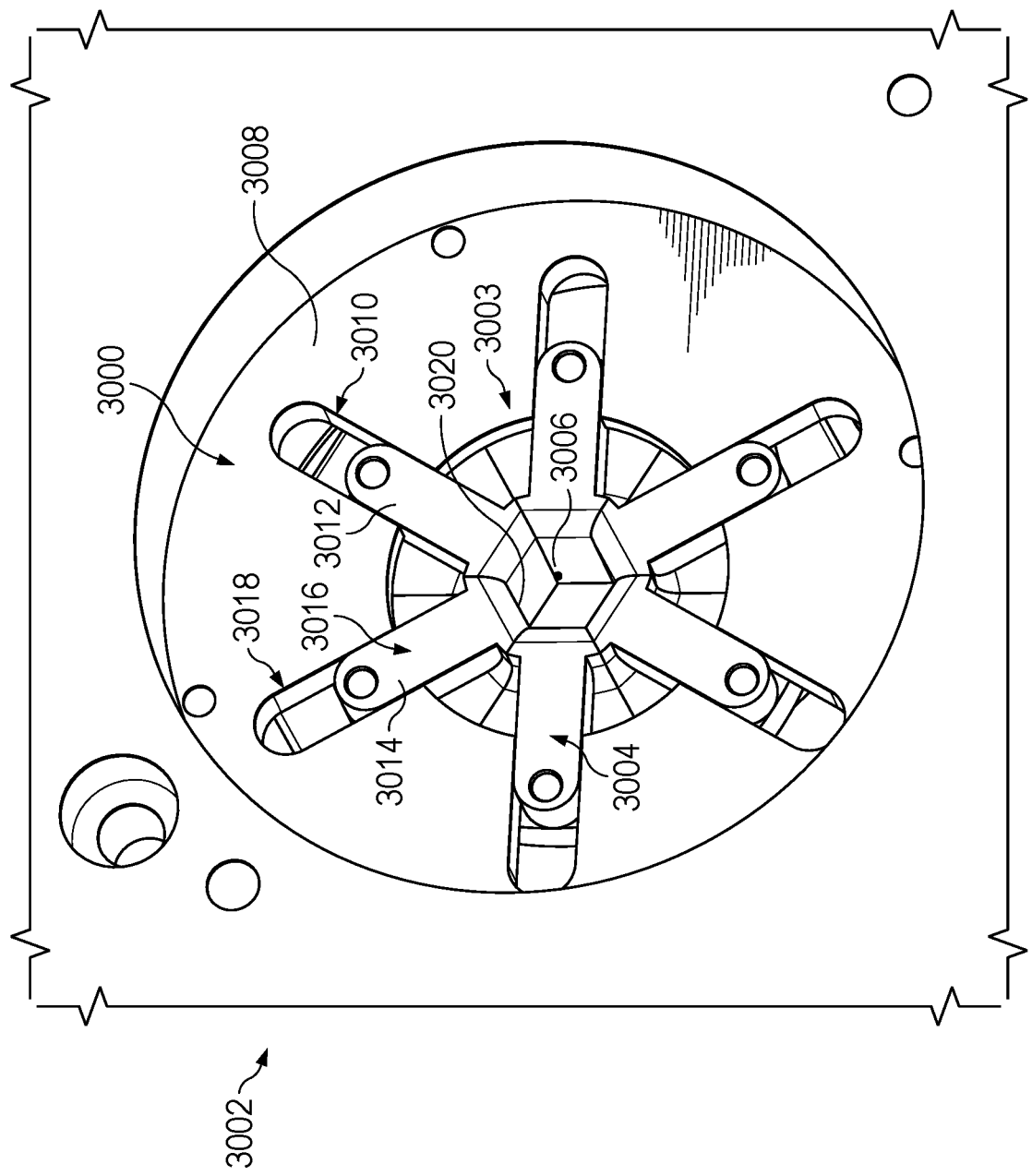
FIG. 30 is a front view of a collar centering iris within a housing in accordance with an illustrative embodiment.

Turning to FIG. 30, a front view of a collar centering iris within a housing is depicted in accordance with an illustrative embodiment. Collar centering iris 3000 is a physical implementation of collar centering iris 253 of FIG. 2. Collar centering iris 3000 can be present in end effector 300. In some illustrative examples, collar centering iris 3000 can be reached by collar gripper 332 through a hole in first face 308 of mounting frame 306.

Collar centering iris 3000 positions a collar, irrespective of diameter, with its center in a preset location so long as the collar is within a predetermined diameter range. Collar centering iris 3000 receives collars from a rotating collar plate, such as rotating collar plate 242 of FIG. 2 or rotating collar plate 328 of FIG. 3.

In view 3002 collar centering iris 3000 is in closed position 3003. In view 3002 collar centering iris 3000 is positioned to receive a smallest collar in the predetermined diameter range. In view 3002 slide fingers 3004 of collar centering iris 3000 have moved inwards towards preset location 3006 for a center of a collar. Slide fingers 3004 move relative to collar stopper 3008. Collar stopper 3008 has channels 3010 for guiding bars 3012 of slide fingers 3004 as slide fingers 3004 move relative to collar stopper 3008. For example, guiding bar 3014 of slide finger 3016 moves within channel 3018 of channels 3010.

Each of slide fingers 3004 has a contact surface configured to contact a collar. For example, slide finger 3016 has contact surface 3020. Contact surface 3020 is formed of a material configured to contact a collar without undesirable results.

Figure 31:
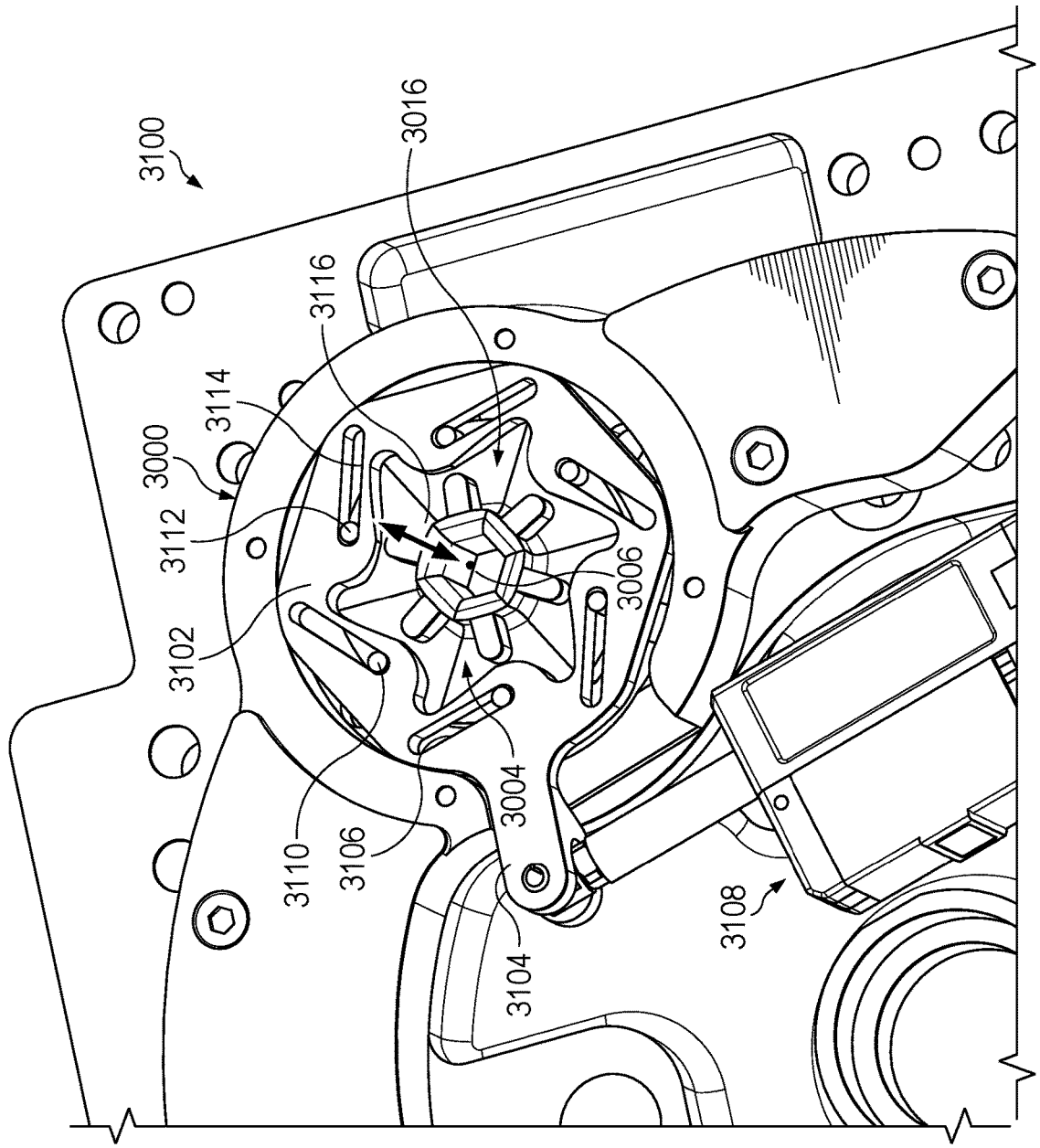
FIG. 31 is a back view of a collar centering iris within a housing in accordance with an illustrative embodiment.

Turning now to FIG. 31, a back view of a collar centering iris within a housing is depicted in accordance with an illustrative embodiment. View 3100 is a back view of collar centering iris 3000 of FIG. 30. In view 3100 iris drive plate 3102 is visible. Iris drive plate 3102 comprises arm 3104 and slots 3106. Arm 3104 is connected to actuator 3108. Actuator 3108 drives movement of iris drive plate 3102. Movement of iris drive plate 3102 moves dowels 3110 within slots 3106. Movement of dowels 3110 within slots 3106 drives movement of slide fingers 3004 towards or away from preset location 3006. For example, movement of dowel 3112 within slot 3114 drives movement of slide finger 3016 in direction 3116 towards or away from preset location 3006.

Figure 32:
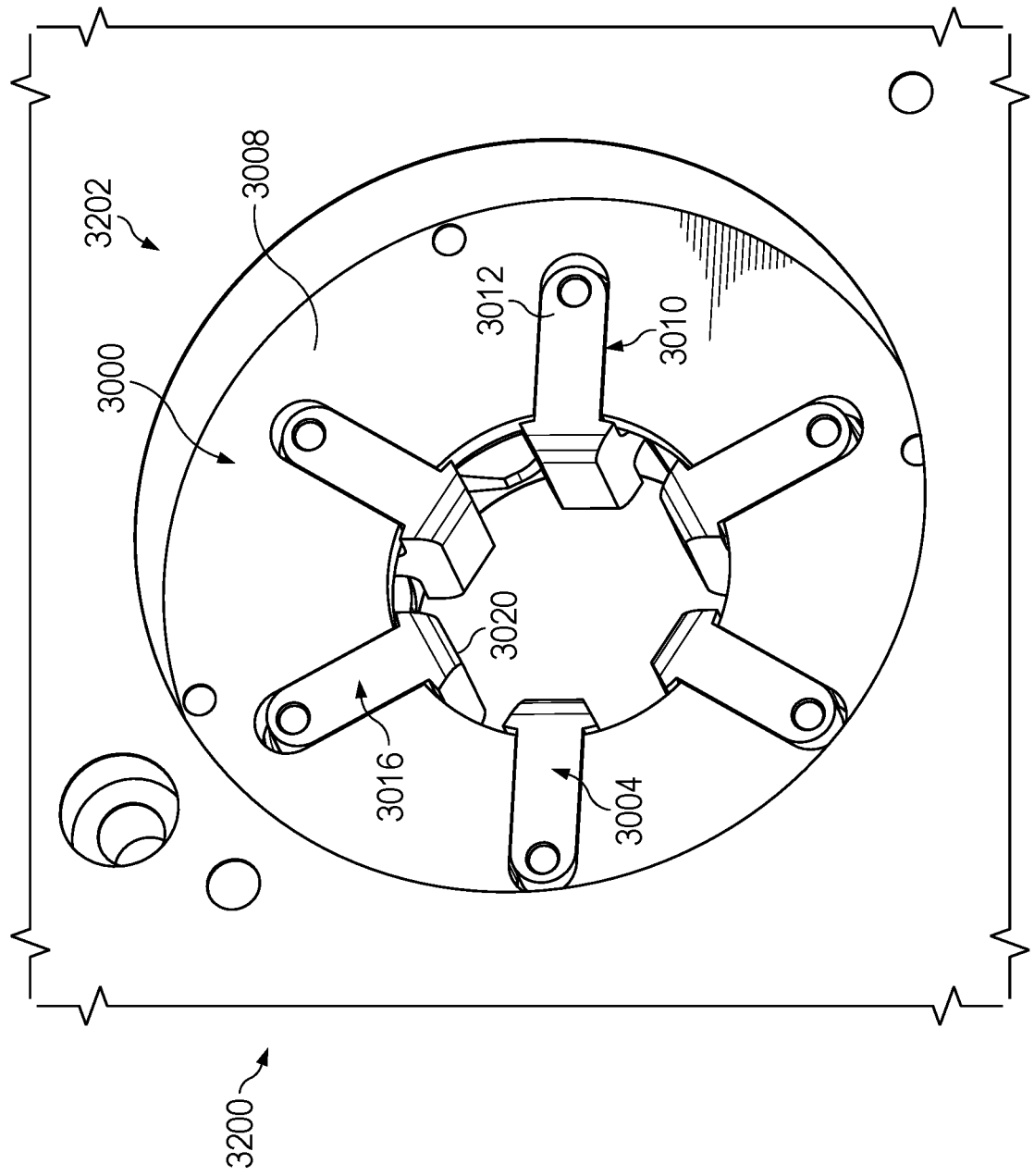
FIG. 32 is a front view of a collar centering iris within a housing in accordance with an illustrative embodiment.

Turning to FIG. 32, a front view of a collar centering iris within a housing is depicted in accordance with an illustrative embodiment. View 3200 is a view of collar centering iris 3000 of FIG. 30 in expanded state 3202. In expanded state 3202, collar centering iris 3000 can hold a collar with a largest diameter in the predetermined diameter range. Slide fingers 3004 can move through a range of different positions between closed position 3003 of FIGS. 30 and 31 and expanded state 3202.

Figure 33:
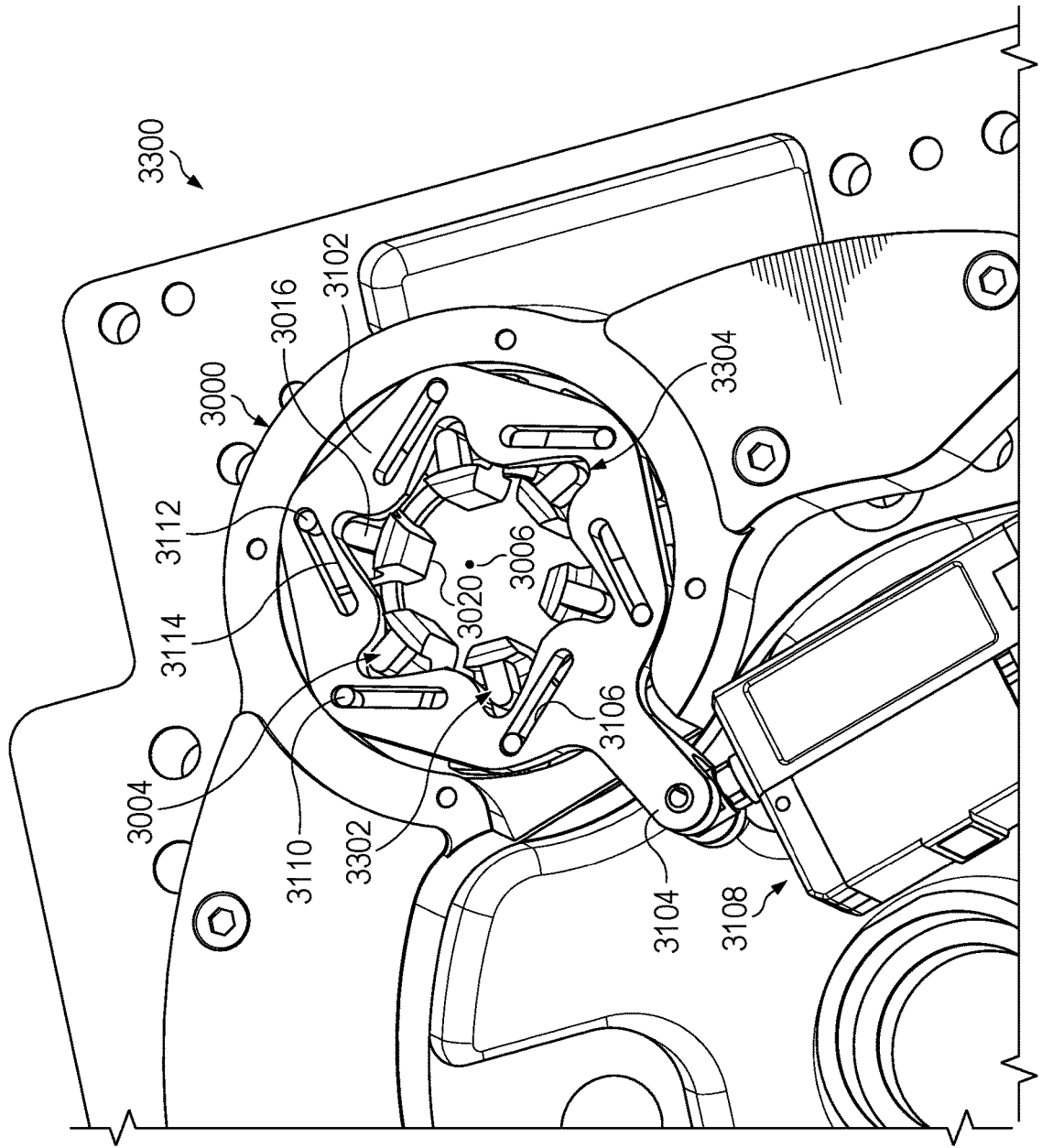
FIG. 33 is a back view of a collar centering iris within a housing in accordance with an illustrative embodiment.

Turning to FIG. 33, a back view of a collar centering iris within a housing is depicted in accordance with an illustrative embodiment. View 3300 is a back view of collar centering iris 3000 in expanded state 3202. In view 3300, dowels 3110 have moved within slots 3106 of iris driving plate 3102. Between view 3100 and 3300, actuator 3108 has retracted, moving iris drive plate 3102 in a counter-clockwise motion between view 3100 and view 3300. By moving iris drive plate 3102 counter clockwise between view 3100 and view 3300, dowels 3110 have moved toward the outside of iris drive plate 3102 between view 3100 and view 3300. By moving iris drive plate 3102 counter clockwise between view 3100 and view 3300, dowels 3110 have moved away from preset location 3006 between view 3100 and view 3300.

Slide fingers 3004 comprise bridges 3302. Bridges 3302 are configured to restrict movement of collars such that collars are restricted from falling within a retainer plate. In view 3300 bridges 3302 are positioned in cutouts 3304 of iris drive plate 3102.

Figure 34:
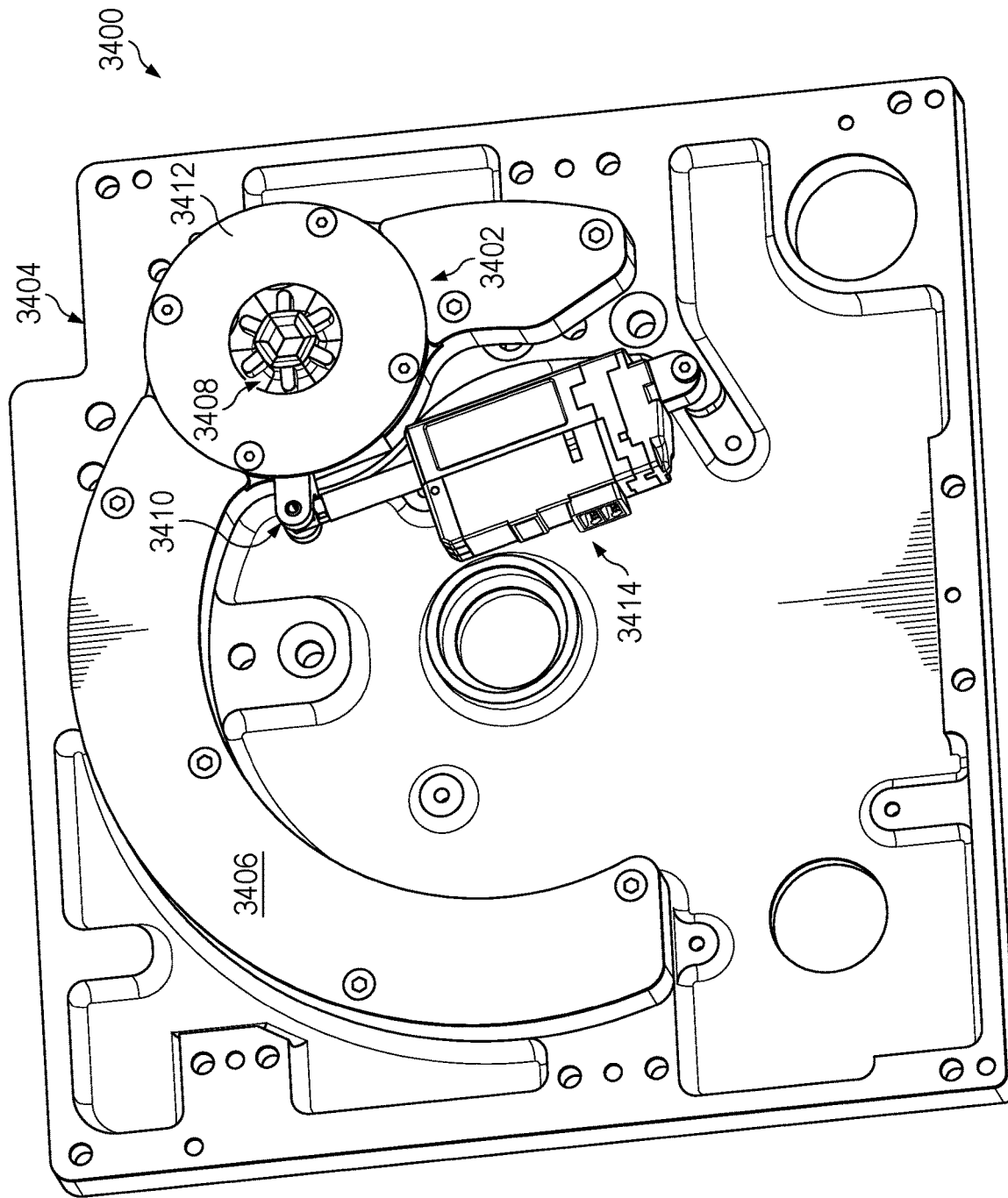
FIG. 34 is a back view of a collar centering iris mounted to a plate of a housing in accordance with an illustrative embodiment.

Turning to FIG. 34, a back view of a collar centering iris mounted to a plate of a housing is depicted in accordance with an illustrative embodiment. In view 3400, collar centering iris 3402 is mounted to plate 3404. Plate 3404 is a portion of a mounting frame (not depicted) of an end effector such as end effector 300 of FIG. 3. Collar centering iris 3402 comprises collar stopper 3406, slide fingers 3408, iris drive plate 3410, retainer plate 3412, and actuator 3414.

Collar stopper 3406 is configured to mount to plate 3404. Collar stopper 3406 is configured to guide slide fingers 3408 as slide fingers 3408 move inward and outward within collar centering iris 3402.

As depicted, slide fingers 3408 include six slide fingers. Slide fingers 3408 are configured to grip either the rounded portion of a collar or a hexagonal portion of a collar.

Iris drive plate 3410 is connected to actuator 3414 and configured to move slide fingers 3408 as actuator 3414 extends or contracts. Movement of iris drive plate 3410 by actuator 3414 drives movement of slide fingers 3408.

Figure 35:
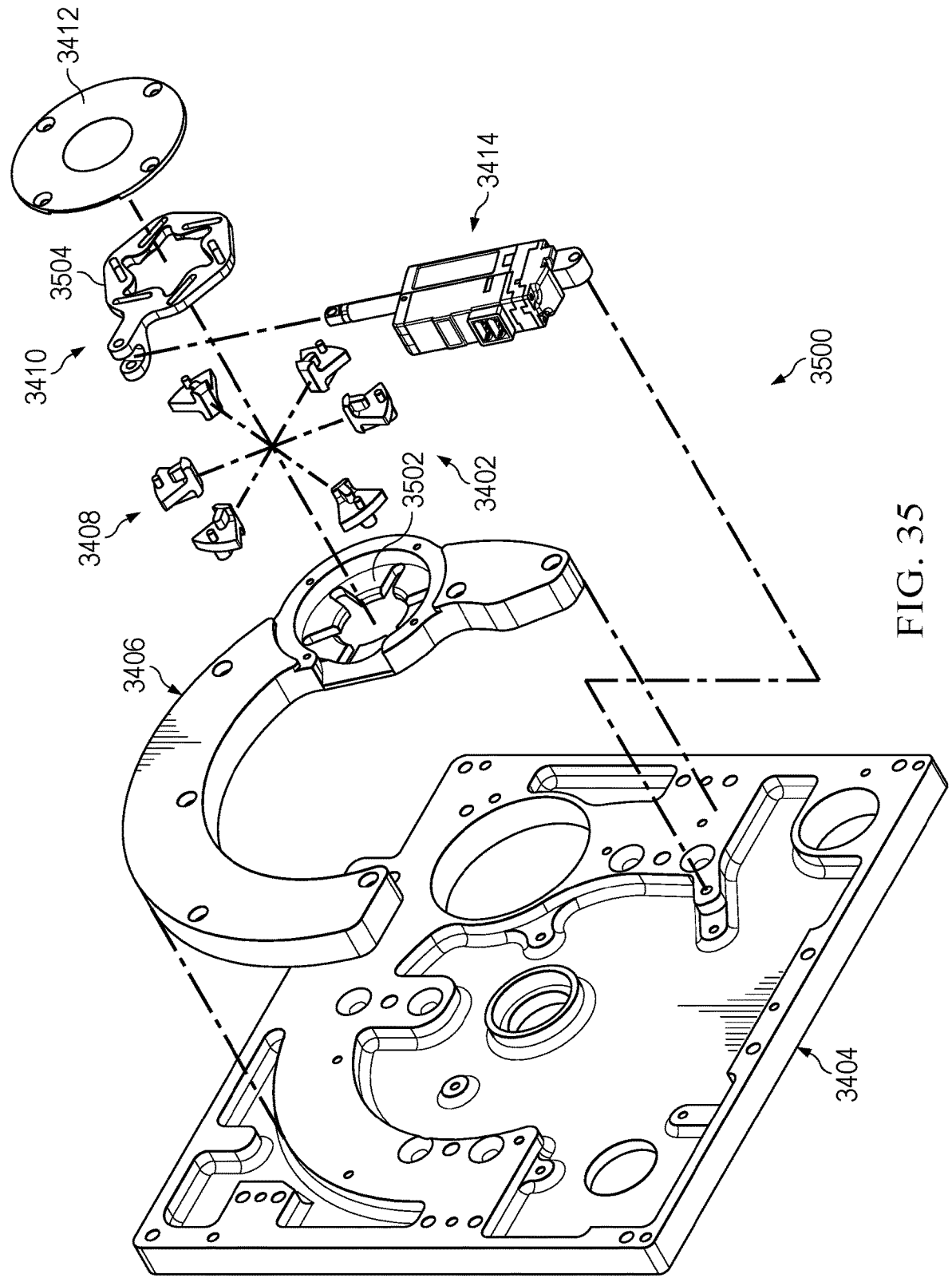
FIG. 35 is an exploded view of a collar centering iris in accordance with an illustrative embodiment.

Turning to FIG. 35, an exploded view of a collar centering iris is depicted in accordance with an illustrative embodiment. View 3500 is an exploded view of collar centering iris 3402 of FIG. 34. In view 3500, counterbore 3502 of collar stopper 3406 is visible. Surfaces of slide fingers 3408 ride on counterbore 3502 of collar stopper 3406. Outer surfaces 3504 of iris drive plate 3410 ride within counterbore 3502 of collar stopper 3406.

Figure 36:
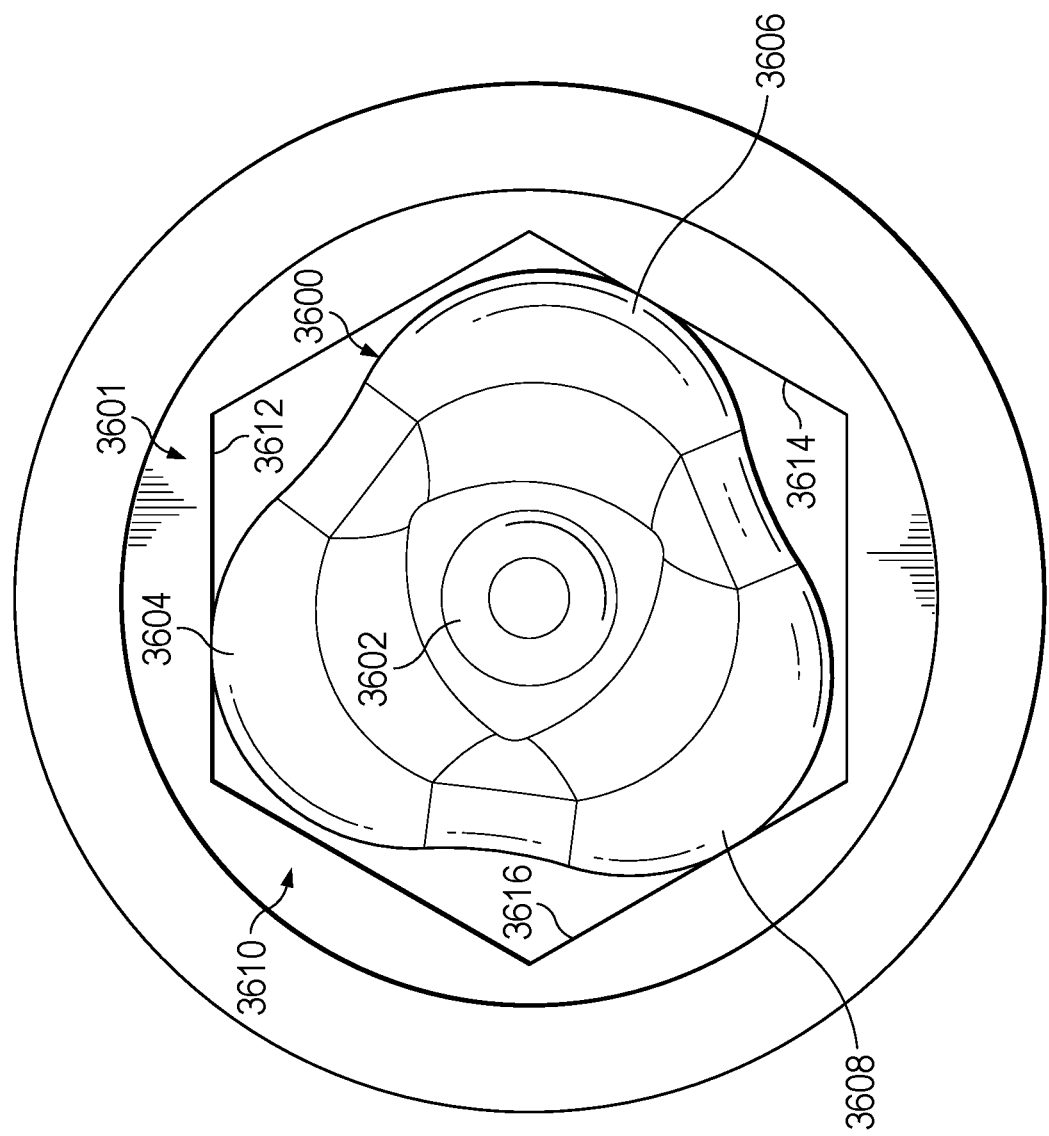
FIG. 36 is a front view of a trilobe wrench within a collar in accordance with an illustrative embodiment.

Turning to FIG. 36, a front view of a trilobe wrench within a collar is depicted in accordance with an illustrative embodiment. Trilobe wrench 3600 can be present in torque wrench 112 of end effector 102 of FIG. 1. Trilobe wrench 3600 can be present in torque wrench 202 of end effector 200 of FIG. 2. Trilobe wrench 3600 can be present in end effector 300 of FIGS. 3-14. Trilobe wrench 3600 can center a collar received from collar transfer unit 1500 of FIG. 15. Trilobe wrench 3600 can be present in end effector 1702 of FIGS. 17-22. Trilobe wrench 3600 can be present in end effector 2300 of FIGS. 23-24. Trilobe wrench 3600 can be present in end effector 2502 of FIGS. 25-29.

Trilobe wrench 3600 is configured to orient collar 3601 to a collar retainer, such as collar retainer 212 of FIG. 2 or collar retainer 704 of FIG. 7. Trilobe wrench 3600 has pilot 3602 configured to initiate contact with collar 3601. Pilot 3602 extends farther out of the page than the remainder of trilobe wrench 3600. Pilot 3602 enters collar 3601 prior to other components of trilobe wrench 3600.

Trilobe wrench 3600 has three rounded lobes: lobe 3604, lobe 3606, and lobe 3608. Collar 3601 has hexagonal opening 3610. Trilobe wrench 3600 is configured to contact three surfaces of hexagonal opening 3610. As depicted, lobe 3604 is in contact with surface 3612. As depicted, lobe 3606 is in contact with surface 3614. As depicted, lobe 3608 is in contact with surface 3616. By contacting only three surfaces of hexagonal opening 3610, trilobe wrench 3600 holds collar 3601 in a desired orientation for being held in a collar retainer.

Figure 37:
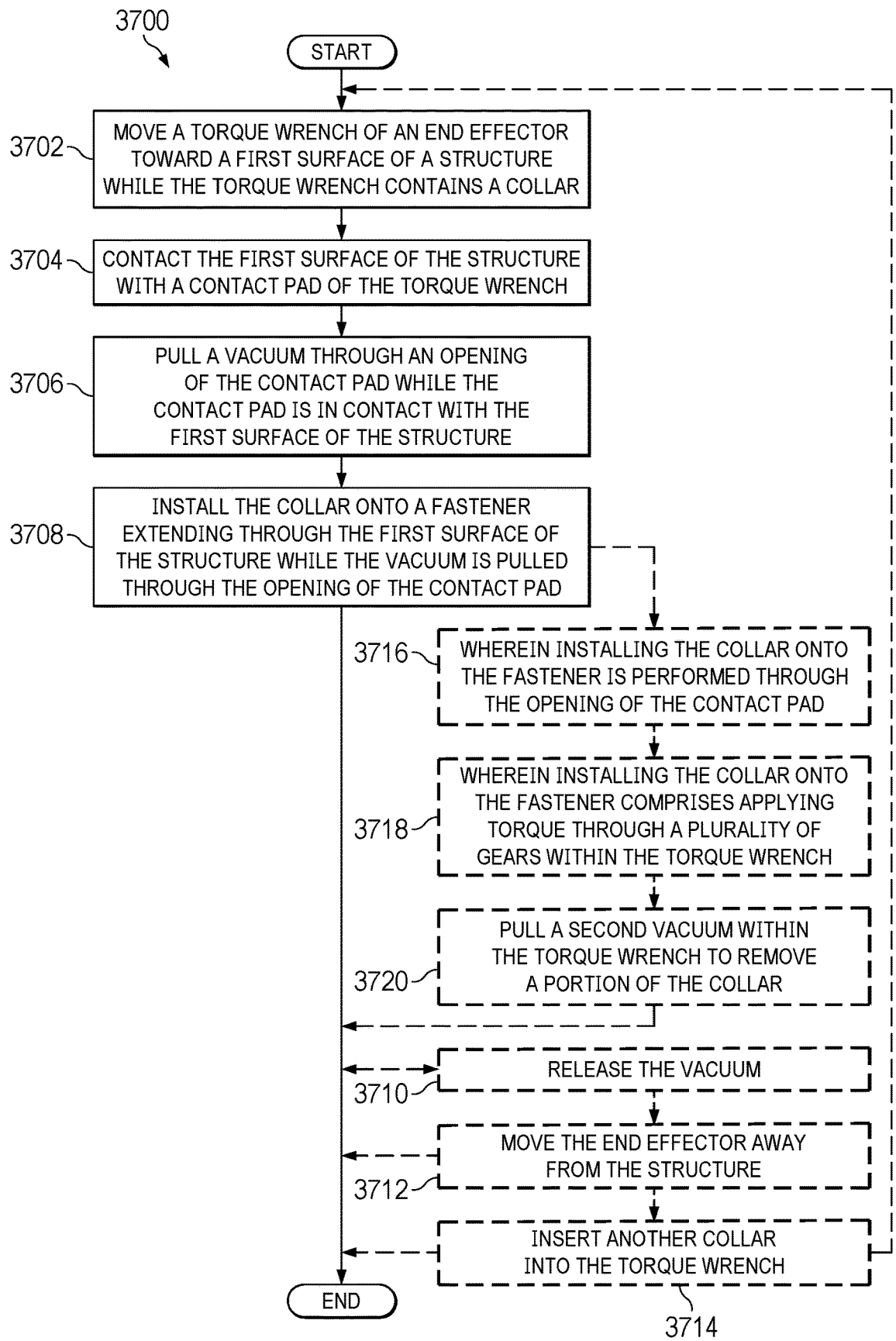
FIG. 37 is a flowchart of a method of using an end effector in accordance with an illustrative embodiment.

Turning to FIG. 37, a flowchart of a method of using an end effector is depicted in accordance with an illustrative embodiment. Method 3700 can be performed using end effector 102 on structure 104 in FIG. 1. Method 3700 can be performed by end effector 200 of FIG. 2. Method 3700 can be performed by end effector 370 of FIGS. 3-14. Method 3700 can be performed by end effector 1702 of FIGS. 17-22. Method 3700 can be performed by end effector 2370 of FIGS. 23-24. Method 3700 could be performed by torque wrench 2512 of FIGS. 25-29.

Method 3700 moves a torque wrench of an end effector toward a first surface of a structure while the torque wrench contains a collar (operation 3702). In some illustrative examples, the torque wrench of the end effector is moved towards the first surface after performing non-contact normalization of the end effector. In some illustrative examples, the non-contact normalization is performed using surface data generated by non-contact inspection of the first surface.

Method 3700 contacts the first surface of the structure with a contact pad of the torque wrench (operation 3704). Method 3700 pulls a vacuum through an opening of the contact pad while the contact pad is in contact with the first surface of the structure (operation 3706). Method 3700 installs the collar onto a fastener extending through the first surface of the structure while the vacuum is pulled through the opening of the contact pad (operation 3708). Afterwards, the method terminates.

In some illustrative examples, method 3700 releases the vacuum after installing the collar onto the fastener (operation 3710). In some illustrative examples, method 3700 moves the end effector away from the structure after releasing the vacuum (operation 3712). After releasing the vacuum and moving the end effector away from the structure, another collar can be inserted into the torque wrench (operation 3714)

In some illustrative examples, method 3700 installing the collar onto the fastener is performed through the opening of the contact pad (operation 3716). In some illustrative examples, installing the collar onto the fastener comprises applying torque through a number of gears within the torque wrench (operation 3718). In some illustrative examples, method 3700 pulls a second vacuum within the torque wrench to remove a portion of the collar (operation 3720).

Figure 38:
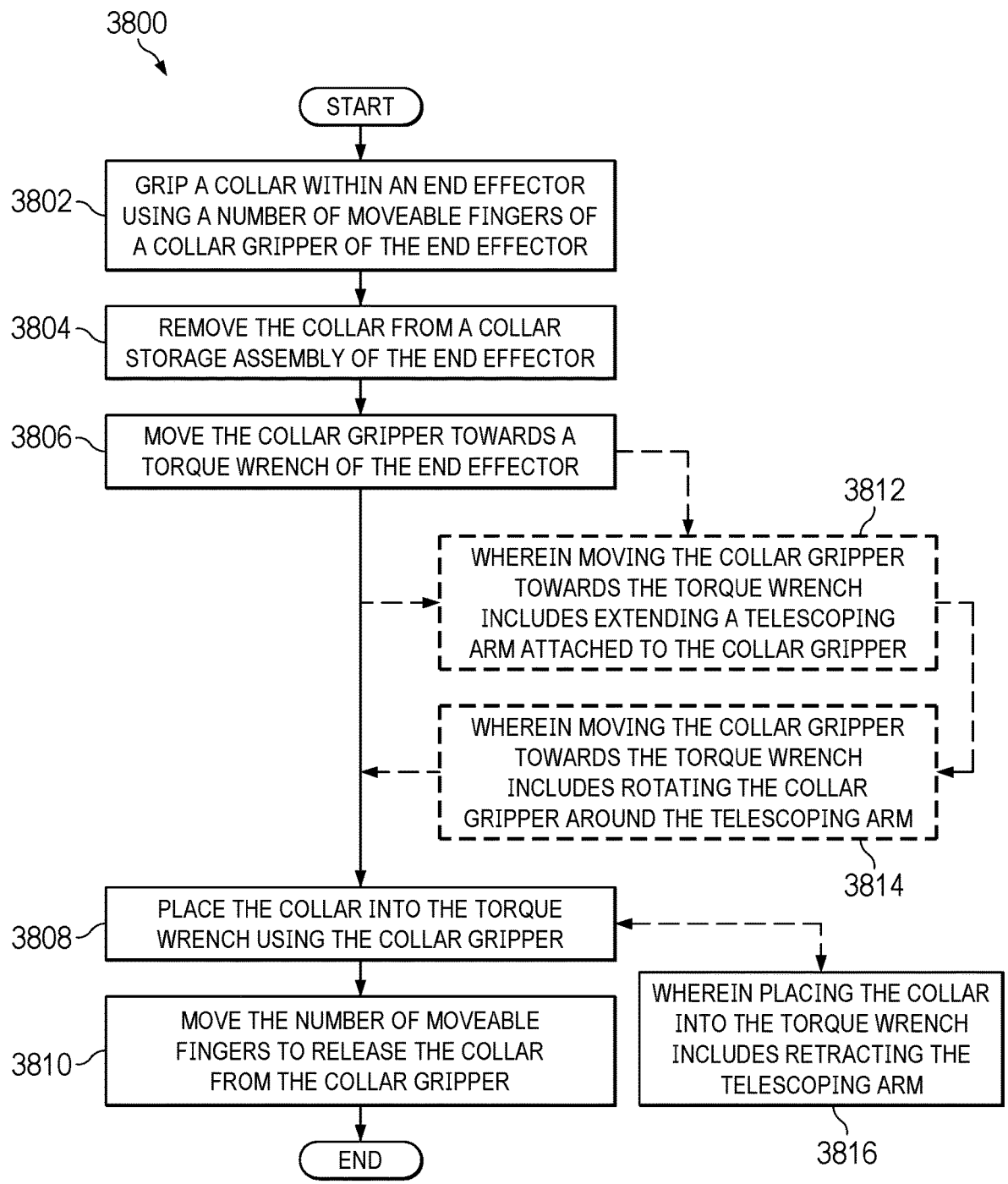
FIG. 38 is a flowchart of a method of using an end effector in accordance with an illustrative embodiment.

Turning to FIG. 38, a flowchart of a method of using an end effector is depicted in accordance with an illustrative embodiment. Method 3800 can be performed using end effector 102 on structure 104 in FIG. 1. Method 3800 can be performed by end effector 200 of FIG. 2. Method 3800 can be performed by end effector 300 of FIGS. 3-14. Method 3800 can be performed by end effector 1702 of FIGS. 17-22. Method 3800 can be performed by end effector 2300 of FIGS. 23-24. Method 3800 could be performed by torque wrench 2512 of FIGS. 25-29.

Method 3800 grips a collar within an end effector using a number of moveable fingers of a collar gripper of the end effector (operation 3802). Method 3800 removes the collar from a collar positioning assembly of the end effector (operation 3804). Method 3800 moves the collar gripper towards a torque wrench of the end effector (operation 3806). Method 3800 places the collar into the torque wrench using the collar gripper (operation 3808). Method 3800 moves the number of moveable fingers to release the collar from the collar gripper (operation 3810). Afterwards, method 3800 terminates.

In some illustrative examples, moving the collar gripper towards the torque wrench includes extending a telescoping arm attached to the collar gripper (operation 3812). In some illustrative examples, moving the collar gripper towards the torque wrench includes rotating the collar gripper around the telescoping arm (operation 3814). In some illustrative examples, placing the collar into the torque wrench include retracting the telescoping arm (operation 3816).

Figure 39:
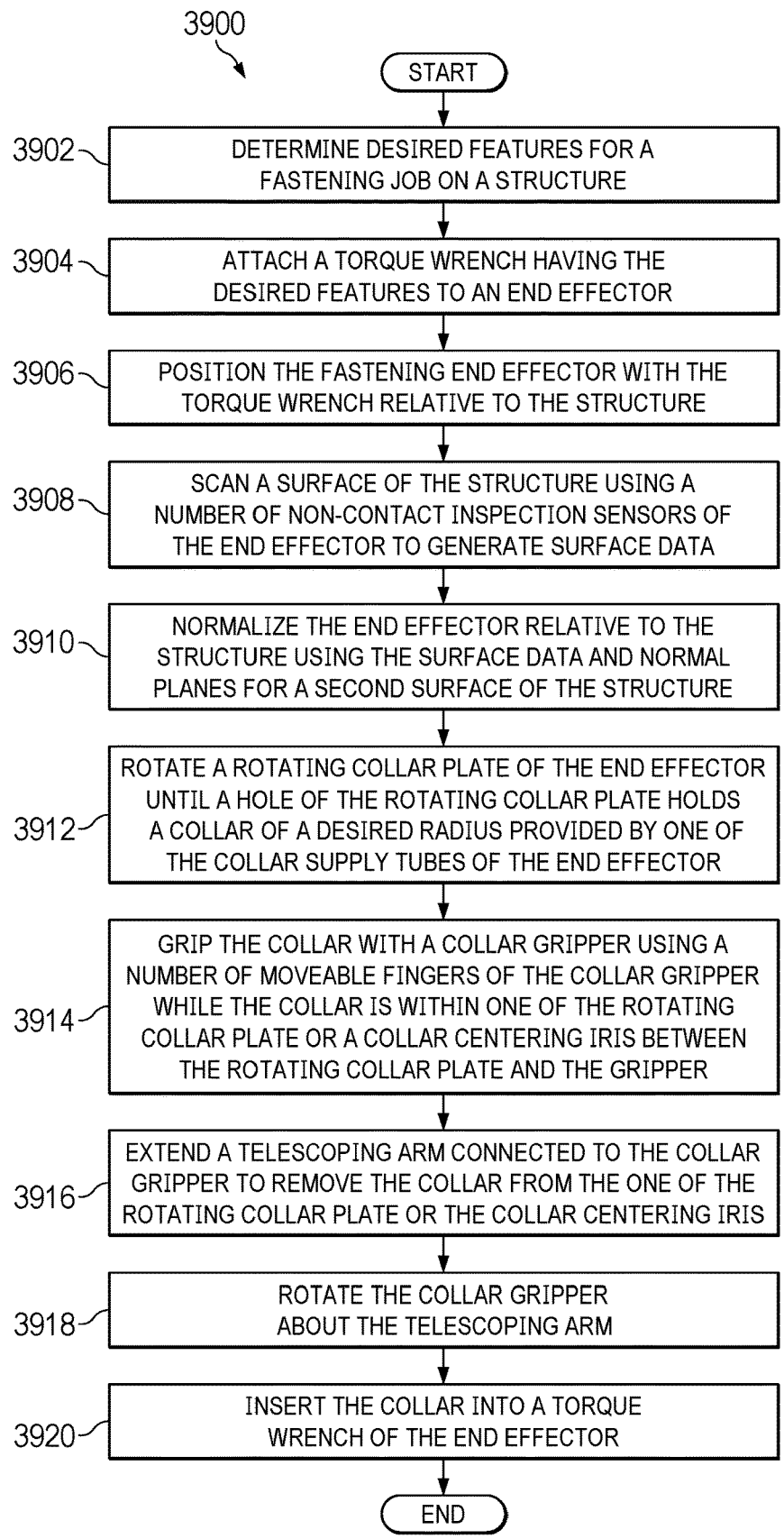
FIG. 39 is a flowchart of a method of using an end effector in accordance with an illustrative embodiment.

Turning to FIG. 39, a flowchart of a method of using an end effector is depicted in accordance with an illustrative embodiment. Method 3900 can be performed using end effector 102 on structure 104 in FIG. 1. Method 3900 can be performed by end effector 200 of FIG. 2. Method 3900 can be performed by end effector 300 of FIGS. 3-14. Method 3900 can be performed by end effector 1702 of FIGS. 17-22. Method 3900 can be performed by end effector 2300 of FIGS. 23-24. Method 3900 could be performed by torque wrench 2512 of FIGS. 25-29.

Method 3900 determines desired features for a fastening job on a structure (operation 3902). In some illustrative examples, the desired features include at least one of a collar type, a collar size, or a desired offset for a torque wrench. Method 3900 attaches a torque wrench having the desired features to an end effector (operation 3904). In some illustrative examples, the torque wrench provides the desired features by having a collar retainer with a preset diameter. In some illustrative examples, the torque wrench provides the desired features by having a desired quantity of gears within a housing of the torque wrench.

Method 3900 positions the end effector with the torque wrench relative to the structure (operation 3906). Method 3900 scans a surface of the structure using a number of non-contact inspection sensors of the end effector to generate surface data (operation 3908). Method 3900 normalizes the end effector relative to the structure using the surface data and normal planes for a second surface of the structure (operation 3910). Method 3900 rotates a rotating collar plate of the end effector until a hole of the rotating collar plate holds a collar of a desired radius provided by one of the collar supply tubes of the end effector (operation 3912). Method 3900 grips the collar with a collar gripper using a number of moveable fingers of the collar gripper while the collar is within one of the rotating collar plate or a collar centering iris between the rotating collar plate and the collar gripper (operation 3914). Method 3900 extends a telescoping arm connected to the collar gripper to remove the collar from the one of the rotating collar plate or the collar centering iris (operation 3916). Method 3900 rotates the collar gripper about the telescoping arm (operation 3918). Method 3900 inserts the collar into a torque wrench of the end effector (operation 3920). Afterwards, method 3900 terminates.

Figure 40:
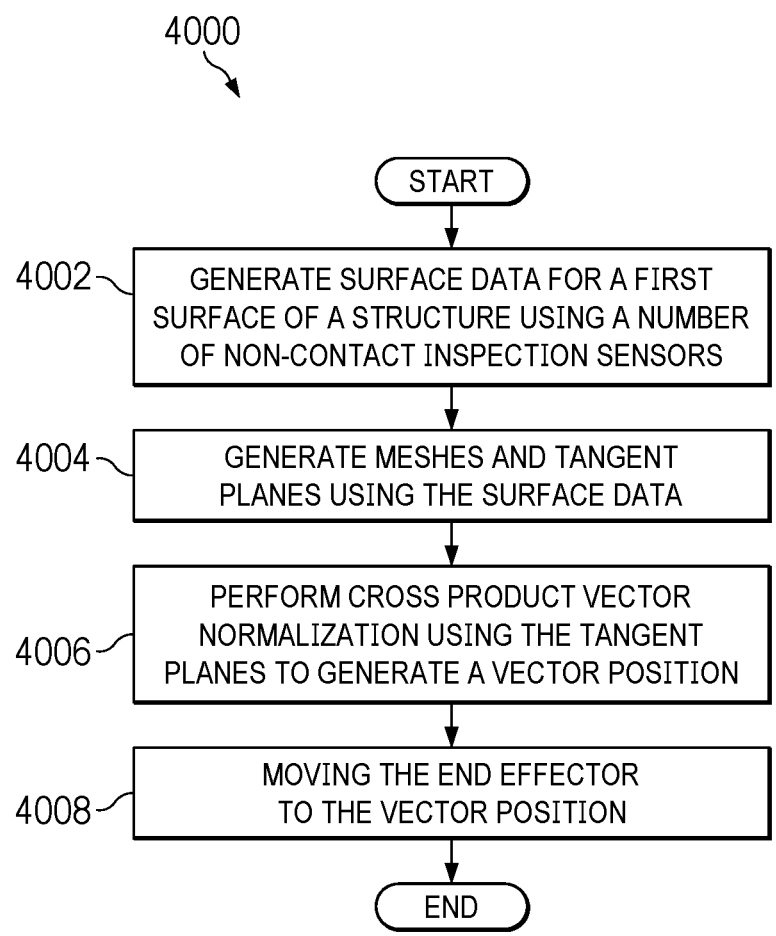
FIG. 40 is a flowchart of a method of normalizing an end effector in accordance with an illustrative embodiment.

Turning to FIG. 40, a flowchart of a method of normalizing an end effector is depicted in accordance with an illustrative embodiment. Method 4000 can be performed using end effector 102 and at least one of controller 138 or computer system 142 in FIG. 1. In some illustrative examples, method 4000 can be performed by end effector 200 of FIG. 2. Method 4000 can be performed to normalize end effector 300 of FIGS. 3-14. Method 4000 can be performed to normalize end effector 1702 of FIGS. 17-22. Method 4000 can be performed to normalize end effector 2300 of FIGS. 23-24. Method 4000 could be performed to normalize end effector 2502 prior to performing fastening operations as in FIGS. 25-29.

Method 4000 generates surface data for a first surface of a structure using a number of non-contact inspection sensors (operation 4002). Method 4000 generates meshes and tangent planes using the surface data (operation 4004). Method 4000 performs cross product vector normalization using the tangent planes to generate a vector position (operation 4006). Method 4000 moves the end effector to the vector position (operation 4008). Afterwards, the method terminates.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 3714 through operation 3720 may be optional. As another example, operation 3812 through operation 3816 may be optional.

Figure 41:
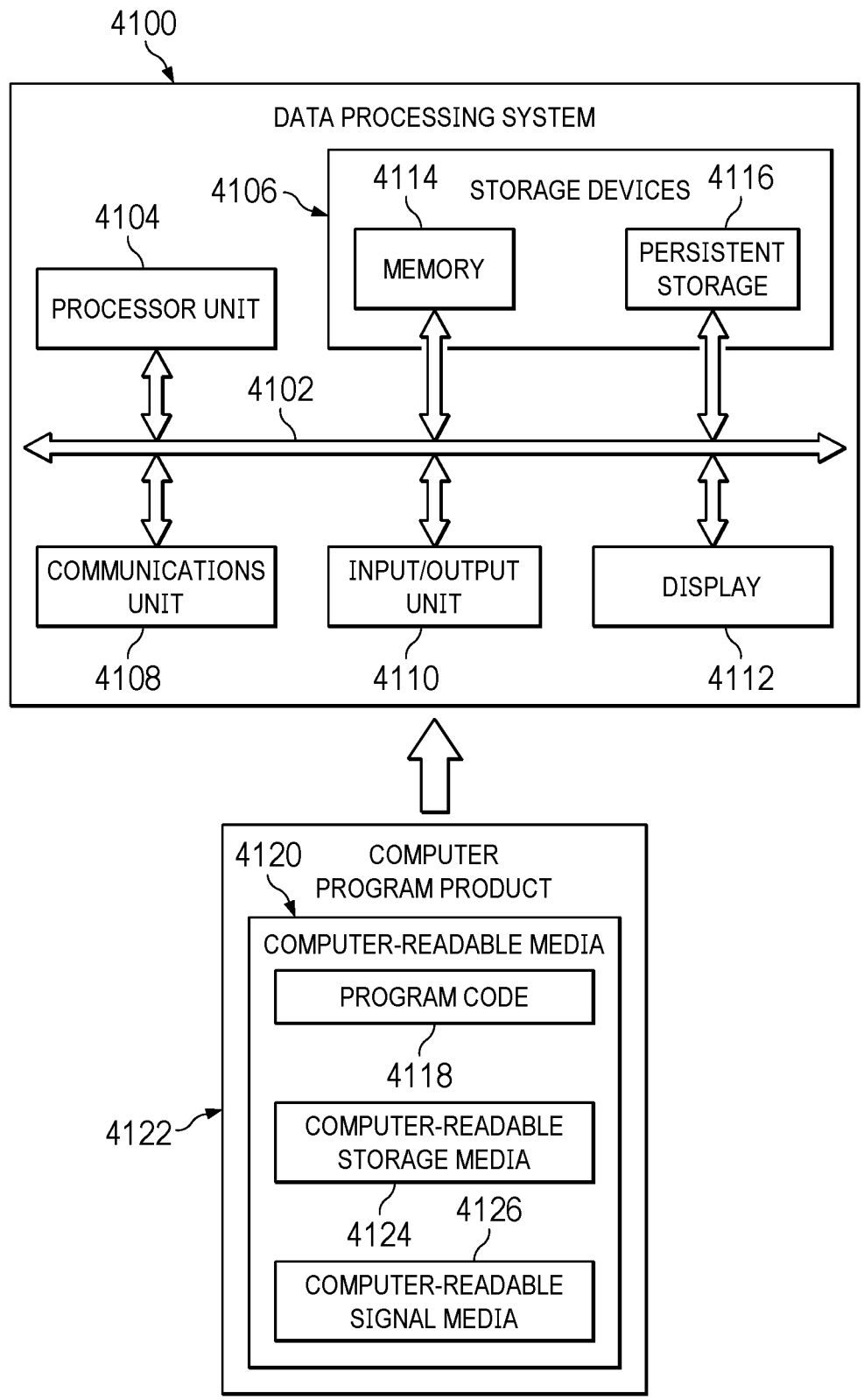
FIG. 41 is an illustration of a block diagram of a data processing system in accordance with an illustrative embodiment.

Turning now to FIG. 41, an illustration of a block diagram of a data processing system is depicted in accordance with an illustrative embodiment. Data processing system 4100 may be used to implement at least one of controller 139 or computer system 142 in FIG. 1. Data processing system 4100 may be used to implement at least one of controller 272 in FIG. 2. In this illustrative example, data processing system 4100 includes communications framework 4102, which provides communications between processor unit 4104, storage devices 4106, memory 4114, persistent storage 4116, communications unit 4108, input/output unit 4110, and display 4112. In this example, communications framework 4102 may take the form of a bus system.

Processor unit 4104 serves to execute instructions for software that may be loaded into one of storage devices 4106. Processor unit 4104 may be a number of processors, a multi-processor core, or some other type of processor, depending on the particular implementation. In an embodiment, processor unit 4104 comprises one or more conventional general-purpose central processing units (CPUs). In an alternate embodiment, processor unit 4104 comprises one or more graphical processing units (CPUs).

Memory 4114 and persistent storage 4116 are examples of storage devices 4106. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 4106 may also be referred to as computer-readable storage devices in these illustrative examples. Memory 4114, in these examples, may be, for example, a random-access memory or any other suitable volatile or non-volatile storage device. Persistent storage 4116 may take various forms, depending on the particular implementation.

For example, persistent storage 4116 may contain one or more components or devices. For example, persistent storage 4116 may include a hard drive, a flash memory, a rewritable optical disk, a rewritable magnetic tape, or some combination of the above. The media used by persistent storage 4116 also may be removeable. For example, a removeable hard drive may be used for persistent storage 4116.

Storage devices 4106 are connected to the bus system. In some illustrative examples, one of storage devices 4106 stores program instructions to perform a method, such as method 3700, method 3800, method 3900, or method 4000. Processor unit 4104 is connected to the bus system. In some illustrative examples, processor unit 4104 executes the program instructions to receive a model of a three dimensional solid; determine at least one of vertices, edges, and faces for the model; and traverse the at least one of vertices, edges, and faces of the model to determine corresponding adjacent vertices, adjacent edges, or adjacent faces for the at least one of the vertices, the edges, and the faces such that each of corresponding adjacent vertices, corresponding adjacent edges, or corresponding adjacent faces are counted exactly once in the traverse.

Communications unit 4108, in these illustrative examples, provides for communications with other data processing systems or devices. In these illustrative examples, communications unit 4108 is a network interface card.

Input/output unit 4110 allows for input and output of data with other devices that may be connected to data processing system 4100. For example, input/output unit 4110 may provide a connection for user input through at least one of a keyboard, a mouse, or some other suitable input device. Further, input/output unit 4110 may send output to a printer. Display 4112 provides a mechanism to display information to a user.

Instructions for at least one of the operating system, applications, or programs may be located in storage devices 4106, which are in communication with processor unit 4104 through communications framework 4102. The processes of the different embodiments may be performed by processor unit 4104 using computer-implemented instructions, which may be located in a memory, such as memory 4114.

These instructions are referred to as program code, computer-usable program code, or computer-readable program code that may be read and executed by a processor in processor unit 4104. The program code in the different embodiments may be embodied on different physical or computer-readable storage media, such as storage devices 4106 including memory 4114 or persistent storage 4116.

Program code 4118 is located in a functional form on computer-readable media 4120 that is selectively removeable and may be loaded onto or transferred to data processing system 4100 for execution by processor unit 4104. Program code 4118 and computer-readable media 4120 form computer program product 4122 in these illustrative examples. In one example, computer-readable media 4120 may be computer-readable storage media 4124 or computer-readable signal media 4126.

Further, as used herein, "computer-readable media 4120" can be singular or plural. For example, program code 4118 can be located in computer-readable media 4120 in the form of a single storage device or system. In another example, program code 4118 can be located in computer-readable media 4120 that is distributed in multiple data processing systems. In other words, some instructions in program code 4118 can be located in one data processing system while other instructions in in program code 4118 can be located in one data processing system. For example, a portion of program code 4118 can be located in computer-readable media 4120 in a server computer while another portion of program code 4118 can be located in computer-readable media 4120 located in a set of client computers.

The different components illustrated for data processing system 4100 are not meant to provide architectural limitations to the manner in which different embodiments can be implemented. In some illustrative examples, one or more of the components may be incorporated in or otherwise form a portion of, another component. For example, memory 4114, or portions thereof, can be incorporated in processor unit 4104 in some illustrative examples. The different illustrative embodiments can be implemented in a data processing system including components in addition to or in place of those illustrated for data processing system 4100. Other components shown in FIG. 41 can be varied from the illustrative examples shown. The different embodiments can be implemented using any hardware device or system capable of running program code 4118.

In these illustrative examples, computer-readable storage media 4124 is a physical or tangible storage device used to store program code 4118 rather than a medium that propagates or transmits program code 4118. Alternatively, program code 4118 may be transferred to data processing system 4100 using computer-readable signal media 4126.

Computer-readable signal media 4126 may be, for example, a propagated data signal containing program code 4118. For example, computer-readable signal media 4126 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 4100 are not meant to provide architectural limitations to the manner in which different embodiments may be implemented. The different illustrative embodiments may be implemented in a data processing system including components in addition to or in place of those illustrated for data processing system 4100. Other components shown in FIG. 41 can be varied from the illustrative examples shown. The different embodiments may be implemented using any hardware device or system capable of running program code 4118.

Figure 42:
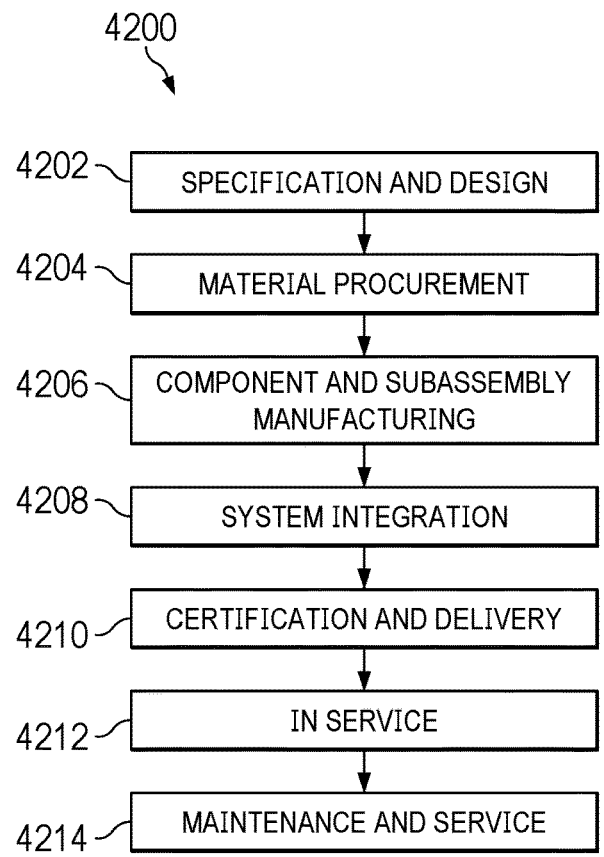
FIG. 42 is an illustration of an aircraft manufacturing and service method in a form of a block diagram in accordance with an illustrative embodiment.
Figure 43:
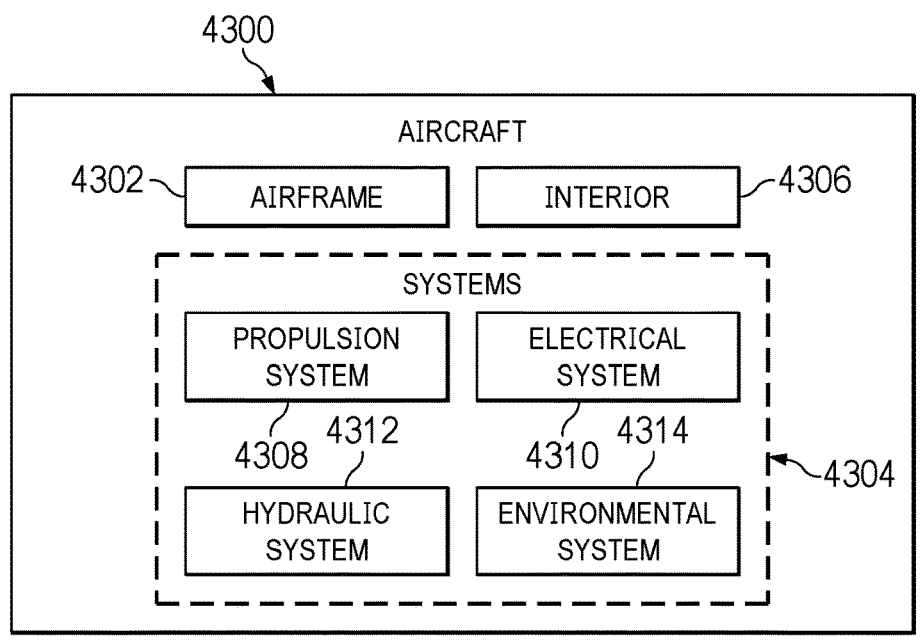
FIG. 43 is an illustration of an aircraft in a form of a block diagram in which an illustrative embodiment may be implemented.

Illustrative embodiments of the present disclosure may be described in the context of aircraft manufacturing and service method 4200 as shown in FIG. 42 and aircraft 4300 as shown in FIG. 43. Turning first to FIG. 42, an illustration of an aircraft manufacturing and service method in a form of a block diagram is depicted in accordance with an illustrative embodiment. During pre-production, aircraft manufacturing and service method 4200 may include specification and design 4202 of aircraft 4300 in FIG. 43 and material procurement 4204.

During production, component and subassembly manufacturing 4206 and system integration 4208 of aircraft 4300 takes place. Thereafter, aircraft 4300 may go through certification and delivery 4210 in order to be placed in service 4212. While in service 4212 by a customer, aircraft 4300 is scheduled for routine maintenance and service 4214, which may include modification, reconfiguration, refurbishment, or other maintenance and service.

Each of the processes of aircraft manufacturing and service method 4200 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 43, an illustration of an aircraft in the form of a block diagram is depicted in which an illustrative embodiment may be implemented. In this example, aircraft 4300 is produced by aircraft manufacturing and service method 4200 of FIG. 42 and may include airframe 4302 with plurality of systems 4304 and interior 4306. Examples of systems 4304 include one or more of propulsion system 4308, electrical system 4310, hydraulic system 4312, and environmental system 4314. Any number of other systems may be included.

Apparatuses and methods embodied herein may be employed during at least one of the stages of aircraft manufacturing and service method 4200. One or more illustrative embodiments may be used during component and subassembly manufacturing 4206, system integration 4208, in service 4212, or maintenance and service 4214 of FIG. 42. For example, end effector 102 of FIG. 1 or end effector 200 of FIG. 2 can be used to fasten a structure during component and subassembly manufacturing 4206. End effector 102 of FIG. 1 or end effector 200 of FIG. 2 can be used to fasten a structure to form a replacement part for maintenance and service 4214. Method 3700 can be used to fasten a structure during component and subassembly manufacturing 4206 or maintenance and service 4214. Method 3800 can be used to prepare a collar for fastening a structure during component and subassembly manufacturing 4206 or maintenance and service 4214. Method 3900 can be used to place a collar for fastening a structure in an end effector during component and subassembly manufacturing 4206 or maintenance and service 4214. Method 4000 can be used to normalize an end effector during component and subassembly manufacturing 4206, system integration 4208, in service 4212, or maintenance and service 4214.

The illustrative examples provide an end effector configured to perform non-contact normalization. The illustrative examples provide an Inside Mold Line (IML) single function end effector to install collars/nuts on a structure with final torque application. Different sizes of collars/nuts can be installed with an in-line or offset torque wrench on the end effector. A gripper jaw of a collar transfer unit is designed to transfer the collar/nut from a rotating collar plate to the torque wrench by utilizing a piston/cylinder mechanism of a telescoping arm which moves the gripper jaw to the torque wrench. The varying hexagonal body size of a collar/nut is accommodated by the gripper jaw acting as an adjustable hexagonal wrench that moves to fit the defined hexagon size in the in-line or offset tool. In some illustrative examples, the adjustable wrench is pneumatically controlled with contact force sensing to control force sensing to control the grip force on the collar/nut.

The illustrative examples can be used to normalize an end effector prior to performing functions on a structure using the end effector. In some illustrative examples, the end effector is an Inside Mold Line Single Function End Effector. In some illustrative examples, the end effector is an IML end effector that applies a single-sided clamp-up throughout drilling, inspection, and fastener insertion by a plurality of outer mold line (OML) end effectors.

An IML end effector approaches an internal surface of a structure. Non-contact surface data collection and analysis of the inner surface of the structure is performed using non-contact sensors of the IML end effector. Non-contact normalization process of the IML end effector is performed based on the surface data and analysis. A collar/nut is fed through a collar tube. The collar/nut is gripped after delivery through the collar tube. The collar/nut is installed into front of a torque wrench by the gripper. The IML end effector approaches the structure and contacts it with a front surface of the torque wrench. Clamp-up force is applied through the front surface of the torque wrench surface of end effector by robot. The IML end effector applies vacuum to create the single-sided clamp-up from the IML side. A drilling process is executed by an OML drilling robot. An OML inspection robot moves into position and inspects the drilled hole. An OML fastening robot moves into position and inserts a fastener into the drilled hole. The IML end effector pushes the collar/nut forward and aligns it to protruding fastener in the IML structure. The IML end effector starts the torquing process and installs the collar/nut on the fastener on the IML side.

The illustrative examples provide collar/nut feeding tubes within the end effector. As depicted in FIG. 3, five tubes provide inlet of collars and nuts to the rotating collar plate (transfer block). The tubes vary in size. The tubes feed into a corresponding sized hole in the rotating collar plate. The collar or nut is then held in the rotating collar plate, from where it is picked up by a gripper.

The illustrative examples provide a gripper mechanism which is used to grip and install the collar/nut into the torque wrench (installation tool). The gripper with collar/nut is then moved forward by a piston-cylinder mechanism to the in-line or offset tool. The gripper is then rotated to align with the in-line or offset installation tool.

The illustrative examples include an in-line or offset collar/nut installation tool (torque wrench). The torque wrench is designed such that the gripper places the collar/nut for installation into the torque wrench through the contact pad. A tool changer mechanism is provided to accommodate the ability to change in-line or offset collar/nut installation tool.

The in-line or offset tool provides clamp-up by pushing on the inside of the structure during drilling. Once drilling is completed, a vacuum through the in-line or offset tool provides clamp-up during fastener installation. After the vacuum is applied, the clamp-up force from both outside and inside is released and the parts are now clamped up with the help of the vacuum. At this point the fastening robot comes on the outside and installs the fastener inside the hole. The in-line or offset tool on the IML end effector aligns the collar/nut with the fastener for installation with the help of a special multi-lobed alignment feature. The in-line or offset tool then applies final torque to complete the installation of the collar/nut as shown.

The benefits of the IML single function end effector include the ability to provide clamp-up during drilling (mechanically) and during fastening with the help of a vacuum. The IML single function end effector also has multiple size tubes and an integrated feeding mechanism for collar/nut to be installed on fastener. With single function end-effectors the size and weight enables them to be used with smaller compact robots thus increasing the number of robots that can be used for drilling and fastening on a structure per unit volume. Increasing the number of robots can provide an exponential increase in productivity.

The single-sided clamp-up technology results in end effectors that perform single operations such as drilling or fastening. The one up assembly concept is enabled by maintaining contact between two or more parts without separating them, so the structure can be drilled and a fastener inserted without moving the two or more parts apart. Drilling, inspection, and fastening can be performed by separate robots. These illustrative examples becomes a TAKT time drilling process by having multiple robots. TAKT time describes a production rate for meeting demand. The illustrative examples provide working in high density for volumetric space.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
    moving a torque wrench of an end effector toward a first surface of a structure while the torque wrench contains a collar;
    contacting the first surface of the structure with a contact pad of the torque wrench;
    pulling a vacuum through an opening of the contact pad while the contact pad is in contact with the first surface of the structure; and
    installing the collar onto a fastener extending through the first surface of the structure while the vacuum is pulled through the opening of the contact pad.

2. The method of claim 1 further comprising:
    rotating a rotating collar plate of the end effector until a hole of the rotating collar plate holds the collar of a desired radius provided by one of collar supply tubes of the end effector.

3. The method of claim 2 further comprising:
    gripping the collar with a collar gripper using a number of moveable fingers of the collar gripper while the collar is within one of the rotating collar plate or a collar centering iris between the rotating collar plate and the collar gripper;
    extending a telescoping arm connected to the collar gripper to remove the collar from the one of the rotating collar plate or the collar centering iris;
    rotating the collar gripper about the telescoping arm; and
    inserting the collar into the torque wrench of the end effector.

4. The method of claim 1 further comprising:
    releasing the vacuum after installing the collar onto the fastener; and
    moving the end effector away from the structure after releasing the vacuum.

5. The method of claim 1, wherein installing the collar onto the fastener is performed through the opening of the contact pad.

6. The method of claim 1 further comprising:
pulling a second vacuum within the torque wrench to remove a portion of the collar.

7. The method of claim 1, wherein installing the collar onto the fastener comprises applying torque through a number of gears within the torque wrench.

8. The method of claim 1 further comprising:
determining desired features for a fastening job on the structure; and
attaching the torque wrench having the desired features to an end effector.

9. The method of claim 1 further comprising:
scanning the first surface of the structure using a number of non-contact inspection sensors of the end effector to generate surface data; and
normalizing the end effector relative to the structure using the surface data and normal planes for a second surface of the structure.

10. The method of claim 1 further comprising:
gripping the collar within the end effector using a number of moveable fingers of a collar gripper of the end effector;
removing the collar from a collar positioning assembly of the end effector;
moving the collar gripper towards the torque wrench of the end effector;
placing the collar into the torque wrench using the collar gripper; and
moving the number of moveable fingers to release the collar from the collar gripper.

11. A method comprising:
gripping a collar within an end effector using a number of moveable fingers of a collar gripper of the end effector;
removing the collar from a collar positioning assembly of the end effector;
moving the collar gripper towards a torque wrench of the end effector;
placing the collar into the torque wrench using the collar gripper; and
moving the number of moveable fingers to release the collar from the collar gripper.

12. The method of claim 11, wherein moving the collar gripper towards the torque wrench includes extending a telescoping arm attached to the collar gripper.

13. The method of claim 12 wherein moving the collar gripper towards the torque wrench includes rotating the collar gripper around the telescoping arm.

14. The method claim 12, wherein placing the collar into the torque wrench includes retracting the telescoping arm.

15. The method of claim 11 comprising:
moving the torque wrench of the end effector toward a first surface of a structure while the torque wrench contains the collar;
pulling a vacuum through an opening of a contact pad of the torque wrench while the contact pad is in contact with the first surface of the structure; and
installing the collar onto a fastener extending through the first surface of the structure while the vacuum is pulled through the opening of the contact pad.

16. The method of claim 15 further comprising:
releasing the vacuum after installing the collar onto the fastener; and
moving the end effector away from the structure after releasing the vacuum.

17. The method of claim 11, wherein removing the collar from the collar positioning assembly of the end effector comprises gripping the collar within a rotating collar plate of the collar positioning assembly using the number of moveable fingers of the collar gripper.

18. The method of claim 11, wherein removing the collar from the collar positioning assembly of the end effector comprises gripping the collar within a collar centering iris of the collar positioning assembly using the number of moveable fingers of the collar gripper.

19. A method comprising:
determining desired features for a fastening job on a structure;
attaching a torque wrench having the desired features to an end effector;
positioning the end effector with the torque wrench relative to the structure;
scanning a surface of the structure using a number of non-contact inspection sensors of the end effector to generate surface data;
normalizing the end effector relative to the structure using the surface data and normal planes for a second surface of the structure;
rotating a rotating collar plate of the end effector until a hole of the rotating collar plate holds a collar of a desired radius provided by one of collar supply tubes of the end effector;
gripping the collar with a collar gripper using a number of moveable fingers of the collar gripper while the collar is within one of the rotating collar plate or a collar centering iris between the rotating collar plate and the collar gripper;
extending a telescoping arm connected to the collar gripper to remove the collar from the one of the rotating collar plate or the collar centering iris;
rotating the collar gripper about the telescoping arm; and
inserting the collar into a torque wrench of the end effector.

20. A method of normalizing an end effector comprising:
generating surface data for a first surface of a structure using a number of non-contact inspection sensors;
generating meshes and tangent planes using the surface data;
performing cross product vector normalization using the tangent planes to generate a vector position; and
moving the end effector to the vector position.

* * * * *